US010331128B1

(12) United States Patent
Hansel et al.

(10) Patent No.: US 10,331,128 B1
(45) Date of Patent: Jun. 25, 2019

(54) CONTROL REDUNDANCY

(71) Applicant: Lyft, Inc., San Francisco, CA (US)

(72) Inventors: George James Hansel, Redwood City, CA (US); Gerard Joyce, Los Altos, CA (US); Palak Talwar, San Mateo, CA (US); Helen Ruth Lurie, San Francisco, CA (US); James Allen-White Hoffacker, San Carlos, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 15/959,129

(22) Filed: Apr. 20, 2018

(51) Int. Cl.
*H04L 9/30* (2006.01)
*G05D 1/00* (2006.01)
*B60W 50/04* (2006.01)
*B60W 40/10* (2012.01)
*G06F 11/16* (2006.01)

(52) U.S. Cl.
CPC ........... *G05D 1/0077* (2013.01); *B60W 40/10* (2013.01); *B60W 50/045* (2013.01); *G06F 11/165* (2013.01); *H04L 9/30* (2013.01)

(58) Field of Classification Search
CPC .. G05D 1/0077; B60W 40/10; B60W 50/045; G06F 11/165; H04L 9/30
See application file for complete search history.

(56) References Cited

U.S. PATENT DOCUMENTS

| | | | |
|---|---|---|---|
| 2016/0197484 A1* | 7/2016 | Jost | G01D 21/00 |
| | | | 307/116 |
| 2016/0334230 A1* | 11/2016 | Ross | G01C 21/3415 |
| 2017/0018179 A1* | 1/2017 | Gutierrez | H04L 67/12 |
| 2017/0141873 A1* | 5/2017 | Mandeville-Clarke | |
| | | | H04K 3/90 |
| 2017/0255199 A1* | 9/2017 | Boehmke | G05D 1/024 |
| 2017/0262709 A1* | 9/2017 | Wellington | G06K 9/00791 |
| 2018/0032076 A1* | 2/2018 | Lombrozo | G01S 13/88 |
| 2018/0040246 A1* | 2/2018 | Yonemura | G08G 1/164 |
| 2018/0053141 A1* | 2/2018 | Shydo, Jr. | G05D 1/104 |
| 2018/0075538 A1* | 3/2018 | Konrardy | G06Q 40/08 |
| 2018/0082494 A1* | 3/2018 | Rech | G07C 5/008 |

* cited by examiner

*Primary Examiner* — Hussein Elchanti
(74) *Attorney, Agent, or Firm* — Baker Botts L.L.P.

(57) ABSTRACT

In one embodiment, a method includes receiving data from one or more sensors associated with a vehicle; and receiving a message from a first processor. The message from the first processor includes a first control command for an actuator of the vehicle and a first certificate function. The method also includes receiving a message from the second processor. The message from the second processor includes a second control command for the actuator of the vehicle and a second certificate function. The method also includes computing a first certificate based on the first certificate function and the data; computing a second certificate based on the second certificate function and the data; determining a valid control signal based on an accuracy of the first second control command and second control command relative the first certificate and second certificate; and transmitting the valid control signal to the actuator of the vehicle.

20 Claims, 24 Drawing Sheets

CONTROL REDUNDANCY

BACKGROUND

An autonomous vehicle (AV) may be a vehicle that is capable of sensing its environment and navigating with little or no human input. The autonomous vehicle may include a system having a variety of modules or sub-systems for enabling the vehicle to determine its surroundings and safely navigate to target destinations. For example, an autonomous vehicle may have a computer (e.g., one or more central processing units, graphical processing units, memory, and storage) for controlling various operations of the vehicle, such as driving and navigating. To that end, the computer may process data from one or more sensor arrays. For example, an autonomous vehicle may have optical cameras for, e.g., recognizing hazards, roads and lane markings. Data from these systems and modules may be used by a navigation system to safely guide the autonomous vehicle, even without the aid of a human driver.

Successful and safe navigation of AV may depend on making appropriate decisions in response to the external environment. Making appropriate decisions may, in turn, depend on appropriate data being transmitted fast and in time between different components of the AV system. However, when multiple components are transmitting data to a single receiver, and the combined throughput of the multiple components exceeds the channel capacity, congestion latency may occur.

The AV may have a control system to provide control commands to the various components of the AV performing the driving functions of the AV (e.g., steering, acceleration, or braking). For reliable operation, the control system has redundant computing systems as well as sensors with overlapping capabilities. A classic redundancy system implementation of the control system provides no guarantee of correctness other than that the control command is a decision decided by majority of computing components, even in the presence of a faulty entity (e.g., a faulty sensor). The majority (e.g., two out of three) determination of the appropriate control command may be identified by performing the same computation multiple times (e.g., three times). However, each computation can be expensive with respect to time and utilized system resources. The computational cost is especially significant in the context of autonomous driving, since decisions need to be made rapidly when traveling at high speeds to minimize response time and ensure safety.

The AV may include many components (both hardware as well as software) that communicate with each other via data packets including signals, commands, and/or instructions. For example, a central computer or a computing module associated with a camera sensor of the vehicle may send a signal to an actuator of the vehicle's brakes to apply brakes based on analysis of the environment surrounding the vehicle. These data packets could be exchanged between the vehicle components unsecured, but doing so would make them susceptible to eavesdropping and unwanted modifications. For example, an eavesdropper or a hacker may introduce one or more faults in the data packets or inject fabricated data packets at any point within the communication network of the vehicle, such as right before the intended recipient vehicle component. In addition, even when there is no compromise in communication between two vehicle components, the sending component may sometimes send suboptimal or erroneous instructions to the receiving component (e.g., because the sending component may not have performed its processing correctly). If such modified, compromised, or faulty data packets are received by a vehicle component without safeguards, then the component may cause the vehicle to perform an incorrect action, which could lead to less safe action.

DESCRIPTION OF EXAMPLE EMBODIMENTS

Figure 1:
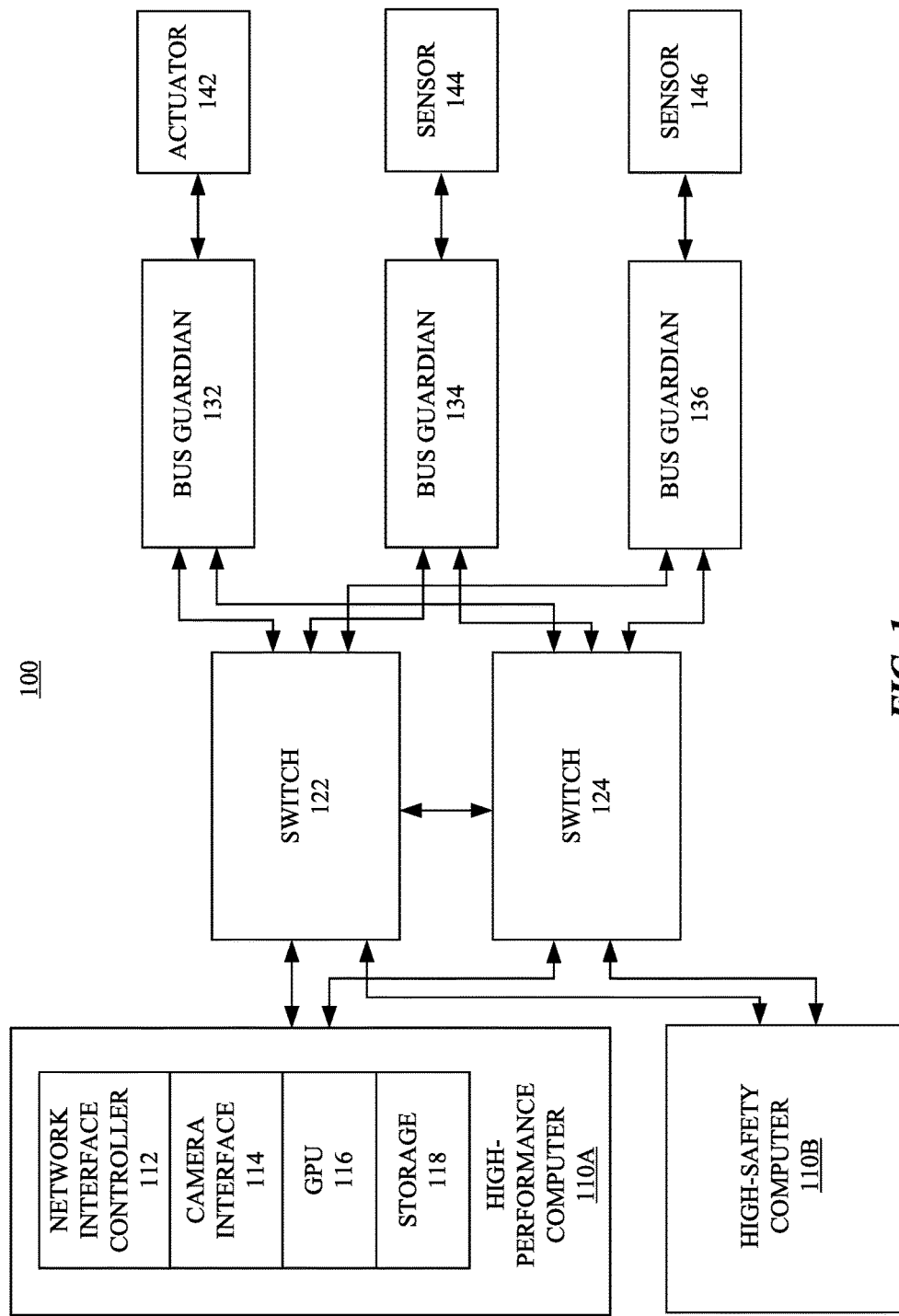
FIG. 1 illustrates an example network system 100 which connects a number of nodes with a redundancy architecture.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In particular embodiments, the AV system may include a variety of sub-systems, modules, or components which are inter-networked for enabling the vehicle to determine its surroundings and safely navigate to target destinations. In particular embodiments, the sub-systems, modules, or components may fall into the categories of sensors, actuators, and computers. In particular embodiments, the AV system may include, for example, but are not limited to, a central computer, actuators, sensors (e.g., cameras, LiDAR systems, RADARs, ultra sound systems, a global positioning system (GPS), inertial measurement units, accelerometers, gyroscopes, odometer systems, etc.), or other related systems.

In particular embodiments, the AV system may include a network which connects the sub-systems, modules, or components of the AV system. In particular embodiments, the network may include a number of switches which connect the central computer with a number of bus guardians (BGs). The BGs may be further connected to other components such as sensors and actuators. In particular embodiments, one or more components (e.g., sensors, actuators, cameras, BGs, or computers) in the network may be referred as a node, which may transmit or/and receive data through the network. In particular embodiments, the network may be dynamically configured to provide different routing paths for the data transmitting between the nodes of the network. In particular embodiments, the network may have redundancy for the connections of the nodes and data may be transmitted between the nodes along different routing paths provided by the network. In particular embodiments, the network may be dynamically configured based on the driving conditions of the AV to enable optimal data transmission in the network.

Unfortunately, transmission latency and congestion in the network can negatively affect the vehicle's safety and operation. Successful and safe navigation of an AV may depend on making appropriate decisions in response to the external environment. Making appropriate decisions may, in turn, depend on the data of interest being transmitted between different components of the AV system, fast and in time. However, the network in the AV system may include many nodes which may transmit or/and receive data through the network essentially at the same time, thereby causing transmission delays. Whenever multiple transmitting nodes (interchangeably referred to as talkers) are transmitting data to a single receiving node (interchangeably referred to as listener), and the combined throughput of the multiple transmitting nodes exceeds the channel capacity, some transmitting data may be delayed, and congestion latency may occur. As an example and not by way of limitation, the AV system may include a number of cameras which capture images of the surrounding environment. The cameras may generate more data on average than the AV system is capable of either consuming or transmitting. For example, multiple cameras may transmit data to the central computer essentially at the same time and the combined throughput of the cameras may exceed the channel capacity. As such, some cameras may be put on wait and their data may be dropped or delayed.

To eliminate the congestion latency, it may be possible to overprovision the network by allocating far more transmission capacity than the nodes require. For example, a 1 terabit per second connection may be used for a node that requires no more than 100 megabits per second. However, the cost of doing this may be prohibitively expensive and it may be impractical for the AV system.

In order to solve the congestion latency problem in a more practical manner, particular embodiments of the AV system may dynamically change the configuration (e.g., transmission schedule, connections of switches) of the network connecting the AV nodes (e.g., sensors, cameras, actuators, or the central computer) to accommodate different driving conditions and anticipated needs. In particular embodiments, utilization of the transmission channel may be segmented based on time and allocated to individual nodes so that every node is synchronized and transmits data only during its "turn" within each transmission cycle. In particular embodiments, the transmission cycles may include scheduled time segments and unscheduled time segments. During the scheduled time segments, the nodes may transmit their respective data during their respective pre-allocated timeslots. During the unscheduled time segments, the nodes (which may or may not have scheduled time segments) may transmit data based on the respective priority values assigned to the nodes. Based on current driving conditions (e.g., vehicle speed, pedestrian density, or any other condition that may require shorter response time), the gap between the scheduled time periods of each node may be reduced to make transmission bandwidth more readily available. This may be achieved in several ways. In particular embodiments, the length of the transmission cycle may be shortened and both the scheduled and unscheduled time segments within the cycles decrease proportionally. In particular embodiments, the transmission cycle length may be shortened by decreasing the unscheduled time segments without changing the respective lengths of the scheduled time segments. In particular embodiments, the network may be dynamically configured for connecting the nodes with different transmission schedule and redundancy. In particular embodiments, the AV system may use these methods individually or in combination to mitigate or eliminate the transmission latency.

In addition to addressing transmission latency, the AV system needs to guard against and be tolerant of any single fault of its components. For example, when a single connector in the control system fails, the AV may need to rely on the redundancy of the network to receive the data from other routes in the network. Although the physical redundancy may include duplicate transmission routes, duplicating all traffic over the network may reduce the throughput of the network (e.g., if every transmission is doubled, the network throughput is effectively halved). Furthermore, static redundancy of all traffic may not be the most effective way to allocate transmission bandwidth since the relative importance of data transmission may depend on the current driving conditions. As an example, when the vehicle is moving slowly in an area heavy with pedestrians, the AV system may allocate more of the network's bandwidth for non-redundant transmissions (and consequently less bandwidth for redundant transmission) to enable more cameras to track a greater number of pedestrians. Since the vehicle is traveling at slow speeds, allocating less bandwidth for redundant transmissions may be acceptable because when a connection fault is detected, the vehicle may simply come to a halt. By contrast, highway driving (or other high-speed driving) would likely require a higher level of redundancy in the network because successful transmission of commands and data is more critical due to the high speed. As such, more of the network's bandwidth may be allocated for redundant transmissions and less for non-redundant transmissions. The lower bandwidth allotment for non-redundant transmission is acceptable in the high-speed driving scenario since less objects would have to be tracked.

In order to effectively tolerate component faults, particular embodiments of the AV system may dynamically configure the network to have appropriate redundancy depending on the driving conditions or anticipated needs of the vehicle. For example, the AV system may dynamically configure the network based on a determine a threshold speed for the vehicle (which may be determined based on one or more characteristics of an attention vector of the vehicle, described in further detail below). When the vehicle speed is higher than the threshold speed, the network may be configured to have all network traffic be redundant. In contrast, when the vehicle speed is less than the threshold speed, the network may be configured to have a subset of network traffic, rather than the entire network traffic, be redundant. In particular embodiments, redundant transmissions may be transmitted during the scheduled segments of each transmission cycle. To ensure sufficient bandwidth is available for redundant transmissions, the AV system may configure the scheduled segments to be above a particular duration and configure the network to have all scheduled traffic for redundant transmission fully utilize the bandwidth.

Furthermore, in order for the control system of AV to be tolerant to any single fault, particular embodiments of the AV system may implement a consensus protocol so that the actuation of a particular action (e.g., stopping, accelerating, decelerating, turning, etc.) is decided based on the consensus of multiple components (e.g., computers, sensors, and actuators, each of which may be referred to as a node in the network) rather than a single component. In particular embodiments, the network may have densely-connected node so that those nodes can communicate directly with each other without intervention from a central computer. Based on the consensus protocol, which will be described in further detail below, three or more connected nodes may share their respective computations or decisions and reach a consensus (e.g., based on majority or plurality vote) on the appropriate response to a given event or some aspects of the system state.

Particular embodiments further enable vehicles to have faster/shorter response times through adjustable transmission cycles. As previously discussed, data transmitted through the network may have latency due to congestion. Particular embodiments of the AV system mitigate congestion latency by implementing a transmission schedule in which the transmitting nodes have respective scheduled time segments in each transmission cycle for data transmission. Each transmission cycle may also have unscheduled segments that may be used by any nodes to transmit data. The unscheduled network traffic may be prioritized so that high priority nodes, which may have more important information than low priority nodes, may transmit data before the low priority nodes. Depending on current driving conditions, the transmission cycle may be shortened or lengthened. As an example, when the vehicle is driving slowly through an area heavy with pedestrians, it would be more important to ensure that data relating to pedestrian detection are successfully and promptly communicated. To that end, particular embodiments of the AV system may allocate more unscheduled bandwidth to more cameras to track a greater number of pedestrians. The allocation of more unscheduled bandwidth would result in lengthier transmission cycles, which in turn would result in an increased delay between each component's "turn" for transmitting data during the scheduled time segments. However, since the vehicle is driving slowly, the added delay would be acceptable and a worthwhile tradeoff for having more unscheduled bandwidth available for transmitting data associated with pedestrian detection. In contrast, highway driving (or other high-speed driving) may require tracking comparatively fewer objects, which means that there is less need for having unscheduled bandwidth available for object detection. However, since the vehicle is traveling at high speeds, having fast response time becomes much more critical. Thus, when the vehicle is traveling at high speeds, particular embodiments of the AV system may shorten the transmission cycle by reducing the amount of unscheduled bandwidth, thereby increasing the frequency of each component's turn for transmitting data during the scheduled time segments. In other words, the maximum wait time for each component's transmission turn is reduced, thus allowing the vehicle to be more responsive.

The dynamically configurable network, which is introduced above and described in more detail below, provides several advantages. The dynamically configurable network is a lower cost system compared to systems with fixed duplicating routes because the dynamically configurable system limits the need for physically duplicated hardware. Being dynamically configurable, the network is able to provide appropriate redundancy for the nodes depending on a variety of driving conditions while keeping the cost of the system relatively low. Particular embodiments of the control system of the AV further improves safety because of improved tolerance to component faults. The redundancy in the network allows the AV system to transmit data along redundant routes so that the data can reach their intended destinations even when transmission through a subset of the redundant routes fails. Safety is further improved by implementing the consensus protocol, which enables the AV system to make decisions based on the consensus reached by multiple nodes, rather than relying on just one. These and other benefits of the dynamically configurable network would be further emphasized and become apparent in the following descriptions.

In particular embodiments, the AV may include one or more sensors of various and complementary types to capture information of the external environment of the AV. Successful and safe navigation of an AV depends on having a control system to reliably provide control and navigation commands to the various components of the AV performing the driving functions of the AV (e.g., steering, acceleration, or braking). Successful and safe navigation of an AV minimizes the number of interventions that arise from hardware failures and perception failures within the constraints of the control system. As used herein, the term "intervention" refers to an event during autonomous operation of a vehicle that requires human intervention (e.g., taking control of the steering wheel or braking) or results in a collision or accident. For example, in the case of an AV with a human safety driver, an intervention is when the human driver (whether seated in the vehicle or controlling the vehicle remotely) has to manually take control of the AV from the autonomous driving system. Hardware failure (e.g., navigation computer crashes) may be a cause of intervention, and having a redundancy architecture in the control system could prevent needing an intervention (e.g., by a human driver) in the event of a hardware failure. A "perception" failure, as used herein, arises from inadequacy of the control system (e.g., cameras having incomplete coverage or inadequate LiDAR sensors) to detect an obstacle leading to a collision.

Cost of computing components in a control system scales proportionally to the amount of power consumed. A robustly designed control system has the fewest interventions and is consistent with the constraints of the control system. One of the primary constraints of the control system is the amount of power (in watts) that is available to the control system. As described in more detail below, the control system has one or more redundant computing components that may assume control of determining navigation control instructions in the event of a hardware failure. A suboptimal allocation of power between the redundant computing systems may result in a control system that is, for example, twice as expensive for a given number of interventions. Typical control systems are designed to address particular types of failures. Particular embodiments described herein relate to designing a control system to optimize the power allocated to the redundant computing components within the constraint of the total power available to the AV. A trade-off may be determined that allocates the power (e.g., speed or processing power of each computer) allocated to each computer in the redundancy architecture in a manner that minimizes the number of likely interventions. As described in more detail below, an intervention-optimal allocation of power equalizes the marginal utility given the power constraint to determine the relative power consumption between the computing components of the control system.

A typical redundancy implementation of an AV control system provides no guarantee of correctness other than the control command is a decision decided by a majority of computing components, even in the presence of a faulty entity (e.g., a faulty computing component). While determining the majority decision may be based on the same computation being performed multiple times, doing so is computationally costly. Particular embodiments described herein relate to implementing the control system as an interactive-proof control system. As described in further detail below, to determine the majority decision in such a system, it is sufficient to have the redundant computing components (which may be allocated different amounts of power) calculate their respective control commands, and thereafter another component may select one of the control commands by computing certificates associated with the commands. Computing the validity of the certificate is less computationally expensive than performing a full computation. The certificate is verified and used to arbitrate which control command is accepted in a given control cycle. The certificates verify that the data was not corrupted, that the transmitting computing component had the correct sensor data available to do the controls calculation, and that the calculation performed by the computing components, based on data in the previous certificate, were correct within a certain bound.

Particular embodiments described herein help ensure that faulty and/or compromised data packets be detected and prevented from reaching target vehicle components. Also, in the event of a fault detection or network breach, a safety driver (e.g., a human driver, whether physically sitting in the autonomous vehicle or a remote location, who can manually take over control of the vehicle) should be notified of such event and manual control of the vehicle be passed to the driver to avoid any malfunctioning of the autonomous mode of the vehicle.

Particular embodiments described herein relates to systems, apparatuses, and methods for analyzing a communication network fabric/chain of an autonomous vehicle for any fault detection, ensuring a secured communication between various components of the vehicle, and signaling a safety driver to take over manual control of the vehicle in the event of a fault detection. In particular embodiments, bus guardians may be used to manage and ensure safety of an autonomous vehicle. The bus guardian may be a device attached to an actuator of the vehicle that selectively sends control signals/commands to an associated vehicle component (e.g., the vehicle's brakes, steering wheel control, camera sensor, etc.) to make it act or respond in a certain way. The bus guardian may be considered as a safeguard, a last validator, and/or a last line of defense in the communication network before commands reach the associated actuator. To ensure vehicle safety, the bus guardian may perform a variety of checks on incoming control signals/commands before relaying them to one or more vehicle components. If the bus guardian detects any faults in the incoming data during its checking (e.g., unauthorized source, validity not confirmed, signals/commands are not as per the defined configuration for the vehicle, etc.), the bus guardian may reject the data from sending to the one or more vehicle components. Additionally, in the event of a fault detection, the bus guardian may reroute control of the vehicle to the safety driver.

The following is an example list of non-limiting functions that may be performed by a bus guardian: (1) acting as a firewall to filter out data packets that may be faulty or compromised and stop them from reaching target components of the vehicle, (2) alerting a safety driver of the vehicle that there is some problem with the autonomous functioning of the vehicle and the driver should take over, (3) making a decision as to what the associated actuator should do or not do based on computation validations, (4) overriding vote(s) assigned by other components of the vehicle (e.g., a high-performance computer (HPC) or a high safety computer (HSC)) in case of a mismatch between its own vote and other votes beyond a certain threshold, (5) cryptographically encrypting and decrypting incoming data packets for secure communication, (6) adhering to assigned communication schedule(s)/segment(s) and/or priority, (7) translating packets received from two or more physically redundant networks (e.g., two ethernet networks) into one or more physically non-redundant networks (e.g., a controller area network (CAN) bus or a local interconnect network (LIN) bus), (8) provide a means for detecting safety driver interventions and safely disconnect the AV system from rest of the vehicle, and/or (9) provide a mechanism to access vehicle CAN and other packets for the purpose of logging the vehicle's activity on the HPC. These functionalities and other will be described in further detail.

FIG. 1 illustrates an example network system 100 which connects a number of nodes with a redundancy architecture. In particular embodiments, the AV system may include computers (e.g., 110A and 110B), switches (e.g., 122 and 124), bus guardians (BGs) (e.g., 132, 134, and 136), sensors (e.g., 144 and 146), actuators (e.g., 142), and other components. In particular embodiments, the computers (e.g., 110A and 110B) may include or may be coupled to one or more central processing units, memory, network interface controllers (NICs) (e.g., 112), camera interface devices (e.g., 114), graphical processing units (GPUs) (e.g., 116), and storage (e.g., 118). In particular embodiments, the computers (e.g., 110A and 110B) may be redundantly coupled to a number of switches (e.g., 122 and 124) through network interface controllers (e.g., NIC 112), camera interface devices (e.g., 114), or other interface devices. In particular embodiments, each switch may be connected to a number of BGs, which may be further connected to other components (e.g., sensors, actuators, cameras, or third-party components). In particular embodiments, the network may have a typology with physical redundancy similar to double-star networks. In particular embodiments, every node may be connected to two or more switches. For example, the BGs 132, 134, and 136, may each be connected to switches 122 and 124. The BG 132 may be connected to the actuator 142. The BGs 134 and 136 may be connected to the sensor 144 and 146, respectively. In particular embodiments, the switches (e.g., 122 and 124) may be connected to each other and may communicate with each other through these connections. In particular embodiments, the switches (e.g., 122 and 124) may appear as actuator in the network system and may receive transmission schedule from the computers (e.g., 110A or 110B) as one of its actuation degrees of freedom. In particular embodiments, the network system 100 may also be referred as network fabric.

In particular embodiments, the AV system may include a high-performance computer (HPC) 110A and a relatively lower-performance computer (e.g., a high-safety computer or HSC) 110B. In particular embodiments, HSC 110B may provide redundant capabilities (e.g., perception and control) for HPC 110A. In particular embodiments, HSC 110B may provide a subset of the perception and control capabilities of HPC 110A. As an example and not by way of limitation, HSC 110B may be capable of only providing navigation while the AV is on the highway. In particular embodiments, HSC 110B may be further divided into tertiary and quaternary computing components depending on a required amount of redundancy. In particular embodiments, HPC 110A, HSC 110B, and BG 132 may be synchronized to each other and intermittently receive data from sensors (e.g., 144 or 146). In particular embodiments, as described in more detail below, HPC 110A and HSC 110B may each compute a control command along with a corresponding certificate. In particular embodiments, BG (e.g., 132) may verify the certificate and use the certificate to arbitrate which control command to accept for transmission to actuators (e.g., 142) in a given control cycle.

In particular embodiments, BGs may serve as intermediary for coordinating the connected components for data transmission. In particular embodiments, BGs may be a node in the network and may serve multiple functions. As discussed elsewhere herein, bus guardians 132 may convert data packets received through ethernet into CAN or LIN signals, allow time sensitive communications between components (e.g., each bus guardian may only communicate during designated times slots), allow communications to actuators (e.g., 142) or sensors (e.g., 144 and 146) be cryptographically authenticated, and safeguard the actuators. In the context of a redundancy system where control commands may be determined by multiple computing components (e.g., HPC 110A and HSC 110B), BGs (e.g., 132) may serve as arbitrators to determine which control command to adopt. In other words, BGs (e.g., 132) may cast their own votes to determine which control command to use.

In particular embodiments, BGs (e.g., 132, 134, and 136) may be configured to selectively send control signals, commands, and/or instructions (also interchangeably referred to herein as data packets) to various components of an autonomous vehicle to make them respond in a certain way. For example, the bus guardian 134 may send a command to a sensor 144, which may be a brake actuator, to apply brakes or bring the vehicle to a complete stop. As another example, the bus guardian 136 may send a command to a sensor 146, which may be a steering control sensor of the vehicle, to turn the vehicle into a particular direction. In some embodiments, a bus guardian may receive these control signals, commands, and/or instructions from one or more components of the vehicle. For example, the bus guardian 132 may receive control signals from one or more computers (e.g., 110A and 110B) and/or other bus guardians (e.g., 134 and 136) of the vehicle, etc. Continuing this example, the sensor may be cameras and each of cameras may have captured a field of view or an image of its surroundings, and this image data may be sent to the BG 134 in order to actuate a particular vehicle component, such as the sensor 144. In particular embodiments, the BGs may receive/transmit signals or commands via two or more physically redundant networks. For instance, as shown in FIG. 1, each of the BGs may receive signals from two ethernet switches 122 and 124 such that if one of the switches fails, the BGs may receive/transmit signals from the other.

In particular embodiments, each of the BGs in the network system 100 may serve as a safeguard just before a signal/command is allowed to actuate a particular vehicle component. To ensure vehicle safety and secure communication, the BGs may be located at the very end of the network fabric chain and act as a firewall by performing a variety of checks on incoming control signals/commands before relaying them to the associated vehicle component. If validation fails, the BGs may reject the control signals/commands and/or transfer control of the vehicle to a safety driver, as discussed further below. Once the BGs confirm that the incoming signals/commands are valid, the BGs may forward these signals to the associated vehicle component via one or more non-redundant networks or communication buses. By way of non-limiting examples, the bus guardian 132 may send incoming control signals/commands to the actuator 142 via an ethernet network, the bus guardian 134 may send incoming control signals/commands to the sensor 144 via a controller area network (CAN) bus, and the bus guardian 136 may send incoming control signals/commands to the sensor 146 via a local interconnect network (LIN) bus. In this way, a BG functions as a translator where the BG takes input on two physically redundant networks (e.g., two ethernet networks) and consolidate them into one physically non-redundant network (e.g., a CANbus or a LINbus).

In particular embodiments, the storage 118 may be mass storage for the computer. The computer 110A may be coupled to the NIC 112, the camera interface device 114, the GPU 116, and storage 118 through one or more PCI express (PCIe) interfaces. In particular embodiments, the NIC 112 may be a 40G ethernet network interface controller with IEEE standards of 802.1Q, 802.1CB, or 1588v2. The NIC 112 may include multiple ethernet ports with certain bandwidth, for example, 40 Gbit per second (Gbps). The NIC 112 may include the modules or components for enabling the functionalities including, but not limited to, redundancy, encryption, authentication, or timing (e.g., fast BGs).

In particular embodiments, the switches 122 and 124 may be ethernet switches with multiple input and output ports with different bandwidths (e.g., 40 Gbps, 10 Gbps, or 1 Gbps). In particular embodiments, the NIC 112 may be connected to the switches 122 and 124 with 40 Gbps connections through the 40 Gbps ethernet ports, respectively. In particular embodiments, the camera interface device 114 may be connected to the switches 122 and 124 with 10 Gbps connections through the 10 Gbps ethernet ports, respectively. In particular embodiments, the BGs may have multiple ports of different type and bandwidths including, for example, but not limited to, ethernet ports with 1 Gbps bandwidth, CAN port, or LIN ports. In particular embodiments, the switches 122 and 124 may be connected to the BGs 142, 144, and 146, respectively, through ethernet ports with 1 Gbps bandwidth. In particular embodiments, the BGs may include modules or components for enabling the functionalities including, but not limited to, redundancy, encryption, authentication, or timing. In particular embodiments, the BGs may be according to IEEE standards of 802.1Q, 802.1CB, or 1588v2. In particular embodiments, the BGs may be connected to their respective sensors or actuators through its ports such as ethernet ports, CAN ports, or LIN ports. In particular embodiments, some BGs may be connected to their respective sensors, actuators, and switches, and some other BGs may be connected to their respective switches only without being connected to sensors or actuators. As an example and not by way of limitation, the BG serving as a timing board with the GPS-disciplined 1588 master modules may be connecting to their respective switches only.

In particular embodiments, the network of the AV system may be a communication network organized according to some IEEE standards including, for example but not limited to, IEEE 802.1Q, 802.1CB, or 1588v2. In particular embodiments, the network may include a number of switches (e.g., 122, 124), BGs (e.g., 132, 134, 136), NICs (e.g., 112), camera interface devices (e.g., 114), and other components. In particular embodiments, the BGs may enable the existing actuators, sensors, and computers to communicate with each other without moving too much communication functionalities onto the endpoint components themselves.

In particular embodiments, one or more components (e.g., sensors, actuators, cameras, BGs, or computers) in the network may be referred as a node, which may transmit data to other nodes or/and receive data from other nodes through the network. As an example and not by way of limitation, a node may include the sensor 144 which may be an image sensor generating and transmitting image data through the network to the computer 110A. The BG 134 may transmit the data for the image sensor 144 in the network and may coordinate with other BGs (e.g., 132 and 136) in the network for the transmission. As an example and not by way of limitation, a node may include an actuator (e.g., 142) for braking the vehicle and the actuator may receive commands for the central computer through the network. The actuator 142 may receive commands through the connected BG 132 which may coordinate the transmission with other BGs (e.g., 134 and 136) in the network. In particular embodiments, a node which transmits data to other nodes may be referred a talker and a node which receives data from other nodes may be referred as a listener. In particular embodiments, talker and listener may be a relative to other nodes. For example, the computers 110A and 110B may be listeners when they receive data from sensors and may be talkers when they send commands to actuators or switches.

In particular embodiments, the network may be dynamically configured to provide different routing paths for the data transmitted between the nodes of the network. In particular embodiments, the network may be configured to have redundancy for the connections of the nodes. Data may be transmitted between the nodes along different routing paths provided by the network. As an example and not by way of limitation, a first route for the sensor 144 may include the BG 134 and the switch 122. The data from the sensor 144 may be transmitted through the BG 134 and the switch 122 to the computer 110A. As an example and not by way of limitation, a second route for the sensor 144 may include the BG 134 and the switch 124. The data from sensor 144 may be transmitted through the BG 134 and the switch 124 to the computer 110A. In particular embodiments, the transmission schedule for scheduled network traffic and the priority for unscheduled network traffic may be implemented on BGs (fast and regular types) and switches. In particular embodiments, the BGs may make sure not to transmit data outside their turns according to the current configuration and the switches may use gates to prevent the transmission of data or messages from a given talker to a given listener outside the allocated turns according to the current configuration. Although this disclosure illustrates and describes the network system that are configured in a particular manner, this disclosure contemplates any suitable network system for autonomous vehicle that are configured in any suitable manner.

In particular embodiments, the AV system may include a variety of inter-networked sub-systems, modules, or components. In particular embodiments, the inter-networked sub-systems, modules, or components may fall into categories of sensors, actuators, or computers. In particular embodiments, the AV system may include, for example, but are not limited to, a central computer, sensors, actuators, cameras, LiDAR systems, RADARs, ultra sound systems, a global positioning system (GPS), inertial measurement units, accelerometers, gyroscopes, odometer systems, or other related systems.

Figure 2:
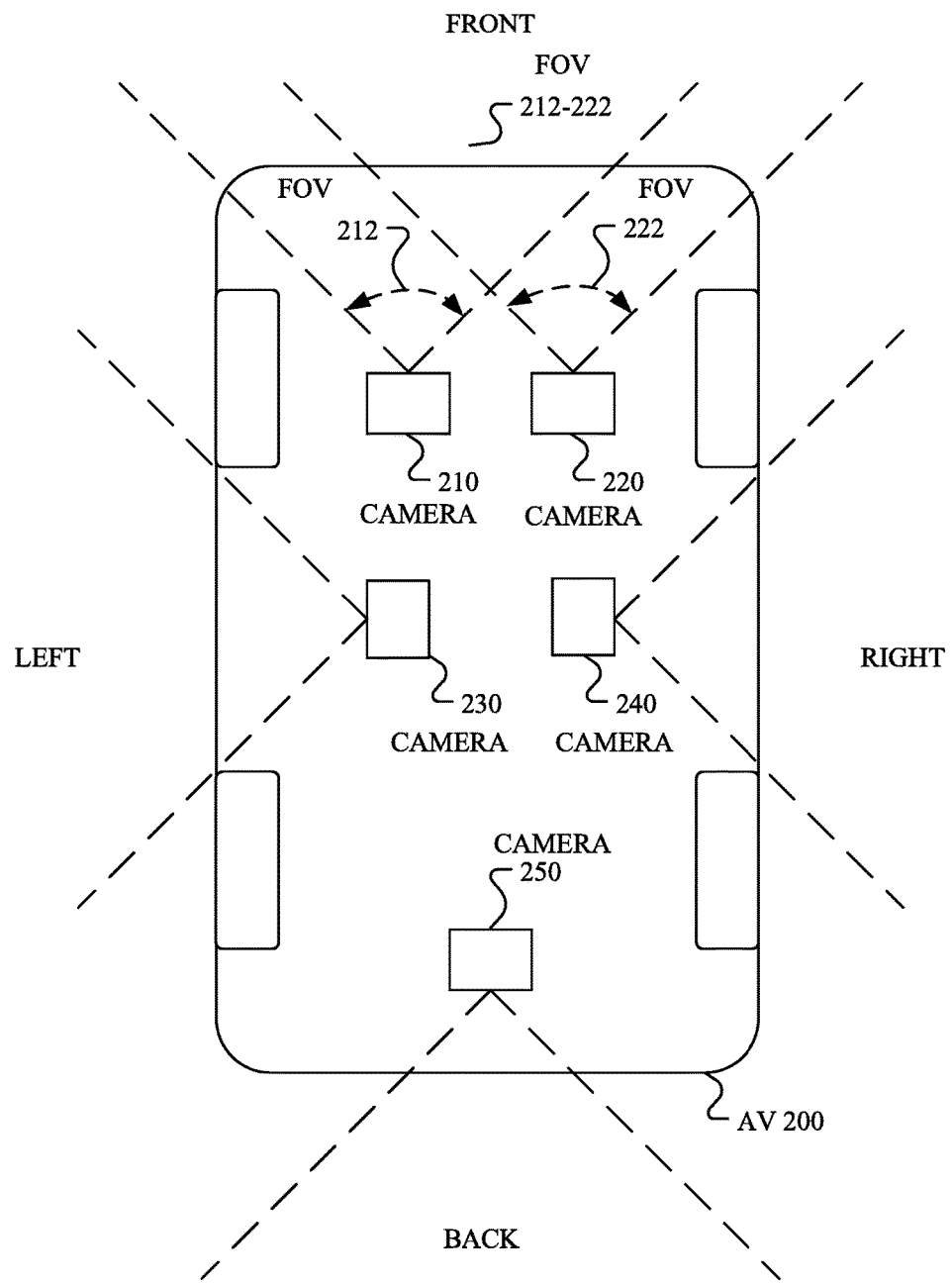
FIG. 2 illustrates an example camera system which includes multiple cameras facing different directions around an autonomous vehicle.

FIG. 2 illustrates an example camera system which includes multiple cameras facing different directions around an autonomous vehicle. In particular embodiments, the AV 200 may include a number of cameras (e.g., 210, 220, 230, 240, 250) for capturing images of the surrounding environments. In particular embodiments, the cameras may be configured to face different directions of the vehicle. For example, the cameras 210 and 220 may face toward the forward direction of the vehicle. The cameras 230 and 240 may face toward the left and right sides of the vehicle, respectively. The camera 250 may face toward the rear direction of the vehicle. In particular embodiments, the cameras may face any suitable directions of the AV. In particular embodiments, the cameras may be connected to the central computer through the network of the AV system. In particular embodiment, the cameras may be connected to each other through the network of the AV system.

In particular embodiments, the camera system may include any number of individual camera or stereo camera pairs. In particular embodiments, each camera may have its respective field of view (FOV) in a certain direction of the vehicle. For example, the camera 210 may have the FOV corresponding to the area 212 and the camera 220 may have the FOV corresponding to the area 222. In particular embodiments, two cameras may have shared overlapping area in their FOVs (e.g., the area 212-222) for stereo perception of objects. In particular embodiments, the cameras of the AV may have the FOVs collectively covering all the directions of 360° panoramic view surrounding of the vehicle.

In particular embodiments, the camera system may include any number of cameras the AV needs. In particular embodiments, the cameras may be installed at the top of the vehicle in a row facing different directions. In particular embodiments, the cameras may be installed at different locations of the AV. In particular embodiments, the camera system may include different type of cameras, for example, cameras for daylight and infrared for night images. Although this disclosure illustrates and describes the camera system that are configured in a particular manner, this disclosure contemplates any suitable camera system for autonomous vehicle that are configured in any suitable manner.

In particular embodiments, the AV system may dynamically change the configuration (e.g., transmission schedule) of the network connecting the AV nodes to accommodate different driving conditions and anticipated needs. In particular embodiments, the AV may determine an attention vector of the vehicle which may include one or more vectors being associated with respective driving conditions. In particular embodiments, the driving conditions may include, but are not limited to, a speed of the vehicle, a predicted speed of the vehicle, a location of the vehicle, a predicted location of the vehicle, a position of the vehicle, a predicted position of the vehicle, amount of vehicle traffic, pedestrian traffic, a pedestrian density, a location with pedestrians exceeding a certain threshold or a location with the most number of pedestrians, a location requiring heightened alert (e.g., road-work zone, school zone, etc.), a speed of a fastest-moving object in the FOV, or any other suitable condition that may require attention or a shorter response time.

In particular embodiments, the AV system may determine a vector for the driving condition that requires attention or a shorter response time. In particular embodiments, the attention vector may be a speed vector of the vehicle under different driving conditions or vehicle operations, such as, driving straight forward, slowing down at a stop sign, or making a turn. In particular embodiments, the attention vector may include one or more vectors, for example, but not limited to, a speed vector of the vehicle, a predicted speed vector of the vehicle, a location vector of the vehicle, a predicted location vector of the vehicle, a position vector of the vehicle, a predicted position vector of the vehicle, a vehicle traffic vector, a pedestrian traffic vector, a pedestrian density vector, an adversity vector of one or more environmental conditions, a speed vector of a fastest-moving object in a field of view, or a vector associated with a condition that requires a shorter response time. In particular embodiments, the AV system may dynamically configure the communication network by adjusting the scheduled and unscheduled segments in each transmission cycle based at least in part on the attention vector associated with different driving conditions of the vehicle, as described in further detail below.

Figure 3:
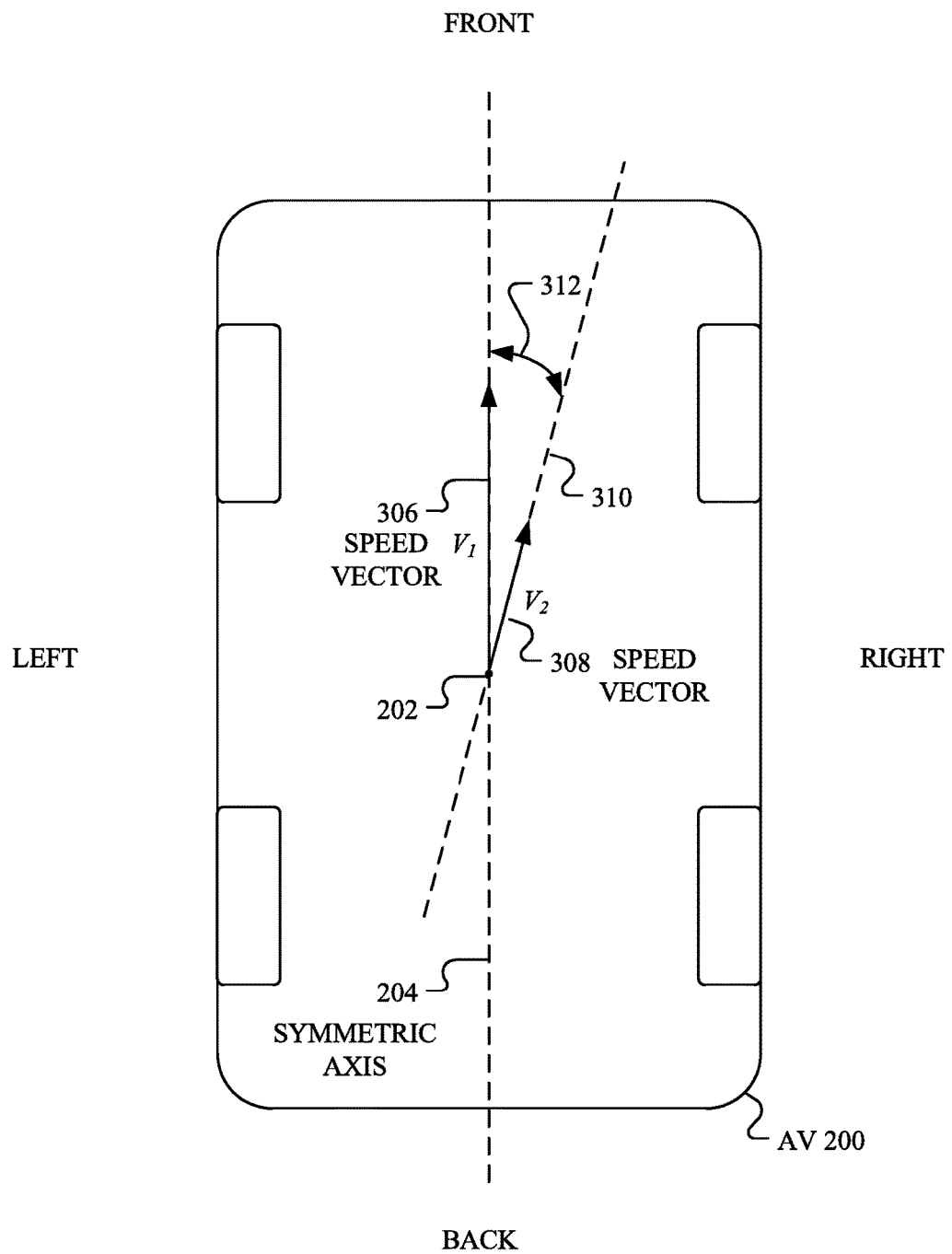
FIG. 3 illustrates two example speed vectors of an autonomous vehicle.

FIG. 3 illustrates two example speed vectors of an autonomous vehicle. In particular embodiments, the AV system may determine a speed vector of the vehicle corresponding to the vehicle speed. As an example and not by way of limitation, the speed vector 306 of the vehicle may have a length of $V_1$ which corresponds to the velocity of the vehicle. The speed vector 306 may have a direction pointing forward corresponding to the moving direction of the vehicle along the vehicle symmetry axis 204. The graphic representation of the vector 306 may include an arrow line starting from the reference point 202 and extending to a distance corresponding to the vector length $V_1$ pointing forward along the symmetry axis 204 of the vehicle. In particular embodiments, the reference point 202 of the speed vector may be the geometric center point of the AV 200. In particular embodiments, the reference point of the speed vector may be any point associated with the AV 200 that has a fixed relative position with the rest parts of the AV 200 and the speed vector direction may be along any line parallel to the vehicle symmetry axis 204.

As an example and not by way of limitation, the speed vector 308 may have a length $V_2$ which corresponds to the velocity of the vehicle. The speed vector 308 may have a direction corresponding to the moving direction of the vehicle. The direction of the speed vector 308 may point to the forward-right direction along the line 301 which may have an angle 312 with respective to the vehicle symmetry axis 204. In particular embodiments, the speed vector 306 may represent a driving condition in which the AV drives forward with a relatively higher velocity $V_1$. In particular embodiments, the speed vector 308 may represent a driving condition in which the AV drives toward a forward-right direction with a relatively lower velocity $V_2$. The speed vectors 306 and 308 are for illustration purpose only and the speed vector of the vehicle is not limited thereof. The speed vector of the vehicle may have any length corresponding to any reasonable velocity of the vehicle. The speed vector of the vehicle may point to any possible direction toward which the vehicle moves. Although this disclosure illustrates and describes the speed vector in a particular manner, this disclosure contemplates any suitable speed vector for autonomous vehicle in any suitable manner.

Figure 4A:
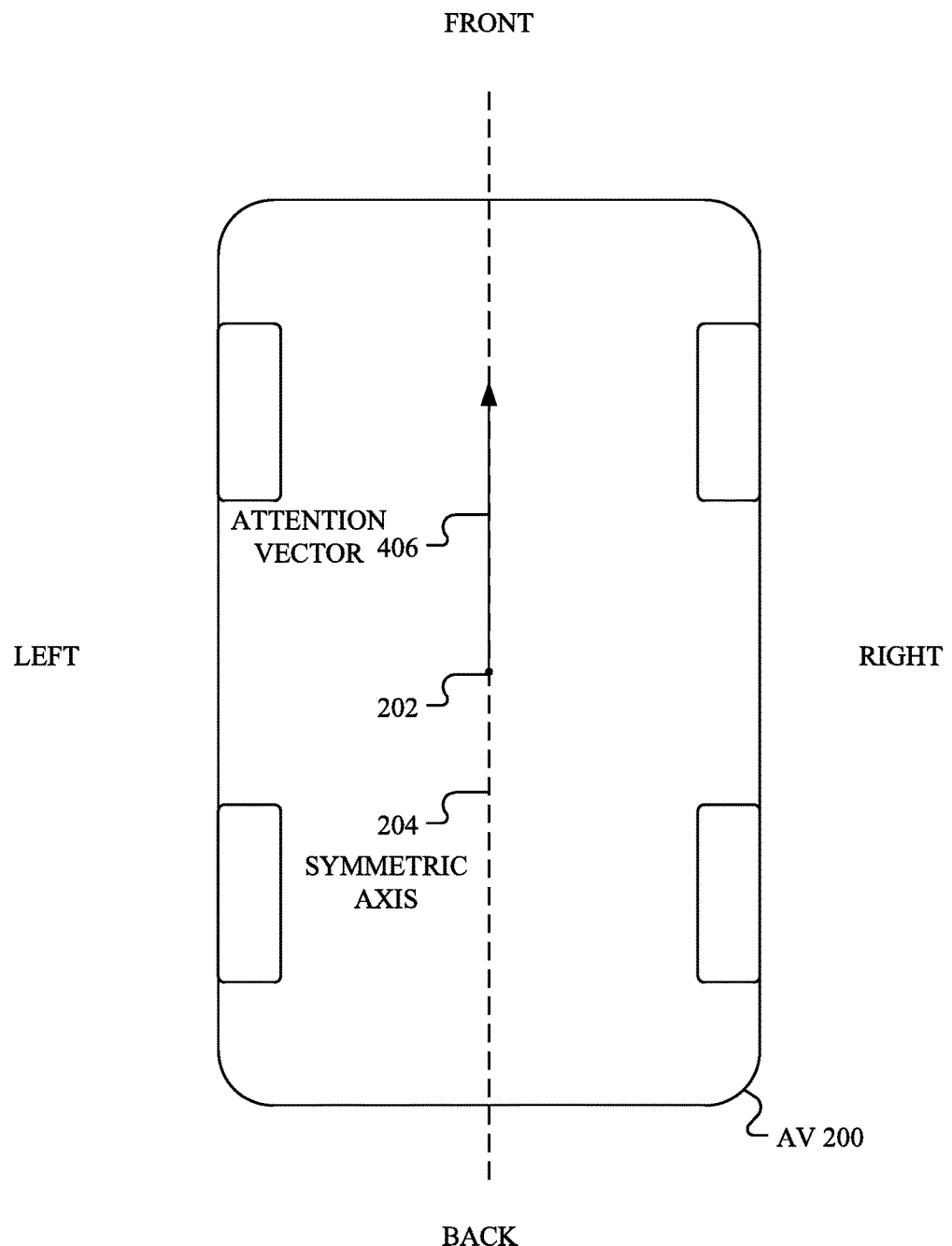
FIG. 4A illustrates an example attention vector when the vehicle moves straight forward.

FIG. 4A illustrates an example attention vector 406 when the vehicle moves straight forward. In particular embodiments, the attention vector 406 may indicate the direction or area which requires attention from the AV system and may indicate to what extent the attention is required. The direction of the attention vector 406 may indicate the direction that needs attention from the AV system. The length of the attention vector 406 may indicate the amount of attention or the magnitude of interest that is demanded. In particular embodiments, the attention vector 406 may be a speed vector of the AV. As an example, the attention vector 406 may indicate that forward direction is the direction that the AV system should mostly pay attention under these driving conditions. The length of the attention vector 406 may correspond to the velocity of the vehicle. For the attention vector 406, the graphic representation may start from the reference point 202 and extend for a distance corresponding to the length of the attention vector 406 pointing to the forward direction along the symmetry axis 204 of the AV 200. The reference point 202 may be the geometric center of the AV 200.

In particular embodiments, the attention vector 406 may be used to determine the resource allocation in the AV system. In particular embodiments, the attention vector 406 may be used to determine the allocation of scheduled time periods that are dedicated to particular nodes in the communication network. In particular embodiments, the attention vector 406 may be used to determine the priority for the unscheduled network traffic for non-scheduled nodes. In particular embodiments, the attention vector 406 may be used to determine the nodes that are relevant to the current attention vector 406 or area of interest and to have their data transmitted during their respective dedicated time slots. As an example and not by way of limitation, the cameras (e.g., 210, 220 in FIG. 2) facing toward the front of the vehicle may be more relevant to the attention vector 406, and therefore may get longer scheduled time periods or higher priority for data transmission in the communication network. The cameras (e.g., 250) that face rearward of the vehicle may be less relevant to the attention vector 406, and therefore may get relatively smaller amount of time with shorter scheduled time periods or lower priority for data transmission in the communication network under these driving conditions. In particular embodiments, as the vehicle drives around, and the attention vector 406 moves with the vehicle, the scheduled time periods may be dynamically allocated for the nodes with less or more time. Although this disclosure illustrates and describes the attention vector 406 being oriented in a particular manner, this disclosure contemplates any suitable orientation of the attention vector 406.

Figure 4B:
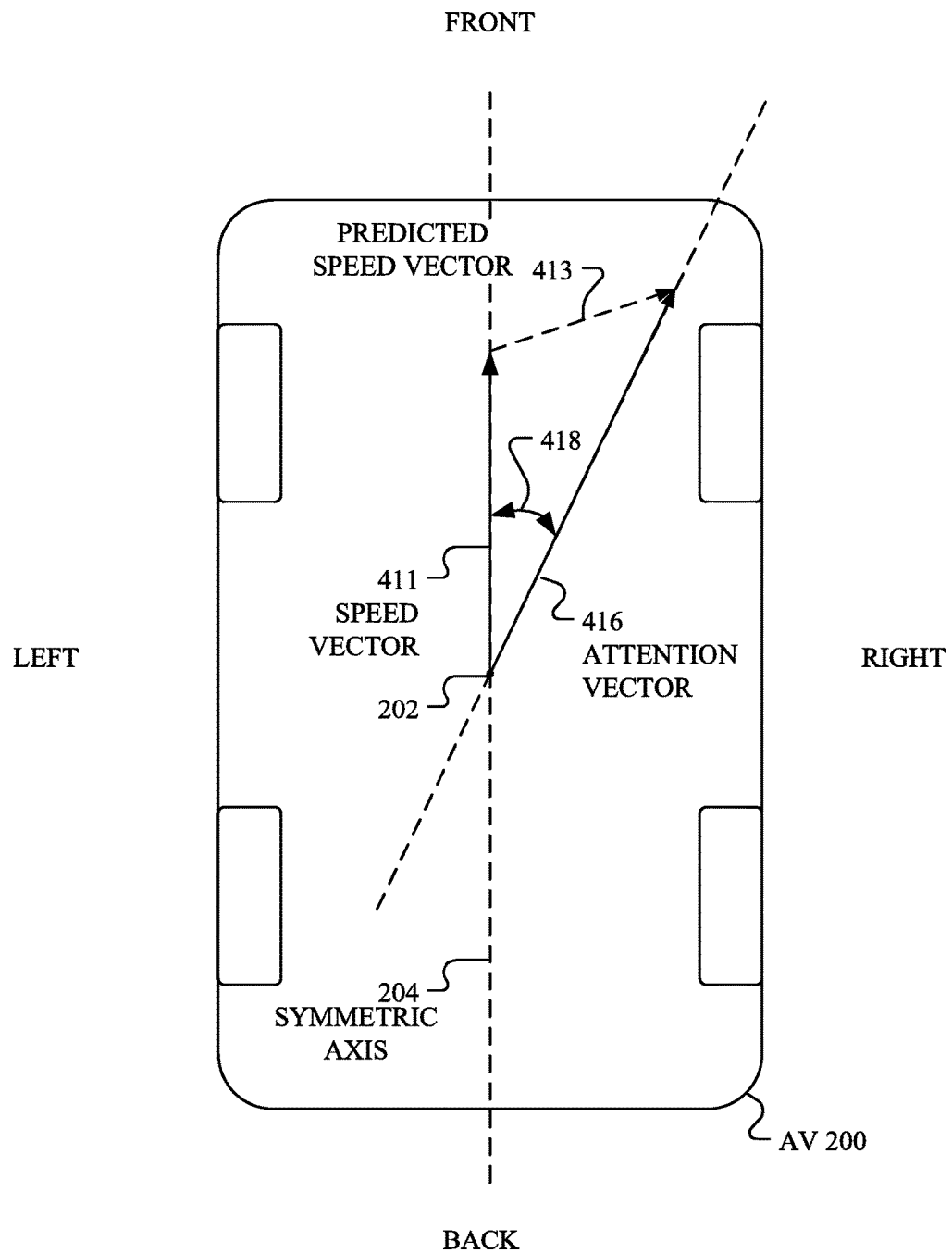
FIG. 4B illustrates an example attention vector before the vehicle makes a turn.

FIG. 4B illustrates an example attention vector 416 before the vehicle makes a turn. In particular embodiments, the attention vector 416 of the vehicle may include the current speed vector modified by a predicted speed vector corresponding to the predicted speed of the vehicle in a short amount of time (e.g., 1 millisecond, 1 second, 3 seconds, etc.). As an example and not by way of limitation, the speed vector 411 may correspond to the current speed of the vehicle when the AV system anticipates a right turn in a short amount of time (e.g., from 1 millisecond to several seconds). The speed vector 413 may correspond to the predicted speed vector for the anticipated right turn in the short amount of time (e.g., from 1 millisecond to several seconds). The speed vector 413 may have an angle 418 to the speed vector 411. In some embodiments, the attention vector 416 may be determined by combining the current speed vector 411 and the predicted speed vector 413 using weighted vector addition. In particular embodiments, the attention vector $\vec{v}_{att}$ may be determined by combining a current speed vector $\vec{v}_c$ and a predicted speed vector $\vec{v}_p$ using $\vec{v}_{att} = \vec{v}_c + \delta \cdot \vec{v}_p$, wherein the $\delta$ may be a factor for the weighted vector addition.

In particular embodiments, the AV system may determine the resource allocation to particular nodes (e.g., cameras, sensors, LiDAR system, RADARs, ultra sound system, GPS, inertial measurement units, accelerometers, gyroscopes, odometer system) in the communication network based on the relevance between the nodes and the attention vector. As an example and not by way of limitation, the camera (e.g., 240 in FIG. 2) facing to the right side of the AV 200 may be more relevant with the attention vector 416 than the camera (e.g., 230 in FIG. 2) facing to the left side of the vehicle. The camera facing to the right side of the vehicle may be given more resources (e.g., time, bandwidth, duration within each transmission cycle) for transmitting data in the communication network when the vehicle anticipates to a right turn in a short amount of time. Although this disclosure illustrates and describes the attention vector 416 being oriented in a particular manner, this disclosure contemplates attention vectors having any orientation.

Figure 4C:
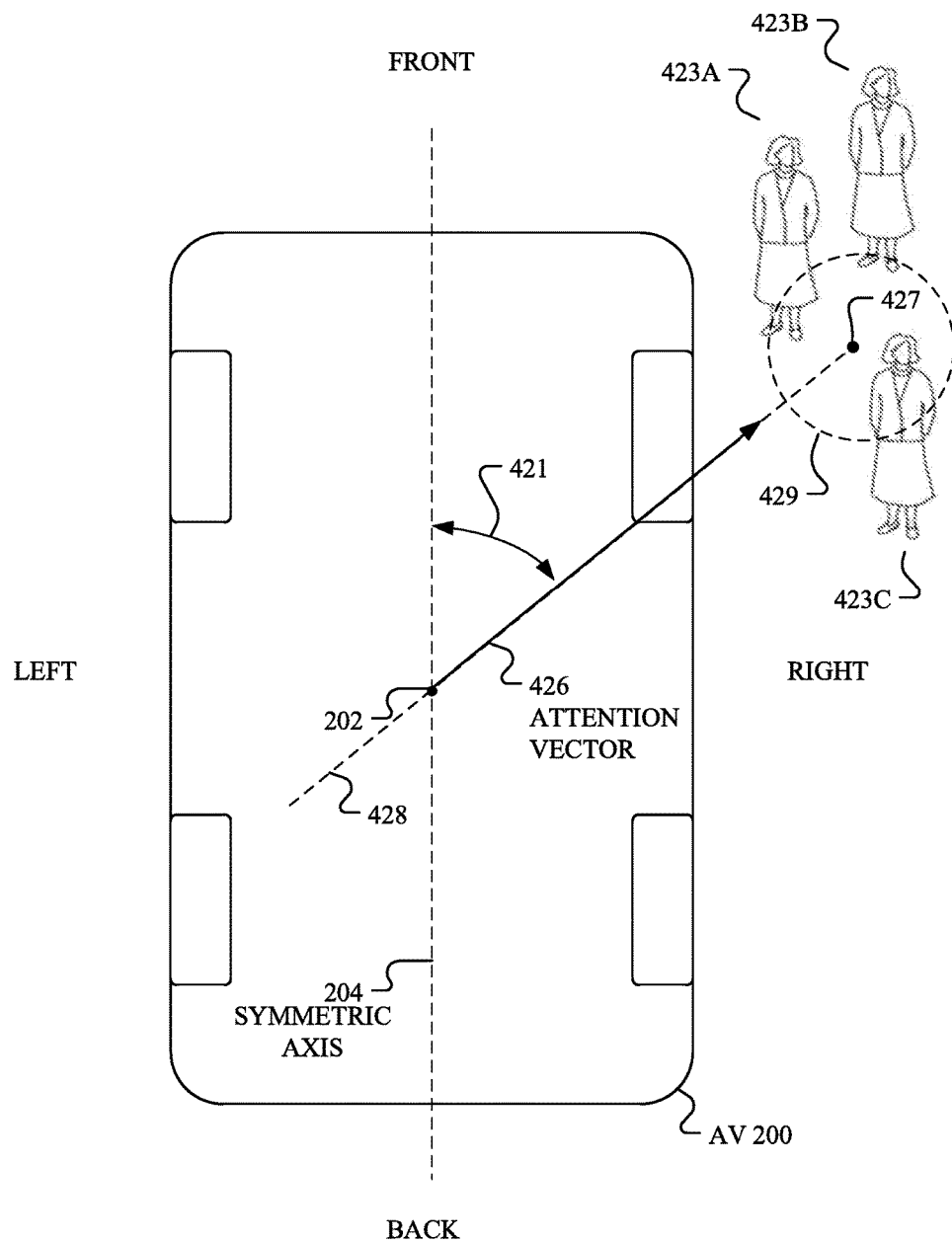
FIG. 4C illustrates an example attention vector for a location of an area with the most number of pedestrians.

FIG. 4C illustrates an example attention vector for a location of an area with the most number of pedestrians. In particular embodiments, the AV may drive on a street or in an area which is shared by vehicles and pedestrians. The AV may be traveling in an area with a threshold number of pedestrians (e.g., 1, 5, 10), which require attention from the AV system. In particular embodiments, the AV system may determine the attention vector based on the pedestrian density near the vehicle, which may be determined based on object-recognition techniques and sensor data (e.g., data from cameras, heat sensors, radio frequency antennas, etc.). In particular embodiments, the AV system may determine the attention vector based on the location of the area having the most number of pedestrians near the vehicle. As an example and not by way of limitation, the AV 200 may be accompanied by a number of pedestrians (e.g., 423A, 423B, 423C) around the AV 200. The AV system may determine an area 429 with the highest density of the pedestrians and calculate the attention vector 426 based on the location of the area 429 and the density of the pedestrians. The attention vector 426 may point to the highest pedestrian density area whose location may be represented by its center point 427, along the line 428. The attention vector 426 may have an angle 421 to the symmetry axis 204 of the AV 200. The length of the attention vector, which corresponds to the amount of attention that is required, may be determined based on the density of the pedestrians and/or the distance of the pedestrians to the AV 200. For example, an area with a higher pedestrian density may require more attention than an area with relatively lower pedestrian density when the AV 200 is near to these areas at the same time. As another example, pedestrians that are closer to the AV 200 may require more attention than pedestrians that are relatively farer to the AV 200. In particular embodiments, multiple attention vectors (not shown) may be used to identify every surrounding region in which a pedestrian is detected, regardless of density. In some embodiments, the length of each of the multiple attention vectors may depend on the level of density of pedestrians in each respective area associated with each of the multiple attention vectors.

In particular embodiments, the attention vector direction may be determined not only by the density of the pedestrians but also other factors like the characteristics (e.g., ages, ability to move, moving speed, anticipated motion of pedestrians) of the pedestrians. As an example and not by way of limitation, a small group of young children may require more attention than a larger group of adults (e.g., image-recognition technology may be used to distinguish children from adults). As another example and not by way of limitation, a pedestrian in a wheelchair (e.g., detected using image-recognition technology) may require more attention than a group of walking pedestrians because the pedestrian in the wheelchair may be less mobile and move slower than the other pedestrians. As another example and not by way of limitation, a group of fast-moving pedestrians (e.g., determined using on object tracking technology) may require more attention than a group of slowly moving pedestrians.

In particular embodiments, the AV system may determine the direction of travel by anticipating the motion and path of vehicle. The direction of travel may be indicated by a travel vector or an attention vector. In particular embodiments, the system may determine a predicted travel path of the vehicle from the current moment until a certain amount time later (e.g., from 1 millisecond to several seconds). The AV system may require less accurate information about objects that are not in the direction of travel. As an example and not by way of limitation, when the AV anticipates a right turn, the pedestrian on the right side of the vehicle may be on the anticipated path of the vehicle and require more attention because that is where the vehicle is moving toward. The AV system may allocate more resources for cameras pointing to right side of the vehicle and allocate less resources for cameras that are pointing away from the anticipated vehicle path.

In particular embodiments, the AV system may determine the resource allocation to particular nodes (e.g., cameras, cameras, sensors, LiDAR system, RADARs, ultra sound system, GPS, inertial measurement units, accelerometers, gyroscopes, odometer system, etc.) in the communication network based on the attention factor determined based on the nearby pedestrians. As an example and not by way of limitation, the cameras (e.g., 220, 240 in FIG. 2) facing in the forward and right directions of the AV 200 may be more relevant to the attention vector 426, which points to forward-right direction as illustrated in FIG. 4C, and get more resources for data transmission than the cameras (e.g., 230, 250 in FIG. 2) facing to left and back directions of the AV 200.

Figure 4D:
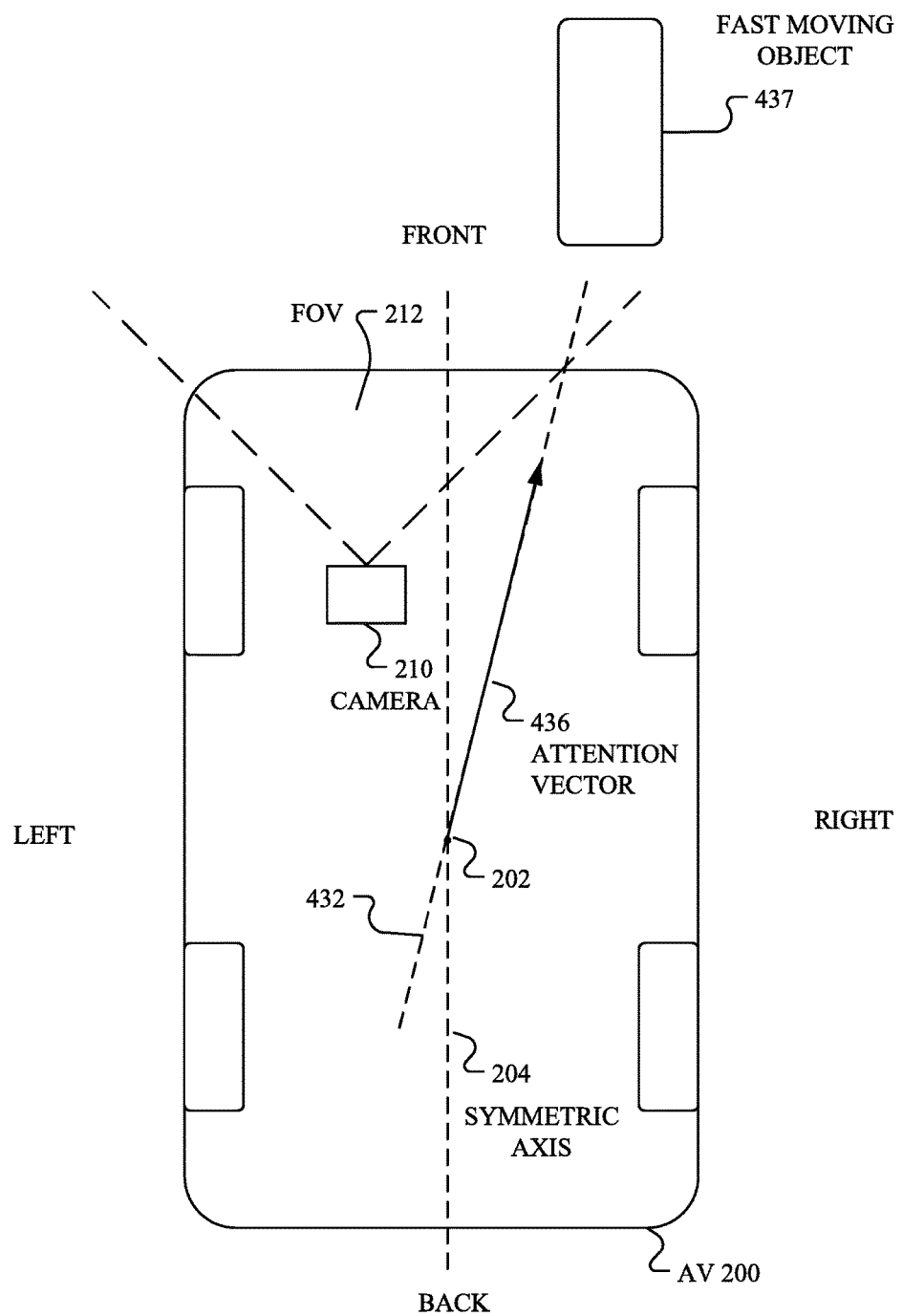
FIG. 4D illustrates an example attention vector for a fastest-moving object within the field of view of the vehicle.

FIG. 4D illustrates an example attention vector for a fastest-moving object within the field of view of the vehicle. In particular embodiments, the AV system may determine the attention vector based on the fastest-moving object (e.g., a motorcycle) in the FOV of the cameras of the vehicle. In particular embodiments, the fastest-moving object may require the more attention than other objects near the vehicle. As an example and not by way of limitation, the AV 200 may drive on a highway and detect a fast-moving motorcycle 437 within the FOV of one or more of the cameras (e.g., 210) of the AV 200. The direction of the attention vector 436 may be determined by relative position of the AV 200 with respect to the motorcycle 437. The direction of the attention vector 436 may be along a line 432 pointing to the detected motorcycle 437. The cameras (e.g., 210) whose FOVs include the detected fast-moving motorcycle 437 may be more relevant to the attention vector 436 and may get more resources for data transmission than other cameras (e.g., 230, 250) whose FOVs do not include the motorcycle 437.

In particular embodiments, the length of the attention vector 436 may be determined based at least in part on a number of characteristics of the motorcycle 427, such as, speed, distance to vehicle, signal status, or driving behavior. In particular embodiments, the length of the attention vector 436 may be determined based at least in part on the driving conditions of the AV 200, such as, anticipated driving path change, anticipated turn, acceleration, deceleration, merging to line, or traffic status.

Figure 5:
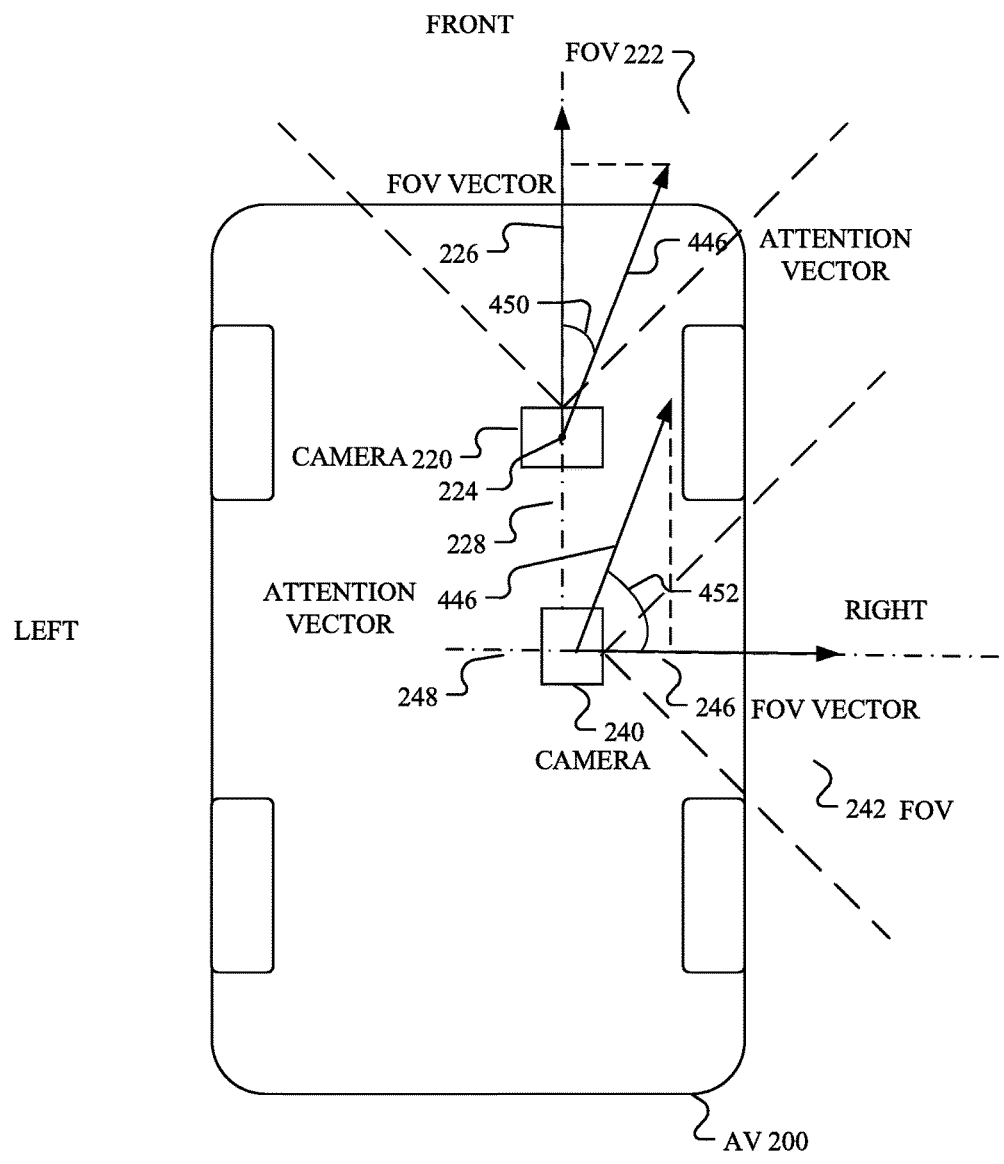
FIG. 5 illustrates an example field of view (FOV) vector of a camera.

FIG. 5 illustrates two examples central field of view (FOV) vectors (226, 246) of two cameras (224, 240). The FOV 222 of the camera 220 may face to the forward direction of the AV 200 covering the area in front of the AV 200. The central FOV vector 226 of the camera 220 may point to the forward direction along a central symmetry line 228 of the FOV 222. The starting point of the FOV vector 226 of the camera 220 may be the geometric center point 224 of the camera 220. In particular embodiments, the length of the central FOV vector 226 may correspond to characteristics (e.g., width, depth, or distance of sensing) of the FOV 222. The FOV 242 of the camera 240 may face to the left direction of the AV 200. The direction of the central FOV vector 246 of the camera 240 may be along the symmetry axis 248 of the FOV 242 pointing to the left direction. The length of the central FOV vector 226 may correspond to characteristics (e.g., width, depth, or distance of sensing) of the FOV 242.

In particular embodiments, the AV system may allocate data transmission resources for particular cameras based on the relevance of the cameras to the attention vector of the vehicle. The relevance between a camera and the attention vector may be determined based on the attention vector and a central FOV vector associated with the camera. The relevance of the camera to the attention vector may be determined based at least in part on the dot product of the central FOV vector of the camera and the attention vector. For example, the attention vector 446 may be pointing to the front-right direction when the AV 200 is making a slight right turn. The relevance of the attention vector 446 to the camera 220 and camera 240 may be determined by the dot product of the attention vector 446 with the central FOV vectors 226 and 246, respectively. The angle 450, which is between the attention vector 446 and the central FOV vector 226, may be greater than the angle 452, which is between the attention vector 446 and the central FOV vector 246. The dot product of the attention vector 446 with the respective central FOV vectors may indicate that the camera 226 is more relevant to the attention vector 446 than the camera 240 under these driving conditions.

In particular embodiments, the length of the central FOV vectors may correspond to a weighting factor based on relative importance or priority of the associated camera. In particular embodiments, multiple cameras or sensors in the AV system may have the same weighting factor value or different weighting factor values based on the relative importance or priority of each camera in the system. For example, the camera 220 may have a higher priority than the camera 240 because the camera 220 faces toward the front area of the AV 200, which is relatively more important than left side of the vehicle under most driving conditions. In particular embodiments, the central FOV vector of a sensor may be a central field of sensing associated with the sensor.

Figure 6A:
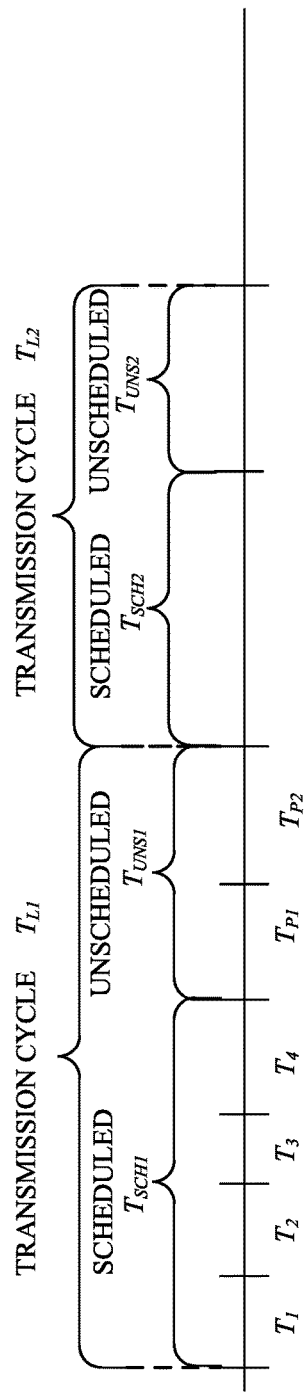
FIG. 6A illustrates an example time sequence in which the scheduled and unscheduled time segments are kept proportional when the transmission cycle changes.
Figure 7A:
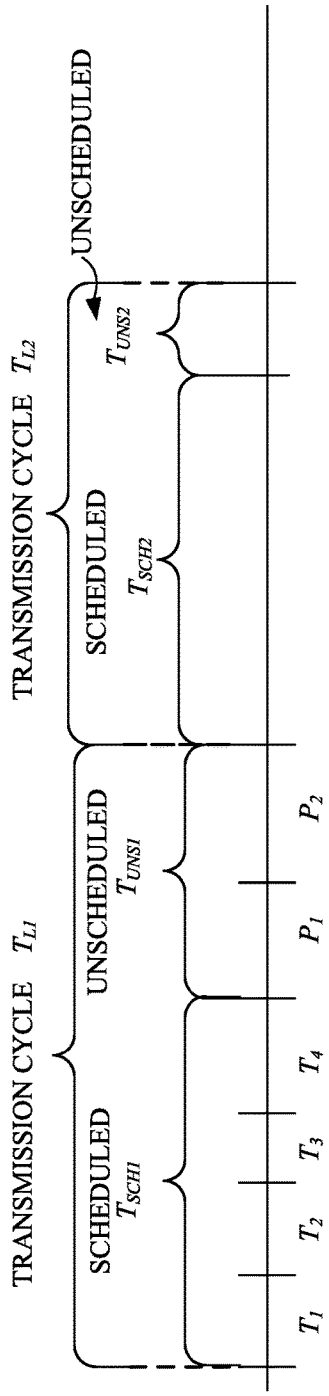
FIG. 7A illustrates an example time sequence in which the unscheduled time segment length changes with the transmission cycle length while the scheduled time segment length is fixed.

In particular embodiments, the AV system may dynamically configure the communication network of the AV system to accommodate different driving conditions and anticipated needs. In particular embodiments, the AV system may configure the communication network to dynamically allocate resources (e.g., switches, connections, BGs, routing path, time) to individual nodes in the network for data transmission. In particular embodiments, the utilization of the transmission channels of the communication network may be segmented based on time, as illustrated in FIG. 6A and FIG. 7A. The transmission time on each path of the network may conceptually be allocated to scheduled time segments for scheduled traffic and unscheduled time segments for unscheduled traffic. The transmission time of the network may be allocated to individual nodes based on a respective schedule during scheduled time segments or based on priority associated with the nodes during unscheduled time segments.

In particular embodiments, the communication network may utilize transmission cycles for organizing and coordinating the data transmission in the network, as illustrated in FIGS. 6A and 7A. The transmission cycle may also be referred as alternation period or alternating period which repeats one after another. The computer may determine the length of each transmission cycle for the communication network of the vehicle. The transmission cycle may include scheduled time periods for transmitting data from respective associated first nodes in the communication network. Each scheduled time period may be dedicated to an associated first node. The first nodes having dedicated time periods may be from a first set of nodes including the scheduled nodes of the vehicle network. In particular embodiments, the scheduled time periods may be included in a scheduled time segments in the transmission vehicle.

FIG. 6A illustrates an example time sequence in which the scheduled and unscheduled time segments are kept proportional when the transmission cycle changes. In particular embodiments, the scheduled time periods for the nodes may be included in a scheduled time segment of the transmission vehicle. In particular embodiments, each transmission cycle may conceptually include a scheduled time segment and an unscheduled time segment. As an example and not by way of limitation, the transmission cycle $T_{L1}$ (i.e., alternation period or alternating period) may include the scheduled time segment $T_{SCH1}$ and the unscheduled time segment $T_{UNS1}$. The scheduled time segment $T_{SCH1}$ may include a number of scheduled time periods (e.g., $T_1$, $T_2$, $T_3$, $T_4$). Each of the scheduled time periods $T_1$, $T_2$, $T_3$, and $T_4$ may be dedicated to an individual node (i.e., transmitting node) for transmitting data in the communication network. In particular embodiments, the scheduled time periods may be expressed as a fraction of the transmission cycle length instead of a particular duration. In particular embodiments, the computer may determine and schedule an order for these transmitting nodes and may receive the data from these transmitting nodes during their respective scheduled time periods according to the scheduled order. In particular embodiments, the unscheduled time segment $T_{UNS1}$ may be used for the nodes to transmit data based on the priorities. In particular embodiments, the unscheduled time segment may include one or more unscheduled time periods (e.g., $T_{P1}$ and $T_{P2}$). As an example and not by way of limitation, the data from a first transmitting node with a first priority value $P_1$, which is higher than the priority value $P_2$ of a second talker, may be transmitted before the data from the second transmitting node (e.g., $T_{P1}$ goes earlier than $T_{P2}$). As an example and not by way of limitation, the node with higher priority may preempt (i.e. interrupt) a message from a node with lower priority. In particular embodiments, nodes may transmit data during the unscheduled time segment on a first-come-first-served basis.

In particular embodiments, the length of the transmission cycle may be shortened based on one or more driving conditions (e.g., vehicle speed, pedestrian density, or any other condition that may require faster response time). When the length of the transmission cycle is shortened, the scheduled time periods for scheduled nodes may have higher occurrence frequencies over different instances of the transmission. For both scheduled nodes and unscheduled nodes, the time they have to wait to transmit again may be shorter when the transmission cycle decreases. By reducing the transmission cycle, the worst-case transmission latency may be shortened to address situations where urgent, prompt communication is needed (e.g., when the vehicle accelerates or enters an area with many pedestrians). In particular embodiments, the scheduled time segment and the unscheduled time segment may be shortened proportionally when the transmission cycles are shortened. As an example and not by way of limitation, when the length transmission cycle is shortened from $T_{L1}$ to $T_{L2}$, the scheduled time segments $T_{SCH1}$ and the unscheduled time segment $T_{UNS1}$ may be shortened proportionally to $T_{SCH2}$ and $T_{SCH2}$, respectively. In both instances of the transmission cycles $T_{L1}$ and $T_{L2}$, the scheduled time segment and unscheduled time segment may have the same length ratio. In particular embodiments, the scheduled time periods for scheduled nodes may have higher occurrence frequencies over different instances of the transmission cycles when the length of the transmission cycle is shortened. In particular embodiments, for both scheduled nodes and unscheduled nodes, the time they have to wait to transmit again may be shorter when the transmission cycle decreases. In particular embodiments, the worst-case transmission time may be shortened when the vehicle accelerates. Although this disclosure illustrates and describes the time sequence of the communication network that are in a particular manner, this disclosure contemplates any suitable the time sequence of the communication network for autonomous vehicle that are in any suitable manner.

In particular embodiments, the computer of the AV system may receive sensor data from one or more sensors of the AV system. In particular embodiments, the sensor data may be from a variety of sensors including, for example, but not limited to, speed sensors, GPS sensors, cameras, LiDAR systems, RADARs, ultra sound systems, inertial measurement units, accelerometers, gyroscopes, odometer systems, or other related sensor systems. The computer may determine a metric associated with the vehicle based on the received sensor data. The metric associated with the vehicle may include one or more of, for example, but are not limited to, a velocity of the vehicle, a predicted velocity of the vehicle, a location of the vehicle, a predicted location of the vehicle, a position of the vehicle, a predicted position of the vehicle, a vehicle traffic volume, a pedestrian traffic volume, a pedestrian density, an adversity metric of one or more environmental conditions, a fast-moving object, a fastest-moving object, a condition that requires a faster response time, or a parameter related to an attention vector. In particular embodiments, the computer may configure the communication network of the vehicle based on at least in part on the length of the transmission cycle to adjust respective occurrence frequencies of the scheduled time periods over multiple instances of the transmission cycle. The computer may receive data from the scheduled nodes during their respective dedicated time periods according to a scheduled order determined by the computer. In particular embodiments, the computer may be a central high-performance computer.

In particular embodiments, the transmission cycle may include one or more unscheduled time periods (e.g., $T_{P1}$, $T_{P2}$ in FIG. 6A). The one or more unscheduled time periods may be included in an unscheduled time segment (e.g., $T_{UNS1}$, $T_{UNS2}$ in FIG. 6A) in the transmission cycle. The computer may determine a priority value for each of one or more second nodes of the vehicle. The second nodes may be from a second set of nodes including the unscheduled nodes of the vehicle. In particular embodiments, the first and the second nodes may have one or more shared nodes or may have zero shared nodes. The computer may configure the communication network based at least in part on the determined priority value of each of the second nodes. The computer may receive data from the second nodes during the unscheduled time periods (e.g., $T_{P1}$, $T_{P2}$ in FIG. 6A) in an instance of the transmission cycle and the data from the second nodes may be ordered based on the determined priority value of each of the second nodes. The prioritization may reduce the priority-weighted congestion latency during the unscheduled time periods. The unscheduled time periods may accommodate the network traffic that may be non-time-critical or may come at a volume that may be hard to anticipate in advance. The unscheduled priority-based traffic may be relatively unimportant traffic that may not need to be transmitted immediately but needs to be transmitted in the right order. As an example and not by way of limitation, the unscheduled network traffic may be a firmware update while the vehicle is parked. The firmware update may need to update different components in a particular order but may not need to happen immediately.

Figure 6B:
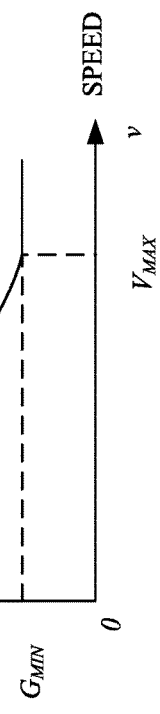
FIG. 6B illustrates an example function for the transmission cycle length over the velocity of the vehicle.

FIG. 6B illustrates an example function for the transmission cycle length G(v) over the speed v of the vehicle. In particular embodiments, the transmission cycle length may be reduced when the vehicle speed increases because at higher speeds, having faster/shorter response times becomes more critical. Reducing the transmission cycle reduces the amount of time that a component has to wait until its next transmission window, and as such reducing the transmission cycle enables the component to send data sooner. As an example and not by way of limitation, the transmission cycle length $T_L$ may be described by a function $T_L=G(v)$, as illustrated in FIG. 6B. In particular embodiments, the function G(v) may have the characteristic of decreasing as the vehicle speed increases. As the speed increases and the transmission cycle length G(v) becomes shorter, the vehicle will have a shorter response time and faster response, which makes the vehicle safer. In particular embodiments, the function G(v) may be equal to a minimum value $G_{MIN}$ when the vehicle speed is equal to or higher than a maximum speed $V_{MAX}$. Although this disclosure illustrates and describes the transmission cycle length function that are in a particular manner, this disclosure contemplates any suitable transmission cycle length function for the communication network of autonomous vehicle that are in any suitable manner.

In particular embodiments, the transmission cycle may include one or more of scheduled time periods which are dedicated to the respective nodes for scheduled data transmission, and one or more of unscheduled time segments which are used for the priority-based data transmission. In particular embodiments, the scheduled time periods within a transmission cycle may be scattered in the transmission cycle rather than being included in a scheduled time segment. In particular embodiments, the scheduled time periods within a transmission cycle may not be continuous in the transmission cycle and one or more of the scheduled time periods may be separated by one or more unscheduled segments. In particular embodiments, the channel may be configured to switch between the scheduled data transmission and the unscheduled priority-based data transmission multiple times during the same transmission cycle. In particular embodiments, when the vehicle speed increases and the transmission cycle is shortened, the total length of the scheduled time periods in a transmission cycle may be reduced in proportion to the total length of the one or more unscheduled time periods in the transmission cycle. In reduced transmission cycle, the total length of the scheduled time periods and the total length of the unscheduled time periods of the same transmission cycle may have the same length ratio as in the former transmission cycle.

FIG. 7A illustrates an example time sequence in which the unscheduled time segment length changes with the transmission cycle length while the scheduled time segment length is fixed. In particular embodiments, the transmission cycle $T_L$ may include the scheduled time segment $T_{SCH1}$ and the unscheduled time segment $T_{UNS}$. With given transmission cycle $T_L$ and scheduled time segment $T_{SCH}$, the unscheduled time segment $T_{UNS}$ may occupy the portion of the transmission cycle outside the scheduled time segment $T_{UNS}=T_L-T_{SCH}$. The scheduled and unscheduled time segments may repeat in different instances of the transmission cycle $T_L$. In particular embodiments, the transmission cycle length may be shortened by decreasing the length of the unscheduled time segment $T_{UNS}$ while keeping the length of the scheduled time segment $T_{SCH}$ constant. As an example and not by way of limitation, the length of the transmission cycle may be reduced from $T_{L1}$ to $T_{L2}$ when the vehicle speed increases. When the transmission cycle length decreases, the length of the unscheduled time segment may be shortened from $T_{UNS1}$ to $T_{UNS2}$ while the length of the scheduled time segment may be kept the same ($T_{SCH1}=T_{SCH2}$).

In particular embodiments, the schedule used for configuring the communication network may be specified to a number of talkers as a number of scheduled time periods $T_i$ dedicated to respective talker and an order of talking. In particular embodiments, each scheduled time period $T_i$ may be a portion of the scheduled time segment $T_{SCH}$ in the transmission cycle and the total length of the scheduled time periods may be equal to the length of the scheduled time segment by $T_{SCH}=\Sigma_i T_i$. In particular embodiments, the scheduled time periods for respective talkers and the order of talking may remain constant over multiple vehicle operations so that the relative talkers may not need to change their configuration (e.g., compression ratio) when the transmission cycle changes. In particular embodiments, the scheduled time periods for the respective talkers and the order of talking may be determined dynamically based on the driving conditions of the vehicle. In particular embodiments, each talker may not need to change its capacity or configuration for data transmission when the transmission cycle length decreases and the talker transmits more frequently. Although this disclosure illustrates and describes the time sequence of the communication network that are in a particular manner, this disclosure contemplates any suitable the time sequence of the communication network for autonomous vehicle that are in any suitable manner.

In particular embodiments, the metric of the vehicle used for the determining the length of the transmission cycle may be the speed of the vehicle. The computer may determine that the increase of the vehicle speed satisfies a predetermined criterion, for example, a shorter response time is required for the vehicle to respond to the surrounding environment because of the vehicle speed increase. The computer may reduce the length of the transmission cycle from a current length based on the determination that the increase of the speed satisfies the predetermined criterion. When the transmission cycle is shortened, the scheduled time periods may have increased occurrence frequencies. Since a higher occurrence frequency of the scheduled time periods correspond to a higher sampling rate for the associated first nodes, the associated first nodes may have shorter average latency and less waiting time between the transmission cycles. The length of the transmission cycle may be equal to a minimum transmission cycle length when the speed of the vehicle is equal to or greater than a maximum threshold speed of the vehicle.

Figure 7B:
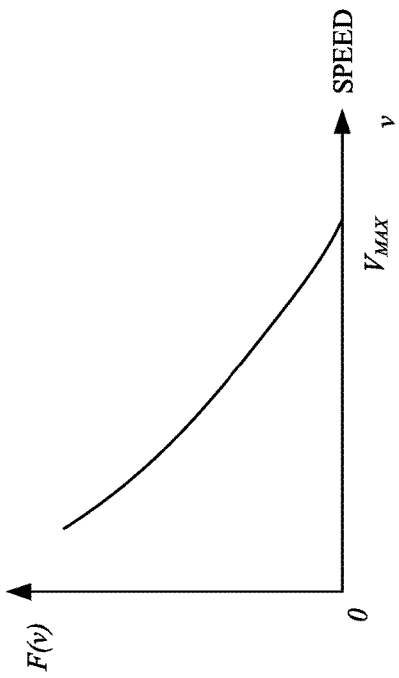
FIG. 7B illustrates an example function for the unscheduled time segment over the velocity of the vehicle.

FIG. 7B illustrates an example function for the unscheduled segment over the speed of the vehicle. In particular embodiments, a controller between the vehicle speed and the transmission cycle may control the changes of the scheduled and unscheduled time segments. In particular embodiments, the portion of the channel capacity allocated to scheduled traffic may increase when vehicle speed increases. In particular embodiments, the expression of the controller may be $T_L=T_{SCH}+F(v)$ where F(v) may be a function which decreases as the vehicle speed v goes from zero to the maximum operational speed $V_{MAX}$ of the vehicle, as illustrated in FIG. 7B. In particular embodiments, when the vehicle speed is equal to or higher than the maximum speed $V_{MAX}$, the F(v) may be zero indicating that only scheduled traffic may be permitted and the unscheduled segment is eliminated. In particular embodiments, the vehicle speed v may be substituted by any metric or parameter related to the control system of the vehicle. In particular embodiments, the metrics or parameters that can substitute the vehicle speed may include, for example, but are not limited to, a proximate volume of other vehicle traffic, a pedestrian traffic volume, an adversity of environmental conditions or a parameter related to an attention vector. Although this disclosure illustrates and describes the transmission cycle length function that are in a particular manner, this disclosure contemplates any suitable transmission cycle length function for the communication network of autonomous vehicle that are in any suitable manner.

In particular embodiments, the transmission cycle may include one or more of scheduled time periods scattered in the transmission cycle rather than being included in a scheduled time segment. The scheduled time periods within a transmission cycle may not be continuous in the transmission cycle and one or more of the scheduled time periods may be separated by one or more unscheduled time periods. The channel may be configured to switch between the scheduled data transmission and the unscheduled priority-based data transmission multiple times during the same transmission cycle. When the vehicle speed increases and the transmission cycle is shortened, the total length of the unscheduled time periods within a transmission cycle may be reduced while the total length of the scheduled time periods may be kept the same. In particular embodiments, the ratio of the total length of the scheduled time periods over the total length of the unscheduled time periods may increase when the transmission cycle decreases.

In particular embodiments, the AV system may use these methods, as illustrated in FIGS. 6A-B and FIGS. 7A-B, individually or in combination for adjusting the transmission cycle and transmission schedule to reduce the average latency. In particular embodiments, the AV system may uniquely determine a parameter variation scheme for each of transmitting nodes in the network. The transmission schedule specified to multiple nodes may include an order of transmitting and a number of scheduled time periods for respective nodes. When the scheduled time segment of transmission cycle is fixed, the order of transmission and scheduled time periods for respective nodes may remain constant over multiple vehicle operations or all of the vehicle operations. In particular embodiments, the length of the scheduled time periods may be determined based on a central FOV vector of the node, an attention vector second vector of the vehicle, and a fundamental time slot size associated with the corresponding node.

Figure 8:
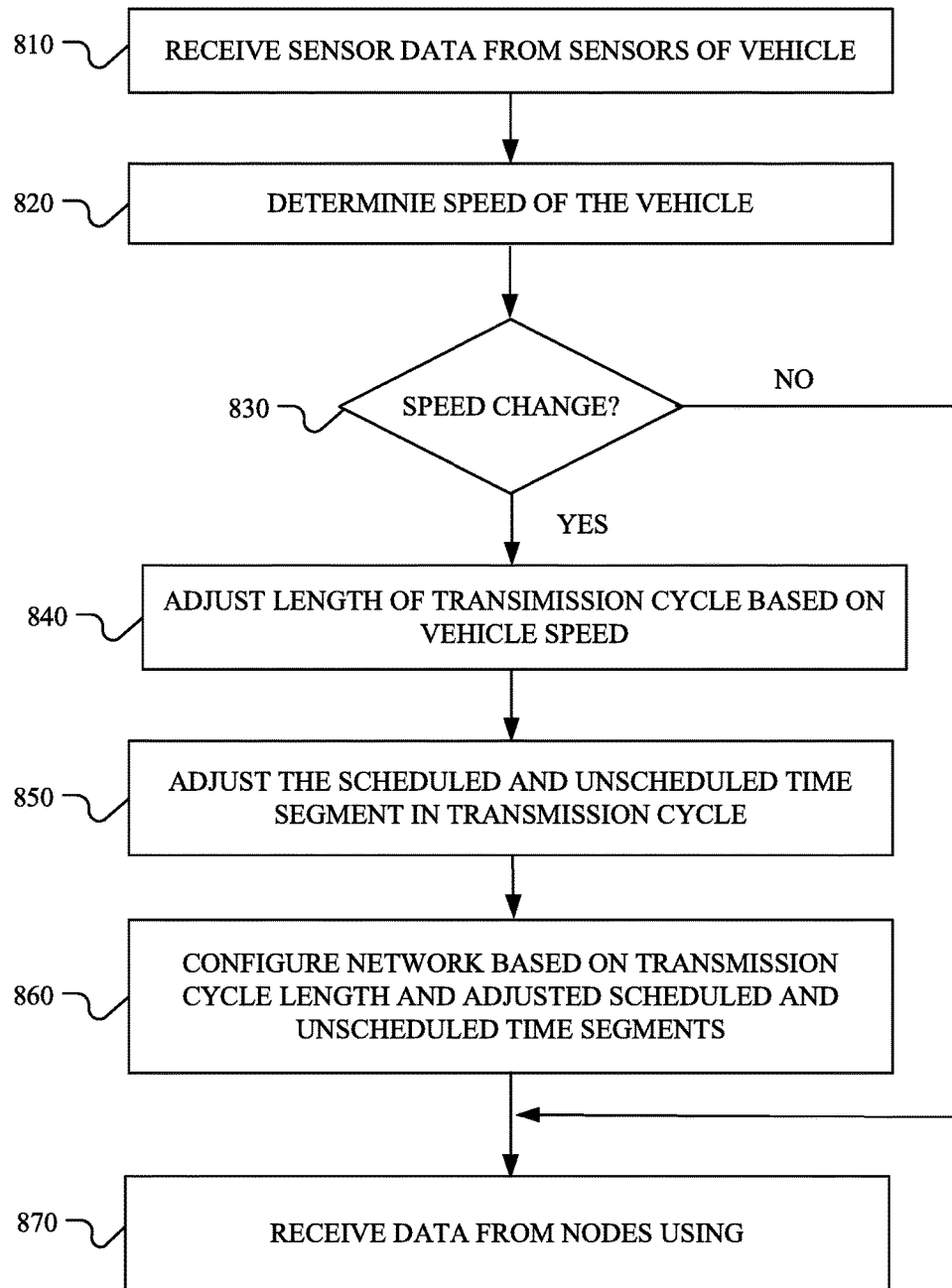
FIG. 8 illustrates an example method for configuring the communication network with adjusted transmission cycle based on the vehicle speed.

FIG. 8 illustrates an example method 800 for configuring the communication network with adjusted transmission cycle based on the vehicle speed. In step 810, the computer of the AV system may receive sensor data from one or more sensors of the AV system. The sensors may include, for example, but are not limited to, speed sensors, GPS sensors, cameras, LiDAR systems, RADARs, ultra sound systems, inertial measurement units, accelerometers, gyroscopes, odometer systems, or other related sensor systems. In particular embodiments, the sensor data may be related to the speed of the vehicle. In step 820, the computer may determine the vehicle speed based on the received sensor data. In particular embodiments, the computer may determine a metric associated with vehicle based on the received sensor data and use the metric in a similar way like the speed. In step 830, the computer may determine whether the speed has changed, and if so, the computer may execute steps 840, 850, and 860 to reconfigure the network for both scheduled and unscheduled network traffic. If the speed has not changed, the computer may execute step 870 to continue to receive data from the nodes in the system using the current network configuration. In step 840, the computer may determine the length of the transmission cycle for the communication network based on the vehicle speed. For example, the computer may determine that the vehicle speed has increased, and the AV system may require a shorter response time. The computer may reduce the length of the transmission cycle to enable the AV system to have a shorter response time.

In step 850, the computer may adjust the scheduled time segment and the unscheduled time segment in each transmission cycle. In particular embodiments, when the vehicle speed increases, the computer may reduce the lengths of the scheduled time segment and the unscheduled time segment proportionally. In particular embodiments, when the vehicle speed increases, the computer may reduce the length of the unscheduled time segment and keep the length of the scheduled time segment constant. The length of the scheduled time period $T_i$, which is allocated to a particular camera, may be determined by a proportional controller. To determine the scheduled time period length, the proportional controller may use the dot product of the field of view vector $\vec{u}$ of the camera and the attention vector $\vec{v}$ of the vehicle using the equation $T_i = t_s(\vec{u} \cdot \vec{v})$, wherein the $t_s$ is a fundamental time slot size corresponding to the amount of channel time allocated to the camera if it is the only camera required for the entire guidance control of the vehicle. Different cameras or sensors may have different scheduled time period lengths based on the dot product result and the fundamental time slot size. As an example and not by way of limitation, when the vehicle moves forward, a camera facing to the forward direction of the vehicle may have longer scheduled time periods than other cameras facing away from the moving direction of the vehicle.

In step 850, the computer may configure the communication network based at least in part on the length of the transmission cycle, the adjusted scheduled time segment, and the adjusted unscheduled time segment. When the transmission cycle length is reduced, the scheduled time periods may have higher occurrence frequency and the communication network may have reduced average latency for the scheduled network traffic. In step 870, the computer may receive data from the nodes of the system using the current configuration of the network. In particular embodiments, the cameras being allocated with longer scheduled time periods may transmit more accurate information or/and larger amount of data to the computer of the AV system. As an example and not by way of limitation, a camera that is highly relevant to the attention vector of the vehicle may transmit to the computer high resolution images without compression. As another example and not by way of limitation, a highly relevant camera to the attention vector may use higher frame rate and transmit more data to the computer of the AV system. In particular embodiments, the cameras being allocated with shorter scheduled time periods may transmit less accurate information or/and less amount of data to the computer of the AV system. As an example and not by way of limitation, a camera being allocated with shorter scheduled time period may reduce the data amount or bandwidth to accommodate data in the limited bandwidth by taking a number of actions including, for example, but not limited to, compressing the images to smaller size, compressing a portion of the images outside the interesting area, using a higher compression ratio, adjusting to a lower framerate, or adjusting to a lower image resolution. In particular embodiments, some cameras may have zero scheduled time period lengths when they are not relevant to the attention vector. The computer may not receive image data in scheduled traffic from the cameras which have zero scheduled time periods. In particular embodiments, both the scheduled cameras and unscheduled cameras may be continuously sampled during their respective scheduled time periods or priority-based unscheduled time periods. The cameras in the AV system may be intelligent and dynamically configurable cameras with processing and compressing capabilities within one or more of the chips in the cameras.

Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for configuring the communication network with adjusted transmission cycle based on the vehicle speed including the particular steps of the method of FIG. 8, this disclosure contemplates any suitable method for configuring the communication network with adjusted transmission cycle based on the vehicle speed including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
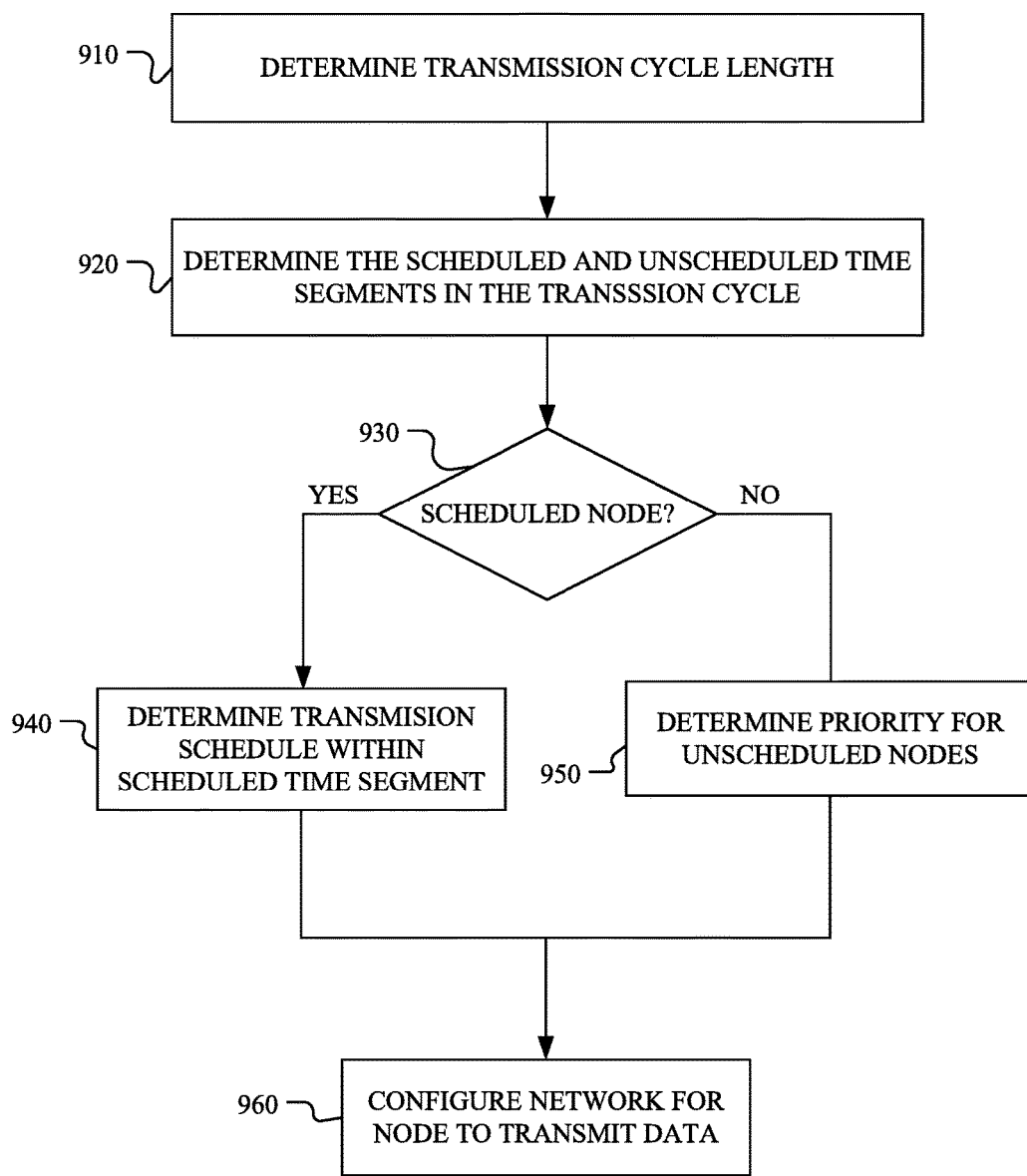
FIG. 9 illustrates an example method for determining the transmission schedule within a transmission cycle based on the vehicle driving conditions.

FIG. 9 illustrates an example method 900 for determining the transmission schedule within a transmission cycle based on the vehicle driving conditions. In step 910, the computer of the AV system may determine the length of the transmission cycle based on one or more driving conditions of the vehicle. For example, the computer may receive sensor data from one or more sensors related to the vehicle speed and may determine the length of the transmission cycle based on the vehicle speed. In step 920, the computer may determine the lengths of the scheduled time segment and the unscheduled time segment in the transmission cycle. In particular embodiments, the computer may reduce the scheduled time segment and the unscheduled time segment proportionally when the transmission cycle length decreases. In particular embodiments, the computer may reduce the length of the unscheduled time segment and keep the scheduled segment length constant when the transmission cycle length decreases.

In step 930, the computer may determine whether a node is a scheduled node or an unscheduled node. If the node is a scheduled node, the compute may execute step 940 to determine, for that node, the transmission schedule for the scheduled network traffic within a transmission cycle of the communication network. For example, the transmission schedule within the scheduled time segment may include an order of transmitting and a number of scheduled time periods dedicated to respective scheduled nodes, as illustrated in FIGS. 6A and 7A. The computer may determine each scheduled time period dedicated to an associated node based at least in part on the dot product of the attention vector of the vehicle and the FOV vector of the associated node (e.g., camera or sensor), as illustrated in FIG. 5.

If the node is unscheduled node, the computer may execute step 950 to determine the priority for that unscheduled node to transmit data during the unscheduled time period. The unscheduled nodes may transmit data using the unscheduled time periods based on the respective priorities of the nodes. For the scheduled nodes, the latency and throughput of the data transmission may be deterministically determined by the scheduled. For the unscheduled nodes, the latency and throughput of the data transmission may be statistically determined by the priority. The unscheduled nodes may transmit data based on a priority value assigned to each of the nodes during the unscheduled time periods. For example, data from a node with a higher priority value may be transmitted before the data from a node with a lower priority value. As another example, the message from a transmitting node with higher priority may preempt (i.e. interrupt) the message from a node with lower priority. The AV may allocate data transmission capacity to more interesting transmitting nodes (i.e., higher priority talkers) in the network rather than allowing the data to be dropped off randomly.

In particular embodiments, the prioritization may be determined based on the attention vector of the vehicle in a similar method for determining the lengths of the scheduled time periods. For example, the computer may determine each priority value associated with an unscheduled node based on the dot product of the attention vector and the FOV of the node, and a number of available network priorities. In particular embodiments, the AV system may determine priority based on the intended direction of travel as well as the FOVs of the sensors or cameras of the vehicle. For example, the information about objects that are in the direction of travel may be more important that the objects that are not in the direction of travel. The AV system may de-prioritize the sensors and cameras that are pointing away from the direction of the travel. The direction of travel may correspond to a predicted travel path of the vehicle from the current moment until a certain amount time later (e.g., from 1 millisecond to several seconds). In particular embodiments, the priority of a particular camera may be determined based at least in part on the dot product of the field of view vector $\vec{u}$ of the camera and the attention vector $\vec{v}$ of the vehicle using the equation $T_i = t_s(\vec{u} \cdot \vec{v})$. The priority of a camera may be determined by dividing the values of the dot product by a number of the available network priorities. An as example and not by way of limitation, the dot product value of the FOV vector and the attention vector may be between 0 and 1. The priority of this sensor may be determined by mapping the dot product values into the number of available priorities (e.g., 8 priorities).

In step 960, the computer may configure the communication network based at least in part on the transmission cycle length, the transmission schedule for the scheduled nodes, and the priorities of the unscheduled nodes. The computer may receive data from the scheduled nodes during their respective scheduled time periods and according the scheduled order. The computer may receive the data from the unscheduled nodes during the unscheduled time segments according to the priorities of the unscheduled nodes. When the transmission cycle is shortened, the scheduled network traffic may have shorter average latency and only higher priority unscheduled traffic may come through. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for determining the transmission schedule within a transmission cycle based on the vehicle driving conditions including the particular steps of the method of FIG. 9, this disclosure contemplates any suitable method for determining the transmission schedule within a transmission cycle based on the vehicle driving conditions including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

In particular embodiments, the communication network of the AV system may be configured to have physical redundancy. For example, the communication network of the AV system may have two or more physical routes across the network for the information of any node that requires physical redundancy. In particular embodiments, the communication network of the AV system may have a parallel star topology in which every node may be connected to multiple switches. In particular embodiments, the AV system may be capable of tolerating any single fault of its components by providing redundant routing paths for the failed component. As an example and not by way of limitation, when a switch connection fails in the network, the nodes that are connected to the failed switch may transmit data over the network through other connected switches along the redundant routing paths. In particular embodiments, when the vehicle drives slowly in an area heavy with pedestrians, the AV system may allocate more non-redundant bandwidth to more cameras to track a greater number of pedestrians and may simply come to halt when a component fault is detected. When the vehicle drives on a highway, the AV system may track comparatively fewer objects with higher level of redundancy in the communication network. The AV system may have all the network traffic being redundant because of the high criticality of commands and data of the high-speed driving.

In particular embodiments, the physical redundancy of the network may be dynamically configured based on one or more driving conditions. For example, the computer of the AV system may determine a threshold value for the metric (e.g., speed, traffic volume, pedestrian density, fastest-moving object, or adversity of environment) associated with vehicle. The computer may configure the communication network to have all network traffic to be redundant when the metric of the vehicle is equal to or greater than the threshold value. The computer may configure the communication network to have a subset network traffic to be redundant when the metric of the vehicle is less than the threshold value. In particular embodiments, the computer may determine the threshold value for the vehicle metric based at least in part on the characteristics of the attention vector of the vehicle and configure the network based on the comparison of the vehicle metric and the threshold value. For example, the computer may determine a threshold length for the scheduled time segment of a transmission cycle. When the scheduled time segment is equal to or greater than the threshold length, the system may have enough bandwidth to allow all scheduled network traffic to be redundant and may configure the communication network to have all scheduled traffic to be redundant to fully utilize the bandwidth. As another example, the computer may determine a threshold length for the total length of the scheduled time periods in a transmission cycle and may configure the communication network to have all scheduled traffic to be redundant when the total length of the scheduled time periods is equal to or greater than the threshold length.

The AV may generate more data on average than it is capable of either consuming or transmitting and may use different schemes to cull the data by importance. For example, a camera may generate large amount of data within a short amount of time and the scheduled time period for this camera may not have enough bandwidth to accommodate all the data. In order to accommodate the data traffic, the computer of the AV system may calculate an attention map for each camera for the cameras in the network that the AV system should pay attention to. The attention map may assign priority to the cameras based on the interest that the AV system has on these cameras. The computer may transmit the attention map to each camera and the cameras may transmit data to the computer based on the attention map. In particular embodiments, the attention map may be calculated by the computer, but the cameras may make determination based on rules and the attention map they have received. For example, the cameras may transmit data based on an agreed schedule of switches coordinated through the information included in the attention map. If the camera detects some high priority events (e.g., unexpected accidents like hit by a motorcycle), the data of that camera may be transmitted to the computer despite that the attention map may have marked the camera as lower priority. In particular embodiments, the attention map may include a (360°, 0° ~20°) map of interest for the FOVs of the cameras and may be computed by one or more dedicated neutral network in the AV system. In particular embodiments, the attention map may also be referred as heat map of interest.

As described above, the AV may include a control system to provide control commands to the various components of the AV and may include redundant computing components that may assume control of determining navigation control instructions in the event of a hardware failure. This control system is constrained by the amount of power available to the control system. As described in more detail below, the control system may be designed to optimize the power allocated to the redundant computing components within the constraint of the total power available to the AV based on trade-off that allocates the power (e.g., speed or processing power of each computer) to each computer in a manner that minimizes the number of likely interventions.

Figure 10A:
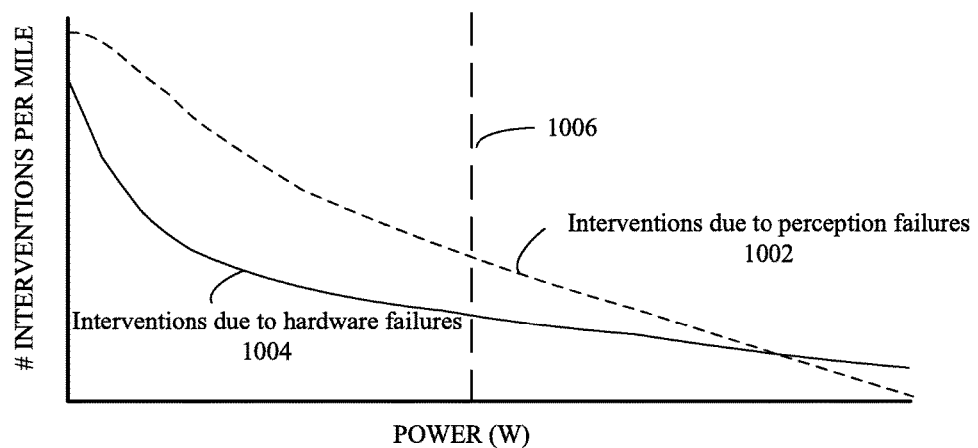
FIGS. 10A-10B illustrate example relationships between interventions and power used for computation.
Figure 10B:
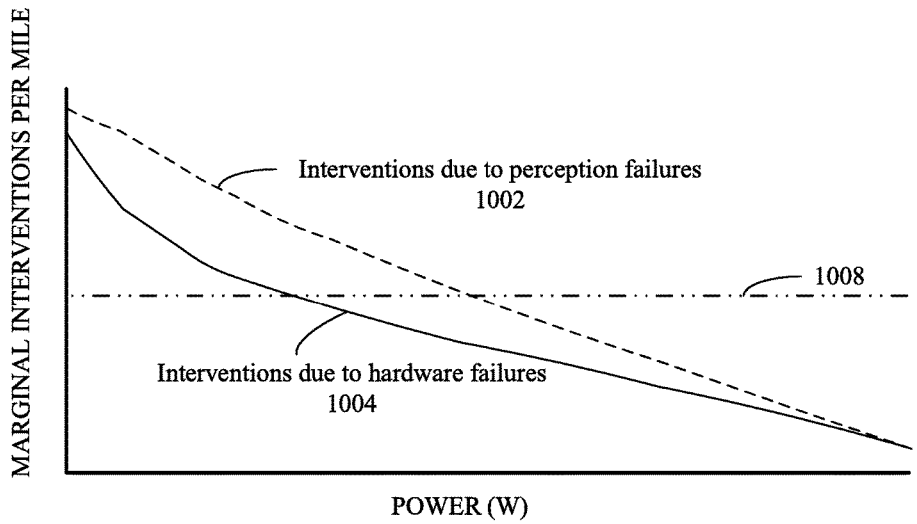

FIG. 10A-10B illustrate example relationships between a number of interventions and consumed power. A control portion of the network system may be represented by an internetworked set of nodes, which may include computing components (e.g., 110A-B), sensors (e.g., 146), and actuators 142 that use network system 100 to communicate with each other. As illustrated in the example of FIG. 1, network system 100 may include high-performance computer (HPC) 110A and relatively lower-performance computer (e.g., a high-safety computer or HSC) 110B that are coupled to one or more bus guardians (BG) (e.g., 130). HPC 110A and HSC 110B are redundantly coupled to each bus guardian 132 through the network system 100. A bus guardian (e.g., 132) may be coupled to a sensor (e.g., 146) or an actuator 142, where bus guardian 132 may be a node in the network. Managing perception insufficiency, described above in more detail, may determine the required processing power (power consumption) of the computing components (e.g., HPC or HSC) of the control system. In general, higher power allocation to a computing component, which translates to improved computational performance, may reduce the likelihood of perception interventions. The likelihood of interventions due to hardware failure, on the other hand, may be mitigated by having redundant hardware. For a system where power is a limited resource, such as an autonomous vehicle that operates on battery, it may not have the luxury to provide maximum power to every computing component.

As a result, power allocation between HPC and HSC has tradeoffs. For example, while perception interventions may be reduced by allocating more power to the HPC, the risk of interventions due to hardware failure may increase since less power may be available to the HSC. Conversely, although the number of hardware failures may be reduced with better redundancy (e.g., when HSC is fully redundant with the HPC), perception interventions may increase due to less power being allocated to the HPC for perception processing. An intervention-optimal allocation of power may lead to a design that is somewhere in between allocating maximum power to either of the computing components, such that the HSC does not reproduce all the functionality of the HPC. As an example and not by way of limitation, the HSC may be capable of navigating the AV during normal lighting conditions but may need a human driver to manually navigate the AV in low light conditions if there is a HPC failure. The constraints in the system may be thought of as a limit on a total amount power consumption by the HPC and HSC. In other words, the problem being solved is to determine an allocation of power between the HPC and HSC that will result in the smallest number of interventions.

Interventions may be assumed to independently originate from perception failures, illustrated by curve 1002, or from hardware failures, illustrated by curve 1004. As illustrated in the example of FIG. 10A, adding power to address perception failures 1002 and hardware failures 1004 leads to a monotonically reduction, with diminishing returns, of the number of interventions. The amount of power that may be added is constrained by the total power constraint 1006, as illustrated in the example of FIG. 10A. As an example and not by way of limitation, perception failures 1002 or control insufficiencies (per mile) may be initially responsible for more interventions than hardware failures 1004. Increasing sophistication of the perception and control (hardware redundancy) strategies can be thought of as moving down perception failures 1002 and hardware failures 1004. As illustrated in the example of FIG. 10B, an intervention-optimal allocation 1008 is one which equalizes the marginal utility given the constraint: i.e. we set the derivatives of perception failures 1002 and hardware failures 1004 equal to each other and use the remaining degree of freedom to saturate the constraint.

Allocating power as described above to minimize overall interventions may thus result in the HPC and HSC having different amounts of power to perform computations. Consequently, the two computing components may arrive at different conclusions when solving a given problem (e.g. computing the appropriate control given the current state of the vehicle and environment). Conceptually, the HPC and HSC may each be casting a vote as to what action should be performed by the vehicle. A third computing component, such as the bus guardian, may cast its own vote to determine what action should be performed. In particular embodiments, the third computing component may repeat the computations made by the HPC and HSC to determine which to side with. However, performing the same computations may be overly expensive, especially given the potentially limited computational power of the third computing component. As such, in particular embodiments the third computing component may instead assess the votes of the HPC and HSC by verifying respective certificates of the votes, as will be described in more detail below.

Figure 11:
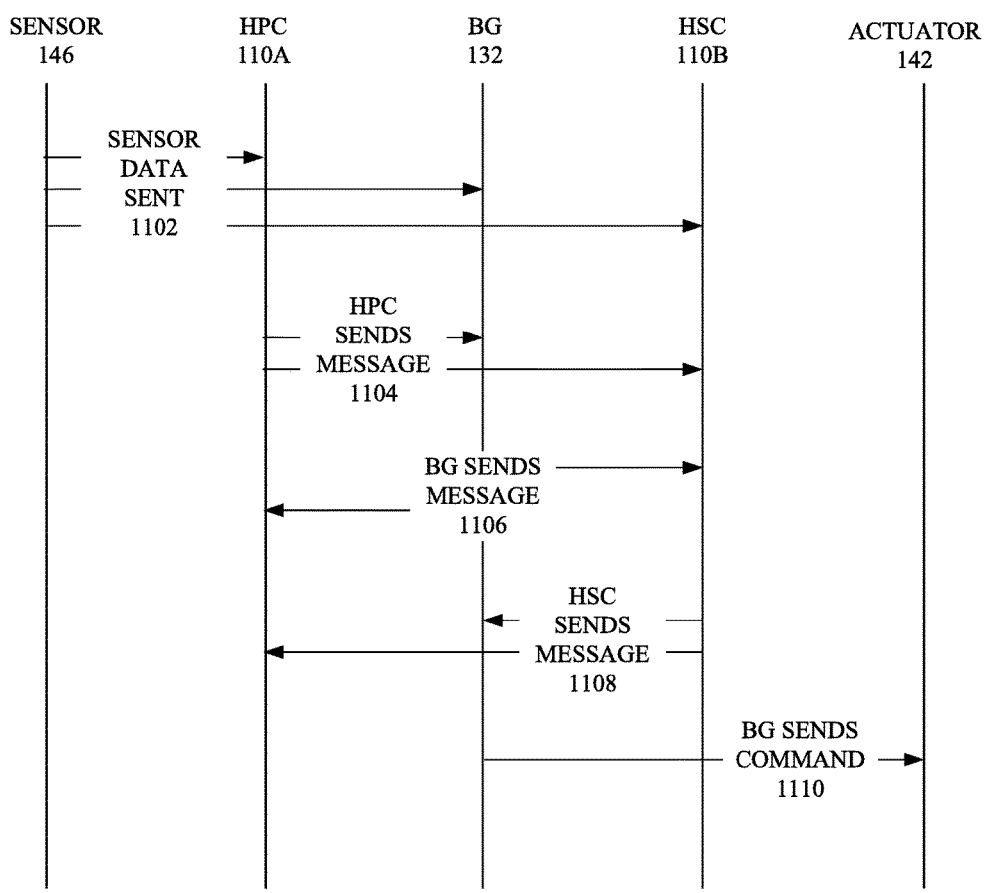
FIG. 11 illustrates an example interaction diagram between control system components.

FIG. 11 illustrates an example interaction diagram between control system components in one control cycle for determining the appropriate control command for an actuator. As illustrated in the example of FIG. 11, messages are exchanged between the HPC 110A (representing a high-powered computing component), HSC 110B (representing a relatively lower-powered computing component), BG 132 (representing a bus guardian) associated with an actuator 142, and sensor 146. Although FIG. 11 illustrates a single BG and sensor for simplicity, embodiments of the control system may include multiples of any of the components, such as additional redundant computing components and multiple BGs and sensors. The messages shown in the figure are "logical" messages that are transmitted over the network fabric, described in more detail herein, and may be physically duplicated or redundant.

In particular embodiments, the sensor 146 may transmit, at 1102, a message that includes sensor data to the HPC 110A, HSC 110B, and BG 132. At time $t_0$, the sensor 146 (e.g., a camera, LiDAR, radar, etc.), which may correspond to a node i in the communication network, may obtain a sensor measurement $m_i(t_0)$. The sensor 146 may generate a signature for the message that it is about to send using its private key $k_i$ (the signature may be denoted as $S=Sig(m_i(t_0), k_i)$). In addition, the sensor 146 may generate a hash of the signed time-stamped measurement, denoted by $h_{0N}$=hash$(m_i(t_0), S)$. The message 1102 may include the sensor data $m_i(t_0)$, the signature S, and the hash $h_{0N}$. In particular embodiments, the contents of the message 1102 may be encrypted using a public key of the recipient computing component. For example, the messages 1102 to the HPC 110A, HSC 110B, and BG 132 may be encrypted using their respective public keys $k_P$, $k_S$, and $k_A$. The recipient computing components (e.g., HPC 110A, HSC 110B, and BG 132) are able to verify that the received message 1102 is authentic by decrypting the received message 1102 using their respective private keys. The hash and signature in each message (including messages transmitted by the HPC 110A, HSC 110B, and BG 132, which will be described in further detail below) acts as a certificate that the data contained within the message was not corrupted in transmission.

In particular embodiments, after receiving the message 1102 from the sensor 146, the HPC 110A, HSC 110B, and BG 132 may decrypt the message 1102 to retrieve the data within. HPC 110A determines a control command for the AV based on the received sensor data from sensor 146 as well as any other sensors. The computed control command $u_p$ may be represented by the function control$(t_0, m(t_0), x(t_0))$, where $x(t_0)$ represents any relevant data at time $t_0$ that are available to the HPC 110A. The computed control command $u_p$ may be included in a message 1104 to be sent to HSC 110A and BG 132. In particular embodiments, the message transmitted by HPC 110A may include a hash and signature, which may serve as a certificate that the transmitting entity (in this case HPC 110A) had the right data available to do the controls calculation (e.g., the data is not stale) and that it has not forged sensor data to the down-stream components (e.g., HPCS 110B and BG 132). In particular embodiments, the HPC 110A may compute a hash $h_{0iP}$ based on the sensor data from sensor 146, where $h_{0iP}$=hash$(m_i(t_0), Sig(m_i(t_0), k_i)$. Similarly, the HPC 110A may compute a hash for the sensor data from each of x sensors, so that the hash $h_{0P}$ for the message 1104 is $h_{0P}=(h_{01P} \ldots h_{0xP})$. The hash $h_{0P}$ may then be compared (e.g., via an XOR operation) with the sensor's hash $h_{0N}$ to derive a comparison result, denoted $SSyn_P$.

In particular embodiments, the payload of the HPC's message 1104 may include $c_{0P}=(t_0, h_{0P}, SSyn_P, u_P(t_0, x_{0P}), u'_P(t_0)( ), u''_P(t_0)( ))$. The $u''_P(t_0)( )$ function transmitted from the HPC 110A, when executed by the recipient, is a certificate that HPC 110A's calculation of the control command is correct within a certain bound. The $u'_P(t_0)( )$ function, when execute by the recipient, is a certificate that HPC 110A's calculation is correct within narrower bound than the result of the $u''_P(t_0)(\ )$ function. In particular embodiments, $c_{OP}$ may be signed using the private key $k_P$ of HPC 110A (the signature may be denoted $Sig(c_{OP}, k_P)$). The message 1104 may contain the $c_{OP}$ and the corresponding signature Sig $(c_{OP}, k_P)$. In particular embodiments, the message 1104 may be encrypted using the public key of the recipient. For example, the message 1104 to BG 132 and HSC 110B may be encrypted with their respective public keys $K_A$ and $K_S$. In particular embodiments, the HPC 110A control command transmitted to HSC 110B and BG 132 may be a steering angle with information that the steering angle corresponds to an amount of lateral acceleration (e.g., 0.5 G), where the amount of lateral acceleration is the value of the property of the steering angle.

With respect to BG 132, after receiving the message 1102 from the sensor 146, BG 132 may compute a hash and a signature, which will be included in the message 1106 that BG 132 will send. Similar to those in the message 1104 transmitted by HPC 110A, the hash and signature from BG 132 may serve as a certificate that the data contained in the message 1106 was not corrupted in transmission. In particular embodiments, BG 132 may compute a hash $h_{O1A}$ based on the sensor data from sensor 146, where $h_{O1A}=hash(m_i(t_0), Sig(m_i(t_0), k_i))$. Similarly, BG 132 may compute a hash for the sensor data from each of y sensors, so that the hash $h_{OA}$ for the message 1106 is $h_{OA}=(h_{O1A} \ldots h_{OyA})$. The hash $h_{OA}$ may then be compared (e.g., via an XOR operation) with the sensor's hash $h_{ON}$ to derive a comparison result, denoted $SSyn_A$. In particular embodiments, computation of the hash $h_{OA}$ may commence after receiving the message 1102 from sensor 146 and before receiving the message 1104 from HPC 110A.

In particular embodiments, the payload of the BG's message 1106 may include $c_{OA}=(h_{OA}, SSyn_A, u''_P(t_0, x_{OA}))$. The function $u''_P(\ )$ is the function transmitted from HPC 110A in message 1104. BG 132 performs computations in accordance with the function $u''_P(\ )$, using relevant data $x_{OA}$ available to BG 132. The executed function is a certificate that HPC 110A's calculation is correct within a certain bound, based on the data available to BG 132. In particular embodiments, $c_{OA}$ may be signed using the private key $k_A$ of BG 132 (the signature may be denoted $Sig(c_{OA}, k_A)$). The message 1106 may contain the $c_{OA}$ and the corresponding signature $Sig(c_{OA}, k_A)$. In particular embodiments, the message 1106 may be encrypted using the public key of the recipient. For example, the messages 1106 to HPC 110A and HSC 110B may be encrypted with their respective public keys $K_P$ and $K_S$.

With respect to HSC 110B, after receiving the message 1102 from sensor 146, HSC 110B may compute a hash and a signature, which will be included in the message 1108 that HSC 110B will send. Similar to those in the message 1104 transmitted by HPC 110A, the hash and signature from HSC 110B may serve as a certificate that the data contained in the message 1108 was not corrupted in transmission. The hash and signature may also serve as a certificate that the transmitting entity (in this case HSC 110B) had the right data available to do the controls calculation (e.g., the data is not stale) and that it has not forged sensor data to the downstream components (e.g., HPC 110A and BG 132). In particular embodiments, HSC 110B may compute a hash $h_{O1S}$ based on the sensor data from sensor 146, where $h_{O1S}=hash(m_i(t_0), Sig(m_i(t_0), k_i))$. Similarly, HSC 110B may compute a hash for the sensor data from each of z sensors, so that the hash $h_{OS}$ for the message 1108 is $h_{OS}=(h_{O1S} \ldots h_{OzS})$. The hash $h_{OS}$ may then be compared (e.g., via an XOR operation) with the sensor's hash $h_{ON}$ to derive a comparison result, denoted $SSyn_S$. In particular embodiments, computation of the hash $h_{OS}$ may commence after receiving the message 1102 from sensor 146 and before receiving the message 1104 from HPC 110A and the message 1106 from BG 132.

In particular embodiments, the payload of the HSC's message 1108 may include $c_{OS}=(t_0, h_{OS}, SSyn_S, u'_P(t_0)(x_{OS}), u''_P(t_0)(x_{OS}), u''_S(t_0)(\ ))$. The $u'_P(t_0)(\ )$ and $u''_P(t_0)(\ )$ functions were transmitted from HPC 110A in message 1104. HSC 110B performs computations in accordance with the functions $u'_P(\ )$ and $u''_P(\ )$, using relevant data $x_{OS}$ available to HSC 110B. The executed functions are certificates that HPC 110A's calculation is correct within a certain bound (the results of $u'_P(\ )$ being within a narrower bound than that of $u''_P(\ )$), based on the data available to HSC 110B. The function $u''_S(t_0)(\ )$ is provided by HSC 110B and may be used by down-stream computing components (e.g., BG 132). Computations performed based on the $u''_S(t_0)(\ )$ function may serve as a certificate that the computations made by HSC 110B are correct within a certain bound. In particular embodiments, $c_{OS}$ may be signed using the private key $k_S$ of HSC 110B (the signature may be denoted $Sig(c_{OS}, k_S)$). The message 1108 may contain the $c_{OS}$ and the corresponding signature $Sig(c_{OS}, k_S)$. In particular embodiments, the message 1108 may be encrypted using the public key of the recipient. For example, the messages 1108 to HPC 110A and BG 132 may be encrypted with their respective public keys $K_P$ and $K_A$. Thereafter, HSC 110B may send the encrypted messages 1108 to HPC 110A and BG 132.

After receiving the message 1108 from HSC 110B, BG 132 may perform the aforementioned vote arbitration to determine what control command should be passed onto the actuator associated with BG 132. Conceptually, BG 132 at this point has received respective votes of HPC 110A and HSC 110B regarding what control command should be performed. HPC 110A's vote may be represented by $u_P(t_0, x_{OP})$, which was received in message 1104 from HPC 110A. HSC 110B's vote may be represented by $u'_P(t_0)(x_{OS})$, which was received in message 1108 from HSC 110B. BG 132 may verify HPC 110A's vote by performing the computation $u''_P(t_0, x_{OA})$, based on the $u''_P(\ )$ function received from the HPC 110A in message 1104 and data $(x_{OA})$ available to BG 132. BG 132 may also verify HSC 110B's vote by performing the computation $u''_S(t_0, x_{OA})$, based on the $u''_S(\ )$ function received from HSC 110B in message 1108 and data $(x_{OA})$ available to BG 132. As an example and not by way of limitation, BG 132 may select the median control command, as described in more detail below. At 1110, BG 132 transmits the validated control message to the appropriate actuator 142. The control command cycle repeats itself in response to receiving new sensor data.

The certificates generated by the computing components (e.g., calculation of the value of the property of the control command) act as proof that median vote is correct and provide a definition of correctness. In particular embodiments, the certificates are functions transmitted from HPC 110A and HSC 110B respectively that verify to BG 132 that the calculation of the control command, based on data in the certificate from sensor, was correct to within a certain bound. The certificates or functions allow BG 132 to use the sensor data to calculate and verify the value of the property of the control command. As an example and not by way of limitation, BG 132 may calculate a value of deceleration that corresponds to the amount of braking calculated by HPC 110A and HSC 110B. If one component (e.g., HSC 110B) is faulty (provides a certificate outside of its bounds), then other two components (e.g., HPC 110A and BG 132) may detect this malfunction based on the certificate of the faulty component being outside its bound. In particular embodiments, the bounds may be based at least in part on properties of the control command for example, whether the control command was calculated using old sensor data, the value of the control command exceeds traction limits of the AV, or other properties of AV. BG 132 may disregard any messages from HPC 110A, HSC 110B, or sensors 146 that are not consistent with the expected bounds.

In particular embodiments, the median vote of the BG 132 is based on various certificates generated by the HPC and HSC, as the median result is resistant to faults. As an example and not by way of limitation, votes may include functions transmitted from the HPC and HSC respectively to the BG that are certificates that the respective calculations, based on data in the previous certificate, are correct within a certain bound. Other votes are the control command from the HPC, and the function or certificate transmitted from the HPC to the HSC that the HPC's calculation is correct within a narrower bound than the certificates transmitted to the BG by the HPC and HSC. The combination of certificate transmitted from the HSC to the HPC and the certificate transmitted from the HPC to the HSC regarding the calculation of the HPC ensures that the HSC's calculation is correct within a narrower bound than the certificates transmitted to the BG, described in more detail above. BG 132 transmits the results of the votes from HPC 110A and HSC 110B to actuator 146 for perform an operation in accordance with a median value of the commands. The certificates are probabilistic guarantees rather than absolute as in an interactive consistency arrangement. The size of the certificate (e.g. the length of a hash) corresponds to the probability that the guarantee is wrong and may be made arbitrarily low. The probability, however, is inversely proportional to computational expense (e.g., the lower the probability required, the higher the computational expense). As such, selection of the appropriate probability (or certificate size) may be a factor used in determining how power should be allocated between the computing components, such as HPC 110A and HSC 110B.

Figure 12A:
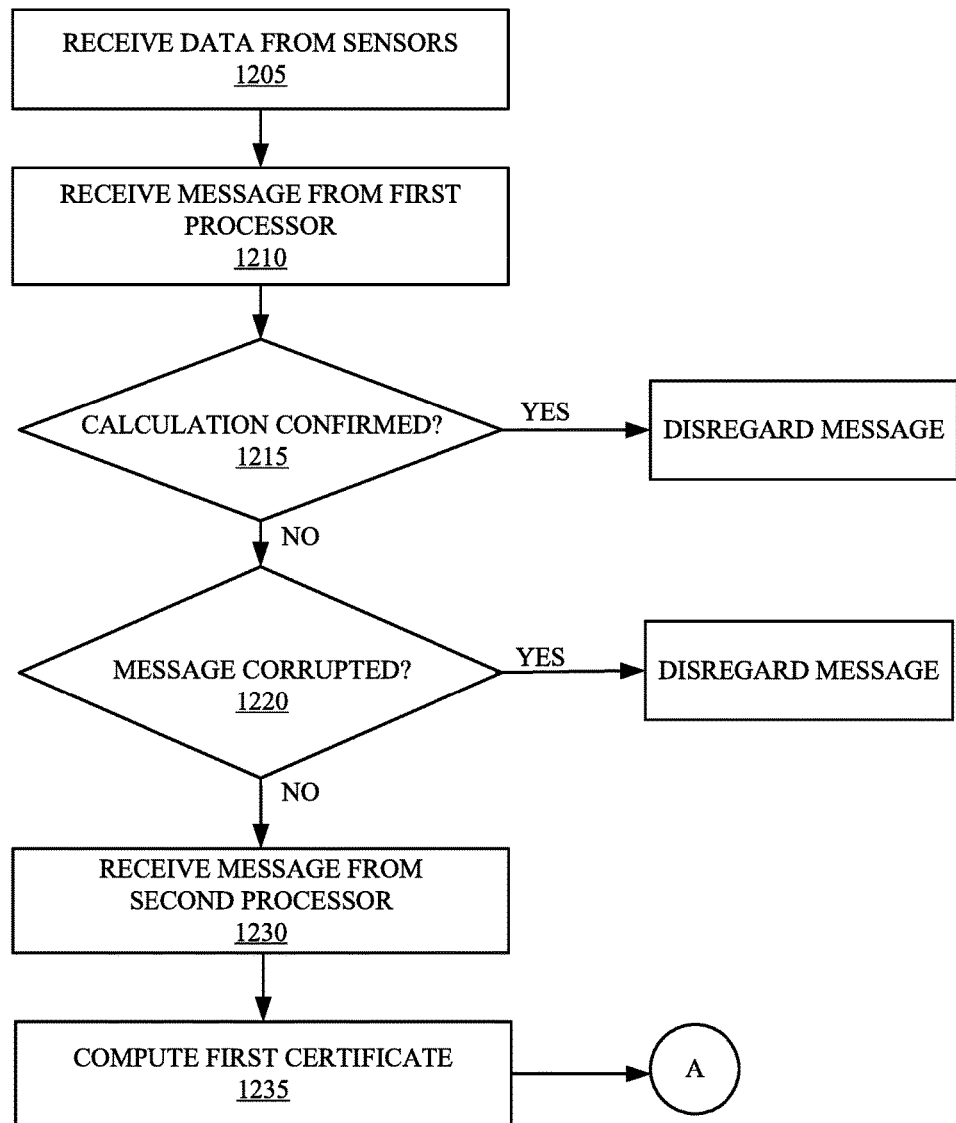
FIGS. 12A-12B illustrate an example method for determining a control command for an actuator.
Figure 12B:
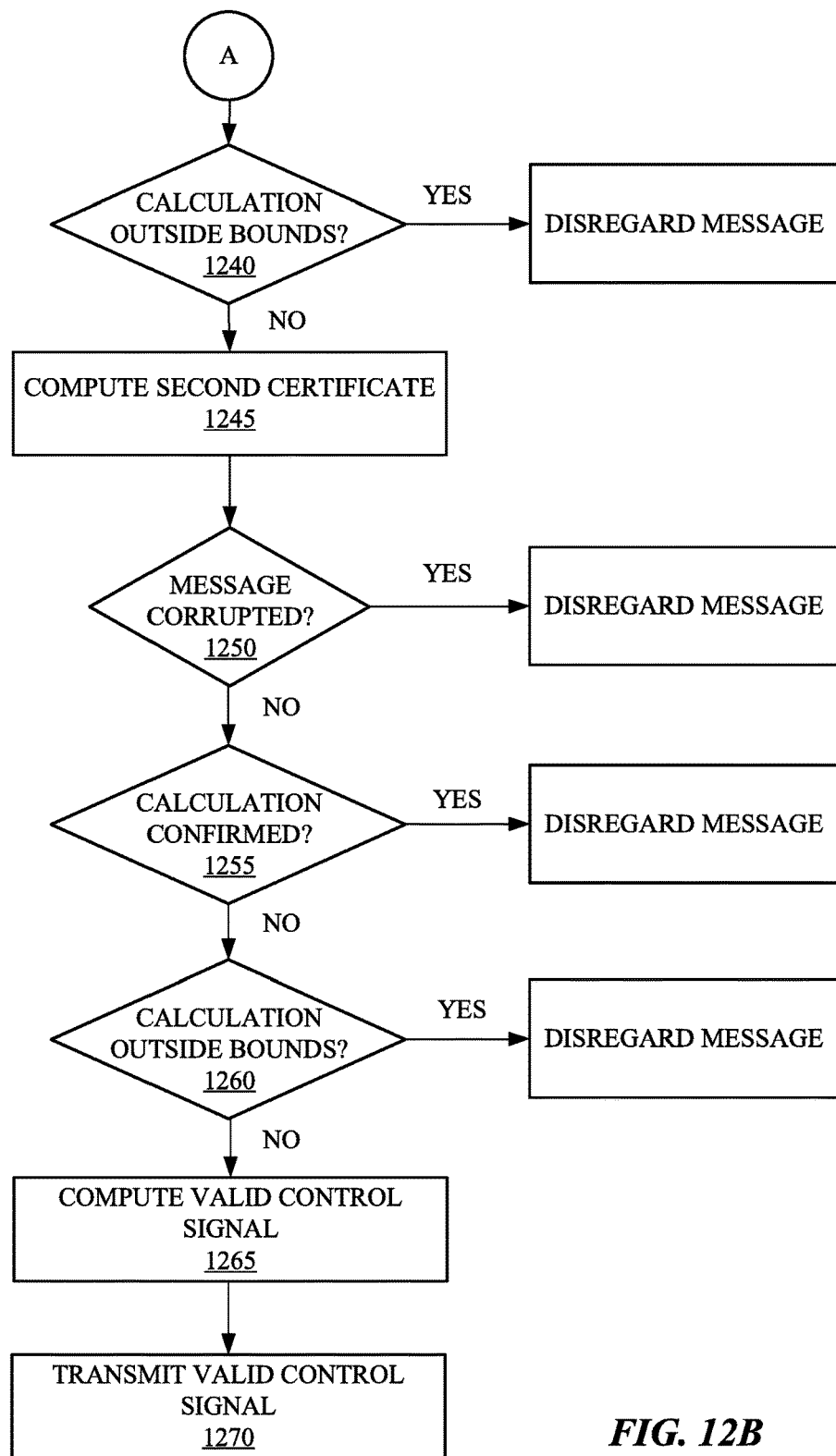

FIGS. 12A-12B illustrate an example method for determining a control command for an actuator. The method may begin at step 1205, a computing system of a bus guardian may receive data from one or more sensors. In particular embodiments, the data may be collected by a camera (optical or infrared), LiDAR receiver, ultrasound, or radar. At step 1210, the computing device of the bus guardian receives a message from a first processor (e.g., HPC). In particular embodiments, the message from the first processor includes a first control command for an actuator and a first certificate function. At step 1215, the computing device of the bus guardian may confirm that the calculation of the control command is based on recent sensor data based on a timestamp included with the message from the first processor. At step 1220, the computing device of the bus guardian may verify that message received from the first processor is not corrupted based on the message being signed using a public key of the first processor.

At step 1230, the computing device of the bus guardian receives a message from the second processor. In particular embodiments, the message from the second processor includes a second control command and a second certificate function. At step 1235, the computing device of the bus guardian may compute a first certificate based on the first certificate function and the sensor data. At step 1240, the computing device of the bus guardian may determine whether the control command corresponds to a command that is within particular bounds based on the first certificate. As an example and not by way of limitation, the bounds may be the traction limits of the particular model of the vehicle. In particular embodiments, the computing device of the bus guardian may disregard a message from the first processor that includes a control command that is corrupted or without the particular bounds.

At step 1245, the computing device of the bus guardian compute a second certificate based on the second certificate function and the sensor data. In particular embodiments, at step 1250, the computing device of the bus guardian may verify that message received from the second processor is not corrupted based on the message being signed using a public key of the second processor. At step 1255, the computing device of the bus guardian may confirm that the calculation of the control command is based on recent sensor data based on a timestamp included with the message from the second processor. At step 1260, the computing device of the bus guardian may determine whether the control command corresponds to a command that is within particular bounds based on the second certificate. In particular embodiments, the computing device of the bus guardian may disregard a message from the second processor that includes a control command that is corrupted or without the particular bounds. At step 1265, the computing system of the bus guardian determines a valid control signal based on an accuracy of the first and second control commands relative the first and second certificates, respectively. At step 1270, the computing system of the bus guardian transmits the valid control signal to the actuator.

Particular embodiments may repeat one or more steps of the method of FIGS. 12A-12B, where appropriate. Although this disclosure describes and illustrates particular steps of the method of FIGS. 12A-12B as occurring in a particular order, this disclosure contemplates any suitable steps of the method of FIGS. 12A-12B occurring in any suitable order. Moreover, although this disclosure describes and illustrates an example method for determining a control command for an actuator including the particular steps of the method of FIGS. 12A-12B, this disclosure contemplates any suitable method for determining a control command for an actuator including any suitable steps, which may include all, some, or none of the steps of the method of FIGS. 12A-12B, where appropriate. Furthermore, although this disclosure describes and illustrates particular components, devices, or systems carrying out particular steps of the method of FIGS. 12A-12B, this disclosure contemplates any suitable combination of any suitable components, devices, or systems carrying out any suitable steps of the method of FIGS. 12A-12B.

Figure 13:
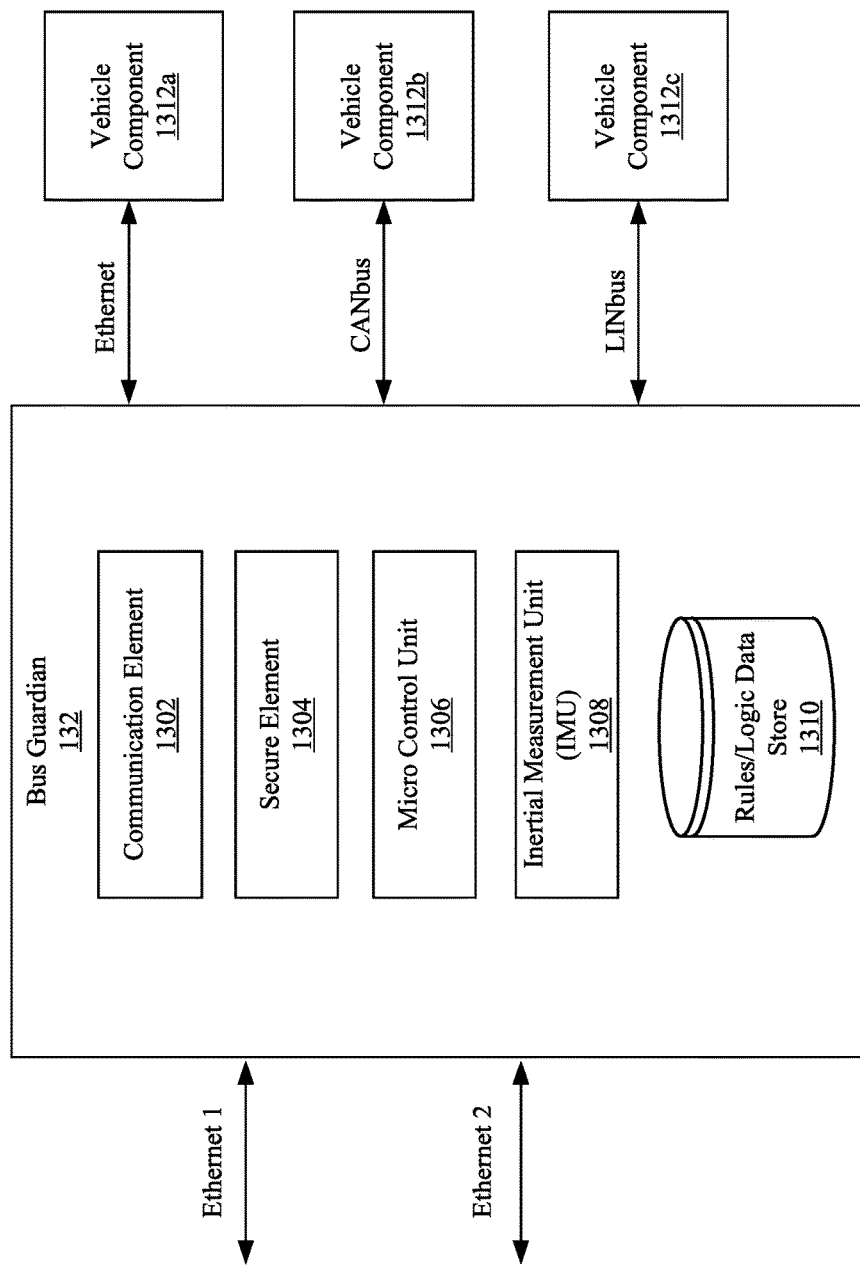
FIG. 13 is a block diagram illustrating components of an example bus guardian.

FIG. 13 is a block diagram illustrating components of an example bus guardian 132. As depicted, the bus guardian 132 includes a communication element 1302, a secure element 1304, a micro control unit (MCU) 1306, an inertial measurement unit (IMU) 1308, and a rules/logic data store 1310. A communication element 1302 may be configured to transmit and/or receive a set of data packets (including control signals, commands, and/or instructions) on two or more physically redundant networks and send out packets on one or more physically non-redundant networks. For example, the communication element 1302 may receive packets on two ethernet networks and send out packets on one or more of an ethernet, a CAN bus, or a LIN bus. The communication element 1302 may transmit to and/or receive packets from two or more ethernet switches (e.g., as shown in FIG. 1), a peer bus guardian (e.g., bus guardians 134, 136 as shown in FIG. 14C), or any other components of the autonomous vehicle, such as for example, one or more sensors of the vehicle, a high-performance computer (HPC), a high safety computer (HSC), etc. In particular embodiments, the communication element 1302 may forward received packets to the rest of the vehicle based on instructions received from the MCU 1306, as discussed in further detail below. In particular embodiments, the received packets by the communication element 1302 may be encrypted and/or have a signed certified attached to each one of them. Upon receiving, the communication element 1302 may send these encrypted and/or signed certificates to the secure element 1304 for further processing.

A secure element 1304 may be configured to encrypt and/or decrypt data packets. In particular embodiments, the secure element 1304 may be logically connected in between the communication element 1302 and the MCU 1306. Alternatively, the secure element 1304 and the MCU 1306 may be a single integrated chip. The secure element 1304 may receive encrypted data packets from the communication element 1302, decrypts the packets using one or more of decryption techniques, and then sends out decrypted data packets to the MCU 1306 for analysis. At time of outputting the data packets to one or more vehicle components (e.g., vehicle components 1312a-1312c), the packets may be encrypted by the secure element 1304 and then forwarded to the communication element 1302 for sending. Encrypting the data packets ensures that the packets exchanged between two or more components of the vehicle are not modified during transmission. Also, it protects the packets from eavesdropping. In particular embodiments, the secure element 1304 may encrypt the data packets using standard encryption or hash algorithms, such as for example AES (advanced encryption standard), 3DES (triple data encryption standard), RSA, etc.

A micro control unit (MCU) 1306 may be configured to analyze the data packets, including whether the packets passed authentication by the secure element 1304, and make a decision on whether to send these packets to the rest of the vehicle, such as the vehicle components 1312a-1312c, or signal the safety driver of the vehicle to take over manual control of the vehicle. In particular embodiments, the MCU 1306 may receive an indication from the secure element 1304 that authentication failed or receive decrypted data packets from the secure element 1304 and perform analysis on each of the data packets for error or fault detection. For instance, the MCU 1306 may analyze a data packet to determine one or more of its validity, authenticity, or correctness. By way of an example, the MCU 1306 may check a signature attached to a data packet to determine whether the packet came from an authenticated source and whether the time at which it was signed is still valid or within a threshold time period. In particular embodiments, the MCU 1306 may perform its analysis in cooperation with the IMU 1308 and based on a set of rules, configurations and/or settings stored in the rules/logic data store 1310, each of which are described in detail below.

If the MCU 1306 determines that one or more data packets are untrustworthy, faulty, or the action commanded by the data packets violate the norms/rules/logic of the bus guardian (e.g., a command for a hard brake while the vehicle is traveling above a certain speed may violate a safety rule), then the MCU 1306 may trigger a manual mode for the autonomous vehicle. That is, the MCU 1306 may send a command or signal to switch from the autonomous mode of the vehicle to the manual mode. In particular embodiments, the MCU 1306 may switch from the autonomous mode to the manual mode in embodiments where a safety driver is available. In some embodiments, the MCU 1306 may send a signal to the dashboard of the vehicle activating one or more components (e.g., LEDs) of the vehicle to alert the safety driver that there is some problem with the vehicle and the driver should take over the control. If the safety driver is remote, the MCU 1306 may cause a notification to be sent to the remote safety driver (e.g., via one or more wireless networks, such as a cellular network). In some embodiments, the safety driver (whether seated in the vehicle or located remotely) may, at the driver's own initiative, take over control of the vehicle by activating an emergency manual-override mode.

Upon detecting a problem with the data packets, the MCU 1306 may restrict the packets from being sent to the rest of the vehicle. In some embodiments, the bus guardian may also inform its peer bus guardians (e.g., bus guardians 134-136) about the problem or fault detection so that the peer bus guardians may not have to process any data packets and can simply stop receiving and/or forwarding packets. If instead the MCU 1306 does not find any fault in the data packets, the MCU 1306 may send the corresponding commands to the intended vehicle component (e.g., 1312a-c) via the appropriate communication channel (e.g., ethernet, CANbus, LINbus, etc.). In particular embodiments, the MCU 1306 may also send the packets to the secure element 1304 for encryption from where the encrypted packets may be sent to the communication element 1302 for forwarding to one or more vehicle components via one or more physically redundant networks.

An inertial measurement unit (IMU) 1308 may be configured to measure and report vehicle's force, angular rate, and/or magnetic field surrounding the vehicle, using a combination of accelerometers and gyroscopes. In particular embodiments, measurements from the IMU 1308 may be used to determine or override a vote (discussed later below) or independently decide an action for a particular vehicle component. By way of an example, if the bus guardian receives a control signal instructing the steering control sensor to take a sharp right when the vehicle is going forward at 65 MPH, then the bus guardian, based on the measurements from the IMU 1308, may decide not to send this signal to the steering control sensor since that would result in flipping the car. In some embodiments, measurements from the IMU 1308 or IMU data may be used to determine vehicle status and take an appropriate action based thereon. For example, the bus guardian may monitor the IMU data to determine if a crash has occurred or not. If in case the crash has occurred, the bus guardian may take several safety measures. For example, in the event of a crash, the bus guardian may disconnect the AV system from the vehicle's communication network. In some embodiments, the IMU 1308 may be communicatively coupled to the MCU 1306 for sending its measurements and helping in the analysis of the incoming data packets, such as verifying a certificate and selecting a vote (discussed in further detail below).

The rules/logic data store 1310 may include a set of rules defining what an autonomous vehicle (including one or more of its components) should do and/or not do at different driving scenarios. In some embodiments, each of the set of rules defines an appropriate action for a particular vehicle component (including the bus guardian) once a condition is satisfied. By way of an example, a rule may define that if a fault or problem is detected with an autonomous vehicle, then notify a safety driver of the vehicle to take over manual control and stop sending/receiving data packets. As another example, a rule may define that if in case the safety driver does not take control of the vehicle, then instruct the brake actuator of the vehicle to slowly and gradually apply brakes to bring the vehicle to a complete stop. As yet another example, a rule may define de-prioritizing or reducing scheduled time for sensors that are pointing away from the direction of travel of the vehicle. As yet another example, a rule may define that when the vehicle is moving slowly in an area heavy with pedestrians, then allocate more non-redundant bandwidth to more sensors (e.g., cameras, sensors, LiDAR system, RADARs, ultra sound system, GPS, inertial measurement units, accelerometers, gyroscopes, odometer system, etc.) to track a greater number of people. As yet another example, a rule may define that if the vehicle is driving forward at a speed above a certain threshold (e.g., 60 MPH) and a signal/command is received to take a sharp turn, then avoid that signal/command. In some embodiments, the rules/logic data store 1310 may also store local state of the vehicle and configurations, settings, and/or events for one or more vehicle components. This information may further be used in the analysis of data packets by the MCU 1306 as discussed above.

Figure 14A:
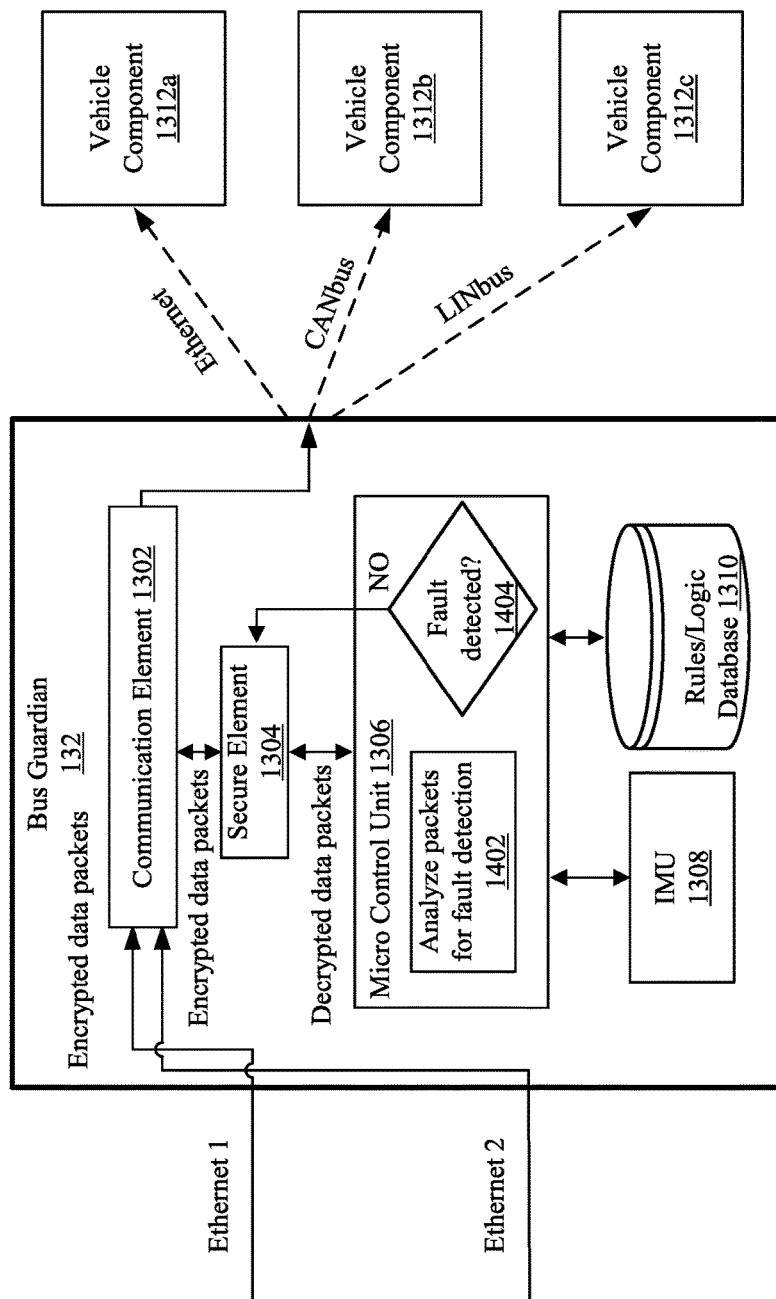
FIGS. 14A-14D illustrate example functionalities of a bus guardian.
Figure 14B:
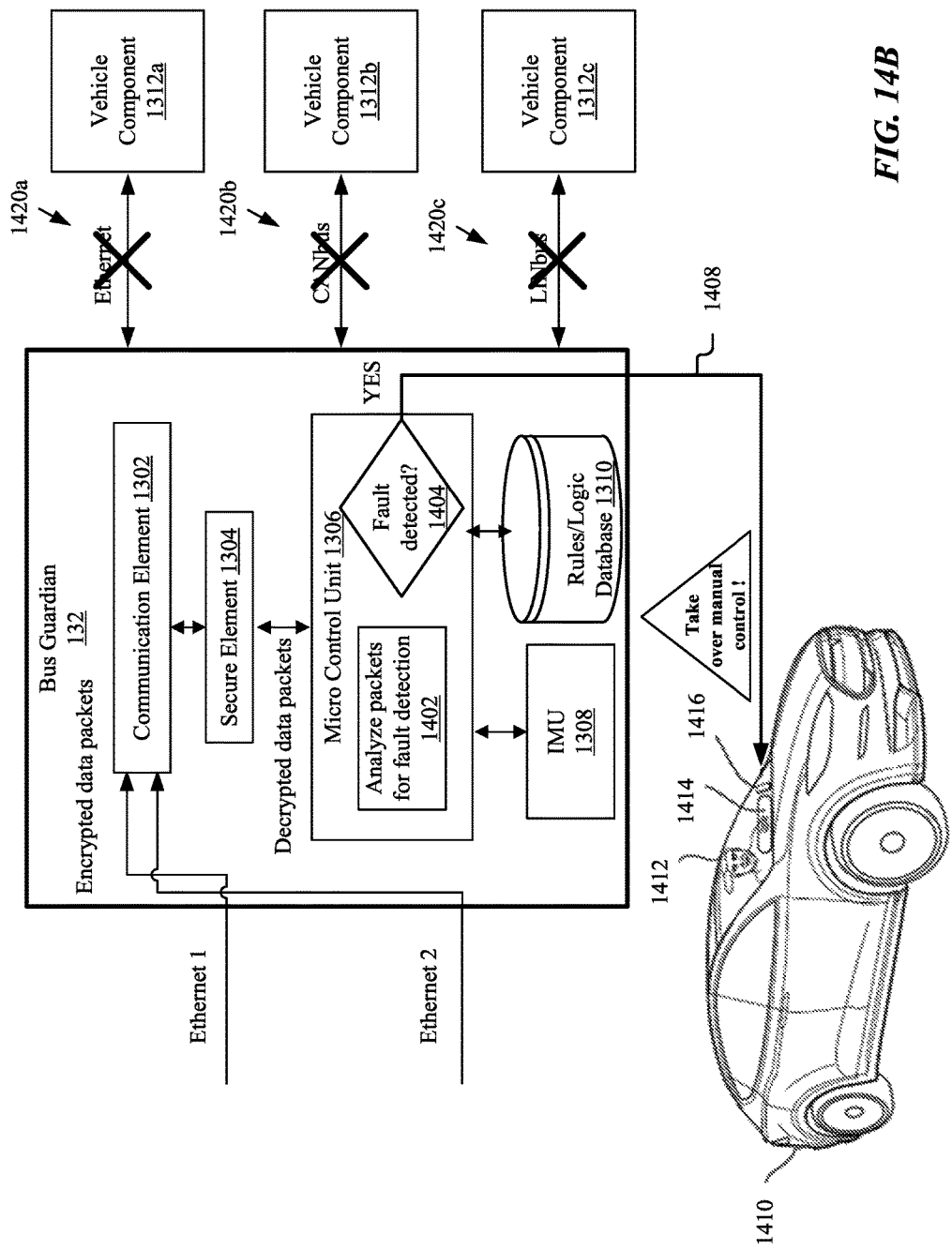
Figure 14C:
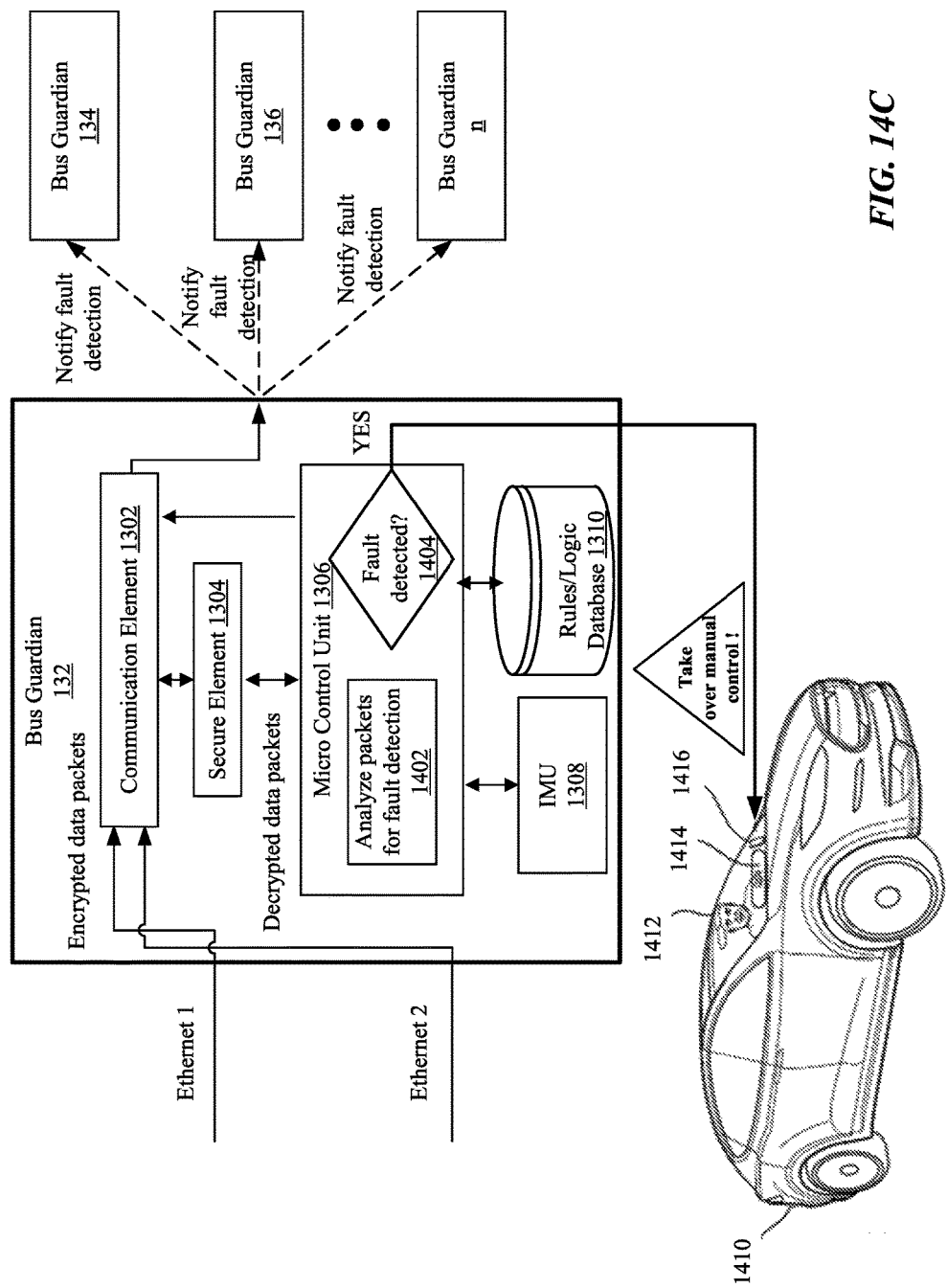

FIGS. 14A-14D illustrate example functionalities of a bus guardian. It should be noted that the bus guardian discussed herein is not limited by any means to these functionalities and various other functionalities are also possible and within the scope of the present disclosure. FIG. 14A illustrates a first functionality of an example bus guardian 132 where the bus guardian receives data packets on two or more redundant networks and outputs the packets onto one or more non-redundant networks. As depicted, the bus guardian 132 receives data packets (which may be encrypted) from two ethernet networks comprising Ethernet 1 and Ethernet 2. In particular embodiments, a communication element 1302 of the bus guardian 132 receives these encrypted packets. The communication element 1302 may then send these encrypted packets to a secure element 1304 for decryption. The decrypted packets or decryption errors may be sent to a micro control unit (MCU) 1306 of the bus guardian 132 for analysis. The MCU 1306 analyzes each data packet for fault detection (as indicated by reference numeral 1402). In particular embodiments, the MCU 1306 checks, for a data packet, one or more of its authenticity (e.g., whether the packet came from an authenticated/authorized source), validity (e.g., whether the packet is sent within an allowed time period), or correctness (e.g., whether the packet is free from errors and/or whether an associated control command was computed correctly, as described in further below). If there are no faults detected in data packets (as indicated by decision block 1404), the MCU 1306 may send the corresponding control commands to the vehicle component (e.g., 1312*a-c*) associated with the bus guardian 132. In particular embodiments, the control command may be sent to the secure element 1304 for encryption before it is sent to the communication element 1302, which may then send out these packets on one of ethernet, CANbus, or LINbus, or a combination of these three networks. In other embodiments, the control command may be sent without encryption. It should be noted that the output communication lines are shown with dashed lines to indicate that bus guardian is not limited to a single network for transmission/communication and any of the three networks can be used by the bus guardian based on the recipient of the packets and priority associated with the packets.

FIG. 14B illustrates a second functionality of the example bus guardian 132. In this case, the bus guardian may reroute control of the autonomous vehicle (with which the bus guardian is associated) to a safety driver responsive to a fault detection. As discussed above in reference to FIG. 14A, the MCU 1306 may analyze received data packets for fault detection (indicated by reference numeral 1402). If in case the MCU 1306 detects faults in the received packets, the MCU 1306 may signal a safety driver 1412 of the autonomous vehicle 1410 to take over manual control (as indicated by signal line 1408). In other words, the MCU 1306 may inform the safety driver 1412 sitting in the autonomous vehicle 1410 that there appears to have some problem with the autonomous functioning of the vehicle and therefore take manual control. The MCU 1306 may send this signal or indication to the safety driver in a variety of ways. For example, the MCU 1306 may send this indication through a message on a driver's computing device 1416 (e.g., a smartphone or control terminal), especially in embodiments where the safety driver is located remotely from the vehicle 1410. An application running on the driver's computing device 1416 may be configured to display these type of messages as a high priority on the display screen of the device 1416 so that the driver may know that an immediate action is required. As another example, the MCU 1306 may send the indication via the ride-service computing device 1414, which may be a tablet or other suitable device to allow the safety driver 1412 to interact with the autonomous vehicle 1410, transportation management system 560 (see FIG. 16), other users, or third-party systems 570 (see FIG. 16). Yet as another example, the MCU 1306 may inform the safety driver to take over the control by activating one or more indicators (e.g., LEDs) located on the dashboard of the vehicle 1410. Upon detecting the safety driver responding to the alert (e.g., manually actuating a control, such as the steering wheel or brakes), the system may switch to manual mode. In manual mode, the MCU 1306 may block packets, as represented in FIG. 14B by reference numerals 1420*a*-1420*c*, from being sent to the one or more vehicle components 1312*a*-1312*c* and reroute control over those components 1312*a-c* to the manual controls. In some embodiments, the MCU 1306 may inform the communication element 1302 not to receive and/or send any data packets until explicitly instructed to do so.

FIG. 14C illustrates a third functionality of the example bus guardian 132. In this case, upon the bus guardian signaling the safety driver to take manual control of the vehicle 1410, the bus guardian 132 may notify its peer bus guardians (e.g., 134, 136) of the fault detection so that they may not process any existing or future data packets. As shown in the figure, the MCU 1306, upon detecting one or more faults, may instruct the communication element 1302 to send out messages to other bus guardians (e.g., 134, 136) informing about the fault and that the vehicle has been switched to the manual driving mode so there is no need for any further processing. Notifying peer bus guardians of current vehicle status or fault detection is advantageous as it may reduce/eliminate any redundancy in the network fabric, save computational power and resources that may be used in processing these data packets, and help in keeping all the bus guardians at the same processing level.

Figure 14D:
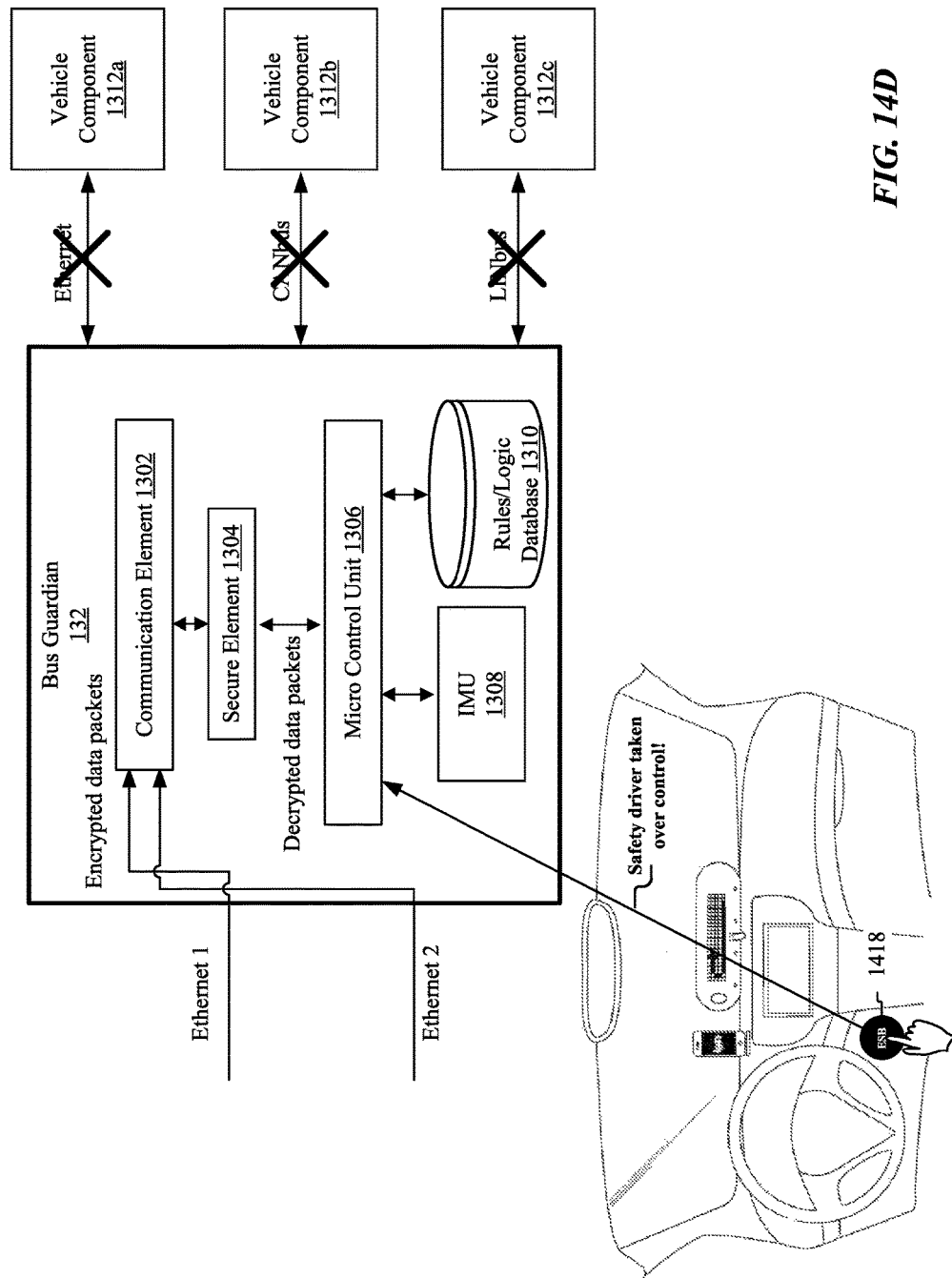

FIG. 14D illustrates an embodiment where the bus guardian 132 detects a fault based on a signal received from the safety driver 1412. For instance, the safety driver 1412 may activate an emergency stop button (ESB) 1418 that may be located on the dashboard of the vehicle resulting in the safety driver gaining complete control of the vehicle. For remote safety drivers, an equivalent emergency stop button may be implemented as a graphical user interface element (e.g., a virtual button) on the safety driver's terminal or computing device or a physical button on the remote safety driver's control device (e.g., a steering wheel, brake pads, joystick, etc.). Upon activating the ESB 1418, a module/component associated with the ESB 1418 may send a signal to the MCU 1306 indicating a change in vehicle operating state. In some embodiments, upon activating the ESB 1418 by the safety driver, the voltage of the bus guardian 132 may be dropped to zero (e.g., from 12v to 0v) resulting in disengaging or deactivating the bus guardian from sending or receiving any data packets.

In particular embodiments, the bus guardian may act as one of the voters regarding what action to take or a judge in the network fabric 100. In some embodiments, votes for particular control commands may be assigned by the high-performance computer (HPC) and the high safety computer (HSC), as discussed elsewhere herein, and the bus guardian may act as a third voter in the network and selects which computing entity's vote should be adopted. As a voter, the bus guardian may decide how a particular component of the vehicle should respond in a given scenario. For example, in a scenario where the safety driver does not take manual control of the vehicle in response to fault notification (e.g., as discussed above in reference to FIG. 14B), the bus guardian may make a vote that under such scenario, the brake actuator should start applying brakes slowly and gradually to bring the vehicle to a complete stop. The bus guardian's own determination may validate one or both of the respective votes of the other computing entities, and the control command with the most votes may be adopted to actuate the intended vehicle component. In some embodiments, apart from doing its own internal vote, a bus guardian may also have the authority to override votes of other components. For instance, the bus guardian may override votes given by the HPC and HSC. Continuing the example above, the HPC and HSC may make a vote that if the safety driver does not take manual control of the vehicle then the brake actuator should apply the brakes immediately and bring the vehicle to complete stop. This is different from what the bus guardian thinks the brake actuator should respond under such scenario as discussed above. In this case, the bus guardian may override the votes given by HPC and HSC so that the vehicle may respond according to what the bus guardian think is correct. In other words, the final judgement on how a particular vehicle component should respond is taken by the bus guardian. In some embodiments, the bus guardian may do the overriding of votes or final judgement call based on rules and/or logic stored in its rules/logic data store 1310.

In some embodiments, the bus guardian may act as a heartbeat device by keeping track of overall health of the autonomous vehicle (including various compute systems and vehicle components) and transferring control to the safety driver of the vehicle if one of the compute systems skips one or more heartbeats.

Figure 15:
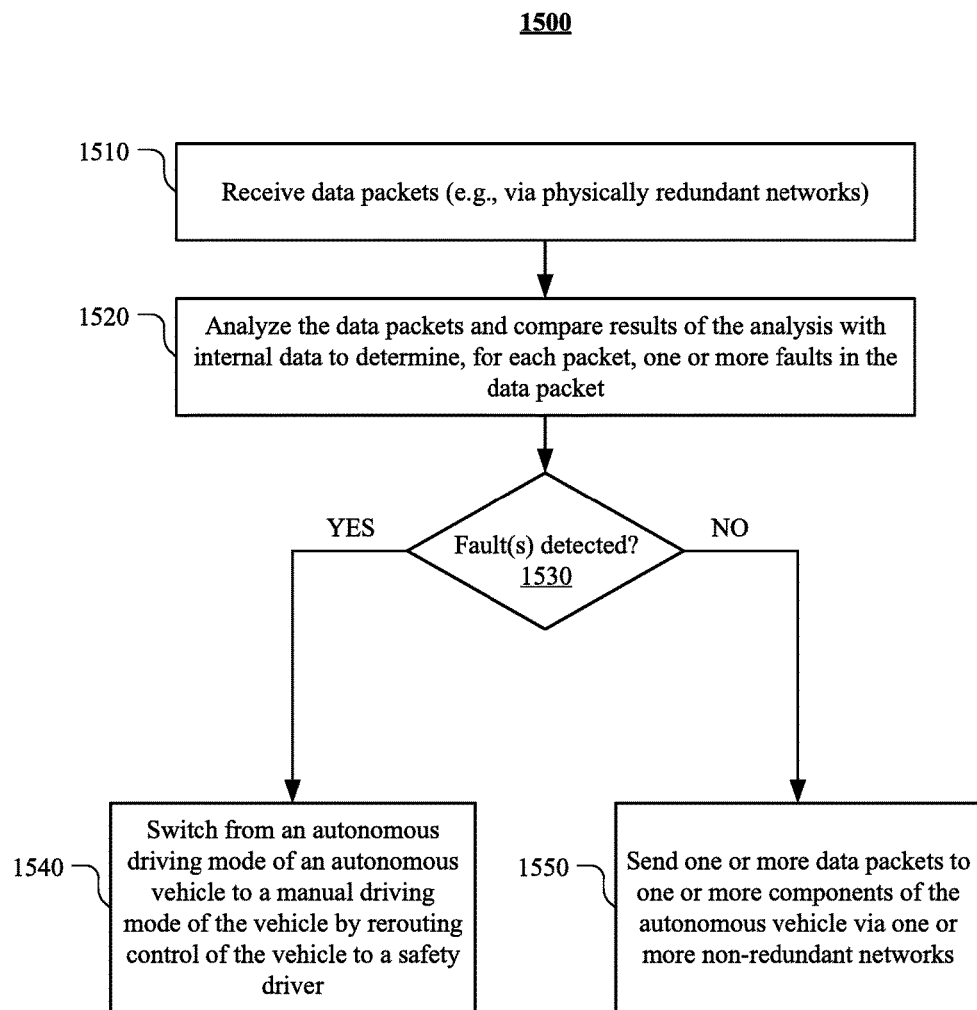
FIG. 15 is a flowchart of an example method for analyzing data packets received from one or more components of an autonomous vehicle and taking an action in response to the analysis.

FIG. 15 is a flowchart of an example method 1500 for analyzing data packets received from one or more components of an autonomous vehicle and taking an action in response to the analysis. The method 1500 begins at step 1510, where the bus guardian may receive data packets on two or more physically redundant networks. For example, the bus guardian may receive data packets on two ethernet networks, as shown for example in FIG. 13. At step 1520, the bus guardian may analyze the data packets and compare results of the analysis with its internal data to determine, for each data packet, one or more faults the data packet. For instance, the MCU 1306 may analyze a data packet and compare that with the rules/logic database 1310 of the bus guardian to determine whether the packet has any faults. In some embodiments, analyzing the data packets may include analyzing one or more of time schedules and priority schemes determined for one or more components of the autonomous vehicle, such as cameras of the vehicle. In some embodiments, analyzing the data packets include analyzing votes assigned by one or more components of the vehicle (e.g., HPC, HSC, etc.) and determining whether the votes and their corresponding actions for the vehicle are valid according to the rules/logic of the bus guardian. If in case, the corresponding actions for the vehicle determined to be invalid, then the bus guardian may override these votes to assign its own vote. At step 1530, the bus guardian may make a determine as to whether any faults are detected in the data packets. If the result of the determination is affirmative, then at step 1540, the bus guardian may switch from an autonomous driving mode of the autonomous vehicle to a manual driving mode by rerouting control of the vehicle to a safety driver, as shown for example in FIGS. 14B and/or 14C. Else, if the result of the determination in step 1530 is negative, then at step 1550, the bus guardian may send one or more data packets to one or more components of the autonomous vehicle via one or more non-redundant networks, as shown for example in FIG. 14A. The bus guardian may send out packets through any combination of ethernet, CAN, or LIN networks. The one or more components may include one or more of a sensor, an actuator, a high-performance computer, or a high safety or a lower performance computer.

Particular embodiments may repeat one or more steps of the method 1500 of FIG. 15, where appropriate. Although this disclosure describes and illustrates particular steps of the method of FIG. 15 as occurring in a particular order, this disclosure contemplates any suitable steps of the method of FIG. 15 occurring in any suitable order. Moreover, although this disclosure describes and illustrates an example method for analyzing data packets received from one or more components of an autonomous vehicle and taking an action in response to the analysis, including the particular steps of the method of FIG. 15, this disclosure contemplates any suitable method for analyzing data packets received from one or more components of an autonomous vehicle and taking an action in response to the analysis, including any suitable steps, which may include all, some, or none of the steps of the method of FIG. 15, where appropriate. Furthermore, although this disclosure describes and illustrates particular components, devices, or systems carrying out particular steps of the method of FIG. 15, this disclosure contemplates any suitable combination of any suitable components, devices, or systems carrying out any suitable steps of the method of FIG. 15.

Figure 16:
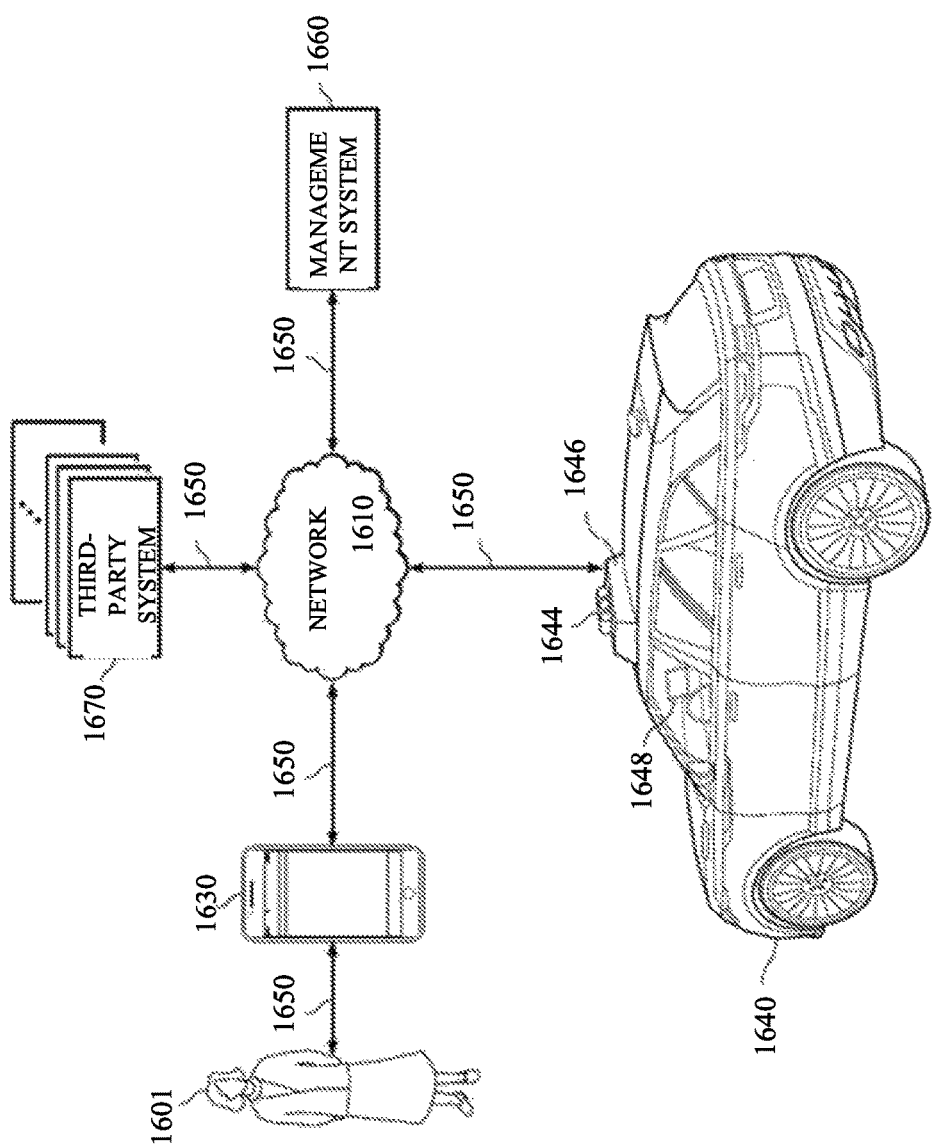
FIG. 16. illustrates an example block diagram of a transportation management environment.

FIG. 16 illustrates an example block diagram of a transportation management environment for matching ride requestors with autonomous vehicles. In particular embodiments, the environment may include various computing entities, such as a user computing device 1630 of a user 1601 (e.g., a ride provider or requestor), a transportation management system 1660, an autonomous vehicle 1640, and one or more third-party system 1670. The computing entities may be communicatively connected over any suitable network 1610. As an example and not by way of limitation, one or more portions of network 1610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 16 illustrates a single user device 1630, a single transportation management system 1660, a single vehicle 1640, a plurality of third-party systems 1670, and a single network 1610, this disclosure contemplates any suitable number of each of these entities. As an example and not by way of limitation, the network environment may include multiple users 1601, user devices 1630, transportation management systems 1660, autonomous-vehicles 1640, third-party systems 1670, and networks 1610.

The user device 1630, transportation management system 1660, autonomous vehicle 1640, and third-party system 1670 may be communicatively connected or co-located with each other in whole or in part. These computing entities may communicate via different transmission technologies and network types. For example, the user device 1630 and the vehicle 1640 may communicate with each other via a cable or short-range wireless communication (e.g., Bluetooth, NFC, WI-FI, etc.), and together they may be connected to the Internet via a cellular network that is accessible to either one of the devices (e.g., the user device 1630 may be a smartphone with LTE connection). The transportation management system 1660 and third-party system 1670, on the other hand, may be connected to the Internet via their respective LAN/WLAN networks and Internet Service Providers (ISP). FIG. 16 illustrates transmission links 1650 that connect user device 1630, autonomous vehicle 1640, transportation management system 1660, and third-party system 1670 to communication network 1610. This disclosure contemplates any suitable transmission links 1650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 1650 may connect to one or more networks 1610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 1650. For example, the user device 1630 may communicate with the transportation management system via a cellular network and the Internet, but communicate with the autonomous vehicle 1640 via Bluetooth or a physical wire connection.

In particular embodiments, the transportation management system 1660 may fulfill ride requests for one or more users 1601 by dispatching suitable vehicles. The transportation management system 1660 may receive any number of ride requests from any number of ride requestors 1601. In particular embodiments, a ride request from a ride requestor 1601 may include an identifier that identifies the ride requestor in the system 1660. The transportation management system 1660 may use the identifier to access and store the ride requestor's 1601 information, in accordance with the requestor's 1601 privacy settings. The ride requestor's 1601 information may be stored in one or more data stores (e.g., a relational database system) associated with and accessible to the transportation management system 1660. In particular embodiments, ride requestor information may include profile information about a particular ride requestor 1601. In particular embodiments, the ride requestor 1601 may be associated with one or more categories or types, through which the ride requestor 1601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 1660 may classify a user 1601 based on known information about the user 1601 (e.g., using machine-learning classifiers), and use the classification to retrieve relevant aggregate information associated with that class. For example, the system 1660 may classify a user 1601 as a young adult and retrieve relevant aggregate information associated with young adults, such as the type of music generally preferred by young adults.

Transportation management system 1660 may also store and access ride information. Ride information may include locations related to the ride, traffic data, route options, optimal pick-up or drop-off locations for the ride, or any other suitable information associated with a ride. As an example and not by way of limitation, when the transportation management system 1660 receives a request to travel from San Francisco International Airport (SFO) to Palo Alto, Calif., the system 1660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 1660. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 1660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 1660 in particular embodiments may predict and provide ride suggestions in response to a ride request. In particular embodiments, the system 1660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 1660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 1660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 1630 (which may belong to a ride requestor or provider), a transportation management system 1660, vehicle system 1640, or a third-party system 1670 to process, transform, manage, retrieve, modify, add, or delete the information stored in the data store.

In particular embodiments, transportation management system 1660 may include an authorization server (or any other suitable component(s)) that allows users 1601 to opt-in to or opt-out of having their information and actions logged, recorded, or sensed by transportation management system 1660 or shared with other systems (e.g., third-party systems 1670). In particular embodiments, a user 1601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 1601 of transportation management system 1660 through blocking, data hashing, anonymization, or other suitable techniques as appropriate.

In particular embodiments, third-party system 1670 may be a network-addressable computing system that may provide HD maps or host GPS maps, customer reviews, music or content, weather information, or any other suitable type of information. Third-party system 1670 may generate, store, receive, and send relevant data, such as, for example, map data, customer review data from a customer review website, weather data, or any other suitable type of data. Third-party system 1670 may be accessed by the other computing entities of the network environment either directly or via network 1610. For example, user device 1630 may access the third-party system 1670 via network 1610, or via transportation management system 1660. In the latter case, if credentials are required to access the third-party system 1670, the user 1601 may provide such information to the transportation management system 1660, which may serve as a proxy for accessing content from the third-party system 1670.

In particular embodiments, user device 1630 may be a mobile computing device such as a smartphone, tablet computer, or laptop computer. User device 1630 may include one or more processors (e.g., CPU and/or GPU), memory, and storage. An operating system and applications may be installed on the user device 1630, such as, e.g., a transportation application associated with the transportation management system 1660, applications associated with third-party systems 1670, and applications associated with the operating system. User device 1630 may include functionality for determining its location, direction, or orientation, based on integrated sensors such as GPS, compass, gyroscope, or accelerometer. User device 1630 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 1630 may also include one or more cameras, scanners, touchscreens, microphones, speakers, and any other suitable input-output devices.

In particular embodiments, the vehicle 1640 may be an autonomous vehicle and equipped with an array of sensors 1644, a navigation system 1646, and a ride-service computing device 1648. In particular embodiments, a fleet of autonomous vehicles 1640 may be managed by the transportation management system 1660. The fleet of autonomous vehicles 1640, in whole or in part, may be owned by the entity associated with the transportation management system 1660, or they may be owned by a third-party entity relative to the transportation management system 1660. In either case, the transportation management system 1660 may control the operations of the autonomous vehicles 1640, including, e.g., dispatching select vehicles 1640 to fulfill ride requests, instructing the vehicles 1640 to perform select operations (e.g., head to a service center or charging/fueling station, pull over, stop immediately, self-diagnose, lock/unlock compartments, change music station, change temperature, and any other suitable operations), and instructing the vehicles 1640 to enter select operation modes (e.g., operate normally, drive at a reduced speed, drive under the command of human operators, and any other suitable operational modes).

In particular embodiments, the autonomous vehicles 1640 may receive data from and transmit data to the transportation management system 1660 and the third-party system 1670. Example of received data may include, e.g., instructions, new software or software updates, maps, 3D models, trained or untrained machine-learning models, location information (e.g., location of the ride requestor, the autonomous vehicle 1640 itself, other autonomous vehicles 1640, and target destinations such as service centers), navigation information, traffic information, weather information, entertainment content (e.g., music, video, and news) ride requestor information, ride information, and any other suitable information. Examples of data transmitted from the autonomous vehicle 1640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 1640, passengers may send/receive data to the transportation management system 1660 and/or third-party system 1670), and any other suitable data.

In particular embodiments, autonomous vehicles 1640 may also communicate with each other as well as other traditional human-driven vehicles, including those managed and not managed by the transportation management system 1660. For example, one vehicle 1640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 1660 or third-party system 1670).

In particular embodiments, an autonomous vehicle 1640 may obtain and process sensor/telemetry data. Such data may be captured by any suitable sensors. For example, the vehicle 1640 may have a Light Detection and Ranging (LiDAR) sensor array of multiple LiDAR transceivers that are configured to rotate 360°, emitting pulsed laser light and measuring the reflected light from objects surrounding vehicle 1640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 1640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 1640 may have optical cameras pointing in different directions. The cameras may be used for, e.g., recognizing roads, lane markings, street signs, traffic lights, police, other vehicles, and any other visible objects of interest. To enable the vehicle 1640 to "see" at night, infrared cameras may be installed. In particular embodiments, the vehicle may be equipped with stereo vision for, e.g., spotting hazards such as pedestrians or tree branches on the road. As another example, the vehicle 1640 may have radars for, e.g., detecting other vehicles and/or hazards afar. Furthermore, the vehicle 1640 may have ultrasound equipment for, e.g., parking and obstacle detection. In addition to sensors enabling the vehicle 1640 to detect, measure, and understand the external world around it, the vehicle 1640 may further be equipped with sensors for detecting and self-diagnosing the vehicle's own state and condition. For example, the vehicle 1640 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 1640 may build a 3D model of its surrounding based on data from its LiDAR, radar, sonar, and cameras, along with a pre-generated map obtained from the transportation management system 1660 or the third-party system 1670. Although sensors 1644 appear in a particular location on autonomous vehicle 1640 in FIG. 16, sensors 1644 may be located in any suitable location in or on autonomous vehicle 1640. Example locations for sensors include the front and rear bumpers, the doors, the front windshield, on the side panel, or any other suitable location.

In particular embodiments, the autonomous vehicle 1640 may be equipped with a processing unit (e.g., one or more CPUs and GPUs), memory, and storage. The vehicle 1640 may thus be equipped to perform a variety of computational and processing tasks, including processing the sensor data, extracting useful information, and operating accordingly. For example, based on images captured by its cameras and a machine-vision model, the vehicle 1640 may identify particular types of objects captured by the images, such as pedestrians, other vehicles, lanes, curbs, and any other objects of interest.

In particular embodiments, the autonomous vehicle 1640 may have a navigation system 1646 responsible for safely navigating the autonomous vehicle 1640. In particular embodiments, the navigation system 1646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 1646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 1646 may use its determinations to control the vehicle 1640 to operate in prescribed manners and to guide the autonomous vehicle 1640 to its destinations without colliding into other objects. Although the physical embodiment of the navigation system 1646 (e.g., the processing unit) appears in a particular location on autonomous vehicle 1640 in FIG. 16, navigation system 1646 may be located in any suitable location in or on autonomous vehicle 1640. Example locations for navigation system 1646 include inside the cabin or passenger compartment of autonomous vehicle 1640, near the engine/battery, near the front seats, rear seats, or in any other suitable location.

In particular embodiments, the autonomous vehicle 1640 may be equipped with a ride-service computing device 1648, which may be a tablet or any other suitable device installed by transportation management system 1660 to allow the user to interact with the autonomous vehicle 1640, transportation management system 1660, other users 1601, or third-party systems 1670. In particular embodiments, installation of ride-service computing device 1648 may be accomplished by placing the ride-service computing device 1648 inside autonomous vehicle 1640, and configuring it to communicate with the vehicle 1640 via a wire or wireless connection (e.g., via Bluetooth). Although FIG. 16 illustrates a single ride-service computing device 1648 at a particular location in autonomous vehicle 1640, autonomous vehicle 1640 may include several ride-service computing devices 1648 in several different locations within the vehicle. As an example and not by way of limitation, autonomous vehicle 1640 may include four ride-service computing devices 1648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 1648 may be detachable from any component of autonomous vehicle 1640. This may allow users to handle ride-service computing device 1648 in a manner consistent with other tablet computing devices. As an example and not by way of limitation, a user may move ride-service computing device 1648 to any location in the cabin or passenger compartment of autonomous vehicle 1640, may hold ride-service computing device 1648, or handle ride-service computing device 1648 in any other suitable manner. Although this disclosure describes providing a particular computing device in a particular manner, this disclosure contemplates providing any suitable computing device in any suitable manner.

Figure 17:
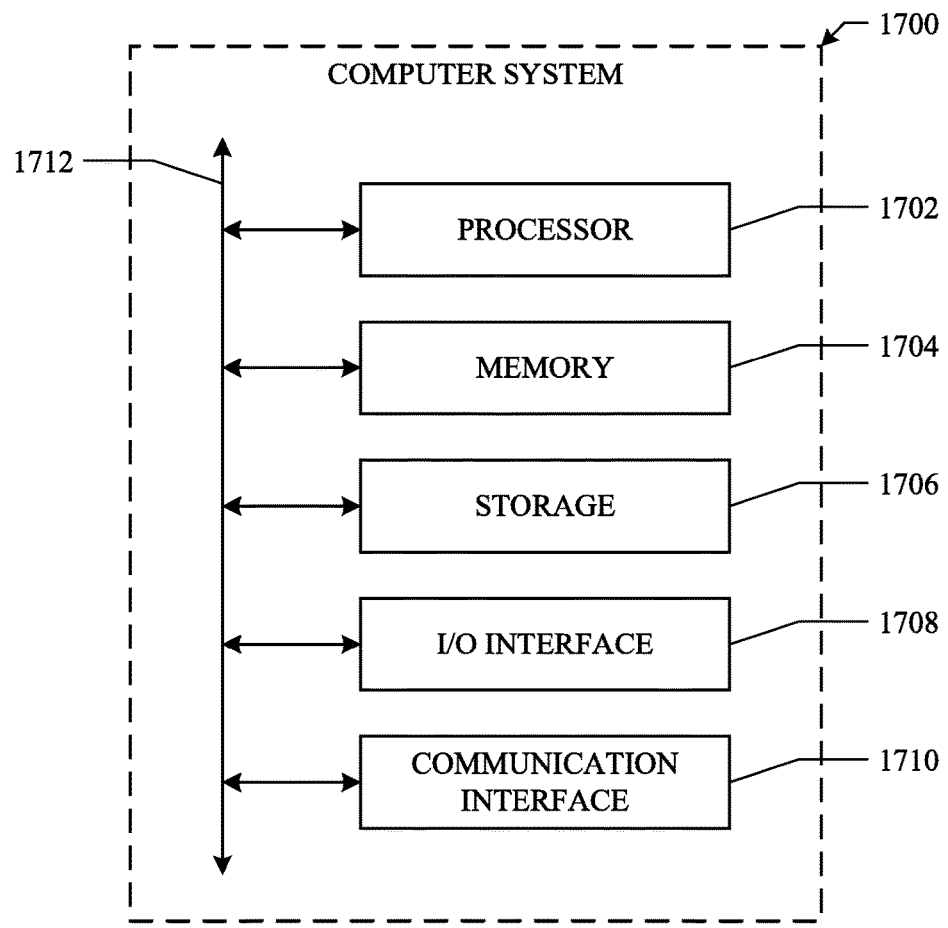
FIG. 17 illustrates an example of a computer.

FIG. 17 illustrates an example computer system 1700. In particular embodiments, one or more computer systems 1700 perform one or more steps of one or more methods described or illustrated herein. In particular embodiments, one or more computer systems 1700 provide the functionalities described or illustrated herein. In particular embodiments, software running on one or more computer systems 1700 performs one or more steps of one or more methods described or illustrated herein or provides the functionalities described or illustrated herein. Particular embodiments include one or more portions of one or more computer systems 1700. Herein, a reference to a computer system may encompass a computing device, and vice versa, where appropriate. Moreover, a reference to a computer system may encompass one or more computer systems, where appropriate.

This disclosure contemplates any suitable number of computer systems 1700. This disclosure contemplates computer system 1700 taking any suitable physical form. As example and not by way of limitation, computer system 1700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1700 may include one or more computer systems 1700; be unitary or distributed; span multiple locations; span multiple machines; span multiple data centers; or reside in a cloud, which may include one or more cloud components in one or more networks. Where appropriate, one or more computer systems 1700 may perform without substantial spatial or temporal limitation one or more steps of one or more methods described or illustrated herein. As an example and not by way of limitation, one or more computer systems 1700 may perform in real time or in batch mode one or more steps of one or more methods described or illustrated herein. One or more computer systems 1700 may perform at different times or at different locations one or more steps of one or more methods described or illustrated herein, where appropriate.

In particular embodiments, computer system 1700 includes a processor 1702, memory 1704, storage 1706, an input/output (I/O) interface 1708, a communication interface 1710, and a bus 1712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1702 includes hardware for executing instructions, such as those making up a computer program. As an example and not by way of limitation, to execute instructions, processor 1702 may retrieve (or fetch) the instructions from an internal register, an internal cache, memory 1704, or storage 1706; decode and execute them; and then write one or more results to an internal register, an internal cache, memory 1704, or storage 1706. In particular embodiments, processor 1702 may include one or more internal caches for data, instructions, or addresses. This disclosure contemplates processor 1702 including any suitable number of any suitable internal caches, where appropriate. As an example and not by way of limitation, processor 1702 may include one or more instruction caches, one or more data caches, and one or more translation lookaside buffers (TLBs). Instructions in the instruction caches may be copies of instructions in memory 1704 or storage 1706, and the instruction caches may speed up retrieval of those instructions by processor 1702. Data in the data caches may be copies of data in memory 1704 or storage 1706 that are to be operated on by computer instructions; the results of previous instructions executed by processor 1702 that are accessible to subsequent instructions or for writing to memory 1704 or storage 1706; or any other suitable data. The data caches may speed up read or write operations by processor 1702. The TLBs may speed up virtual-address translation for processor 1702. In particular embodiments, processor 1702 may include one or more internal registers for data, instructions, or addresses. This disclosure contemplates processor 1702 including any suitable number of any suitable internal registers, where appropriate. Where appropriate, processor 1702 may include one or more arithmetic logic units (ALUs), be a multi-core processor, or include one or more processors 1702. Although this disclosure describes and illustrates a particular processor, this disclosure contemplates any suitable processor.

In particular embodiments, memory 1704 includes main memory for storing instructions for processor 1702 to execute or data for processor 1702 to operate on. As an example and not by way of limitation, computer system 1700 may load instructions from storage 1706 or another source (such as another computer system 1700) to memory 1704. Processor 1702 may then load the instructions from memory 1704 to an internal register or internal cache. To execute the instructions, processor 1702 may retrieve the instructions from the internal register or internal cache and decode them. During or after execution of the instructions, processor 1702 may write one or more results (which may be intermediate or final results) to the internal register or internal cache. Processor 1702 may then write one or more of those results to memory 1704. In particular embodiments, processor 1702 executes only instructions in one or more internal registers or internal caches or in memory 1704 (as opposed to storage 1706 or elsewhere) and operates only on data in one or more internal registers or internal caches or in memory 1704 (as opposed to storage 1706 or elsewhere). One or more memory buses (which may each include an address bus and a data bus) may couple processor 1702 to memory 1704. Bus 1712 may include one or more memory buses, as described in further detail below. In particular embodiments, one or more memory management units (MMUs) reside between processor 1702 and memory 1704 and facilitate accesses to memory 1704 requested by processor 1702. In particular embodiments, memory 1704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1704 may include one or more memories 1704, where appropriate. Although this disclosure describes and illustrates particular memory, this disclosure contemplates any suitable memory.

In particular embodiments, storage 1706 includes mass storage for data or instructions. As an example and not by way of limitation, storage 1706 may include a hard disk drive (HDD), a floppy disk drive, flash memory, an optical disc, a magneto-optical disc, magnetic tape, or a Universal Serial Bus (USB) drive or a combination of two or more of these. Storage 1706 may include removable or non-removable (or fixed) media, where appropriate. Storage 1706 may be internal or external to computer system 1700, where appropriate. In particular embodiments, storage 1706 is non-volatile, solid-state memory. In particular embodiments, storage 1706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1706 taking any suitable physical form. Storage 1706 may include one or more storage control units facilitating communication between processor 1702 and storage 1706, where appropriate. Where appropriate, storage 1706 may include one or more storages 1706. Although this disclosure describes and illustrates particular storage, this disclosure contemplates any suitable storage.

In particular embodiments, I/O interface 1708 includes hardware, software, or both, providing one or more interfaces for communication between computer system 1700 and one or more I/O devices. Computer system 1700 may include one or more of these I/O devices, where appropriate. One or more of these I/O devices may enable communication between a person and computer system 1700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1708 for them. Where appropriate, I/O interface 1708 may include one or more device or software drivers enabling processor 1702 to drive one or more of these I/O devices. I/O interface 1708 may include one or more I/O interfaces 1708, where appropriate. Although this disclosure describes and illustrates a particular I/O interface, this disclosure contemplates any suitable I/O interface.

In particular embodiments, communication interface 1710 includes hardware, software, or both providing one or more interfaces for communication (such as, for example, packet-based communication) between computer system 1700 and one or more other computer systems 1700 or one or more networks. As an example and not by way of limitation, communication interface 1710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1710 for it. As an example and not by way of limitation, computer system 1700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1700 may include any suitable communication interface 1710 for any of these networks, where appropriate. Communication interface 1710 may include one or more communication interfaces 1710, where appropriate. Although this disclosure describes and illustrates a particular communication interface, this disclosure contemplates any suitable communication interface.

In particular embodiments, bus 1712 includes hardware, software, or both coupling components of computer system 1700 to each other. As an example and not by way of limitation, bus 1712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1712 may include one or more buses 1712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device in a vehicle:
   receiving data from one or more sensors associated with the vehicle;
   receiving a first message from a first processor of the vehicle, wherein the first message from the first processor comprises a first control command for an actuator of the vehicle and a first certificate function;
   receiving a second message from a second processor of the vehicle, wherein the second message from the second processor comprises a second control command for the actuator of the vehicle and a second certificate function;
   computing a first certificate based on the first certificate function and the data;
   computing a second certificate based on the second certificate function and the data;
   determining a valid control signal based on an accuracy of the first control command calculated using the first certificate and an accuracy of the second control command calculated using the second certificate; and
   transmitting the valid control signal to the actuator to cause the vehicle to perform an action.

2. The method of claim 1, further comprising transmitting to the first processor and the second processor a third message comprising a third certificate that is computed based on the received data from the one or more sensors.

3. The method of claim 2, further comprising, signing the third message with a public key.

4. The method of claim 1, wherein a property of the first control command or the second control command comprises a lateral acceleration, a number of degrees of steerage, linear deceleration, or linear acceleration.

5. The method of claim 1, further comprising, verifying that the first message originated from the first processor and the second message originated from the second processor based on respective public keys of the first processor and the second processor.

6. The method of claim 1, further comprising confirming that a value of a property of the first control command is within a narrower range than a value of a property of the second control command based on the first message from the first processor and the second message from the second processor.

7. The method of claim 1, further comprising verifying that the first certificate and the second certificate correspond to an expected range of values, wherein the expected range of values are based on one or more characteristics of the vehicle.

8. The method of claim 1, wherein the first processor calculates the first control command and the second processor calculates the second control command in response to receiving the data from the one or more sensors.

9. The method of claim 1, wherein the first certificate and the second certificate further comprise a time-stamp of the data used to calculate the first control command and the second control command.

10. The method of claim 1, wherein the first processor of the vehicle has more processing power than the second processor of the vehicle.

11. One or more computer-readable non-transitory storage media embodying software that is operable when executed to cause one or more processors in a vehicle to perform operations comprising:
    receiving data from one or more sensors associated with the vehicle;
    receiving a first message from a first processor of the vehicle, wherein the first message from the first processor comprises a first control command for an actuator of the vehicle and a first certificate function;
    receiving a second message from a second processor of the vehicle, wherein the second message from the second processor comprises a second control command for the actuator of the vehicle and a second certificate function;
    computing a first certificate based on the first certificate function and the data;
    computing a second certificate based on the second certificate function and the data;
    determining a valid control signal based on an accuracy of the first control command calculated using the first certificate and an accuracy of the second control command calculated using the second certificate; and
    transmitting the valid control signal to the actuator to cause the vehicle to perform an action.

12. The media of claim 11, wherein the software is further operable to transmit to the first processor and the second processor a third message comprising a third certificate that is computed based on the data from the one or more sensors.

13. The media of claim 12, wherein the software is further operable to sign the third message with a public key.

14. The media of claim 11, wherein a property of the first control command or the second control command comprises a lateral acceleration, a number of degrees of steerage, linear deceleration, or linear acceleration.

15. The media of claim 11, wherein the software is further operable to verify that the first message originated from the first processor and the second message originated from the second processor based on respective public keys of the first processor and the second processor.

16. A computing system of a vehicle comprising:
one or more processors; and
one or more computer-readable non-transitory storage media coupled to one or more of the processors, the one or more computer-readable non-transitory storage media comprising instructions operable when executed by one or more of the processors to cause the computing system to perform operations comprising:
receiving data from one or more sensors associated with the vehicle;
receiving a first message from a first processor of the vehicle, wherein the first message from the first processor comprises a first control command for an actuator of the vehicle and a first certificate function;
receiving a second message from a second processor of the vehicle, wherein the message from the second processor comprises a second control command for the actuator of the vehicle and a second certificate function;
computing a first certificate based on the first certificate function and the data;
computing a second certificate based on the second certificate function and the data;
determining a valid control signal based on an accuracy of the first control command calculated using the first certificate and an accuracy of the second control command calculated using the second certificate; and
transmitting the valid control signal to the actuator to cause the vehicle to perform an action.

17. The system of claim 16, wherein the instructions are further operable to transmit to the first processor and the second processor a third message comprising a third certificate that is computed based on the received data from the one or more sensors.

18. The system of claim 17, wherein the instructions are further operable to sign the third message with a public key.

19. The system of claim 16, wherein a property of the first control command or the second control command comprises a lateral acceleration, a number of degrees of steerage, linear deceleration, or linear acceleration.

20. The system of claim 16, wherein the instructions are further operable to verify that the first message originated from the first processor and the second control message originated from the second processor based on respective public keys of the first processor and the second processor.

* * * * *